US011539531B2

(12) United States Patent
Finke et al.

(10) Patent No.: US 11,539,531 B2
(45) Date of Patent: Dec. 27, 2022

(54) SYSTEM AND APPARATUS FOR PROVIDING AUTHENTICABLE ELECTRONIC COMMUNICATION

(71) Applicant: OnDefend Holdings, LLC, Jacksonville, FL (US)

(72) Inventors: Benjamin Finke, St Johns, FL (US); Christopher Freedman, Ponte Vedra Beach, FL (US)

(*) Notice: Subject to any disclaimer, the term of this patent is extended or adjusted under 35 U.S.C. 154(b) by 0 days.

(21) Appl. No.: 17/581,150

(22) Filed: Jan. 21, 2022

(65) Prior Publication Data
US 2022/0158848 A1 May 19, 2022

Related U.S. Application Data

(63) Continuation-in-part of application No. 17/376,260, filed on Jul. 15, 2021, now Pat. No. 11,323,270, which is a continuation-in-part of application No. 17/112,432, filed on Dec. 4, 2020, now Pat. No. 11,102,010, which is a continuation-in-part of application No. 16/858,315, filed on Apr. 24, 2020, which is a continuation-in-part of application No. 16/548,178, filed on Aug. 22, 2019, now Pat. No. 10,673,636, which is a continuation of application
(Continued)

(51) Int. Cl.
*H04L 9/32* (2006.01)
*H04L 51/18* (2022.01)

(52) U.S. Cl.
CPC ............ *H04L 9/3247* (2013.01); *H04L 51/18* (2013.01)

(58) Field of Classification Search
CPC ............................ H04L 9/3247; H04L 51/18

USPC ......................................................... 713/170
See application file for complete search history.

(56) References Cited

U.S. PATENT DOCUMENTS

| 6,513,122 B1 | 1/2003 | Magdych et al. |
| 6,640,301 B1 | 10/2003 | Ng |
| 7,657,253 B2 | 2/2010 | Lewis |

(Continued)

FOREIGN PATENT DOCUMENTS

| EP | 2859494 B1 * | 8/2018 | ......... G06F 16/9024 |
| FR | 3045187 | 6/2017 | |

(Continued)

OTHER PUBLICATIONS

Saeed Abu-Nimeh; Bypassing Security Toolbars and Phishing Filters via DNS Poisoning; IEEE: 2008, pp. 1-6.*

(Continued)

*Primary Examiner* — Monjur Rahim
(74) *Attorney, Agent, or Firm* — Camille A. Wilson; Wilson Dutra, PLLC

(57) ABSTRACT

The present disclosure relates to security risk warning system that a recipient may acknowledge and act accordingly. Security insights may be provided explicitly in a security insight panel that may clearly identify vulnerabilities specific to a particular authenticable communication. This may limit risk that a recipient would ignore or not understand the risk. Security insights may be provided for a combination of indicated source, recipients, and content, such as links, text, attachments, and images. Security insights may be provided on site, such as on or proximate to the reviewed portions of the authenticable communication.

19 Claims, 65 Drawing Sheets

Related U.S. Application Data

No. 16/458,693, filed on Jul. 1, 2019, now abandoned.

(60) Provisional application No. 62/809,669, filed on Feb. 24, 2019.

(56) References Cited

U.S. PATENT DOCUMENTS

| | | |
|---|---|---|
| 8,103,875 B1 | 1/2012 | Ramzan et al. |
| 8,505,102 B1 | 8/2013 | Cannings et al. |
| 8,510,820 B2 | 8/2013 | Oberheide et al. |
| 8,578,454 B2 | 11/2013 | Grim |
| 8,966,621 B1 | 2/2015 | Johansson et al. |
| 9,053,310 B2 | 6/2015 | Oberheide et al. |
| 9,077,769 B2 | 7/2015 | Krzeminski et al. |
| 9,118,656 B2 | 8/2015 | Ting et al. |
| 9,282,085 B2 | 3/2016 | Oberheide et al. |
| 9,338,156 B2 | 5/2016 | Oberheide et al. |
| 9,355,231 B2 | 5/2016 | Disraeli |
| 9,356,921 B2 | 5/2016 | Kanov et al. |
| 9,454,656 B2 | 9/2016 | Oberheide et al. |
| 9,582,802 B2 | 2/2017 | Bachenheimer et al. |
| 9,639,825 B1 | 5/2017 | Roth et al. |
| 9,847,874 B2 | 12/2017 | Merdinger et al. |
| 10,129,250 B2 | 11/2018 | Oberheide et al. |
| 10,812,495 B2 | 10/2020 | Traore et al. |
| 10,880,322 B1 | 12/2020 | Jakobsson et al. |
| 11,019,083 B2 * | 5/2021 | Pridgen ................ G06F 21/577 |
| 2003/0236847 A1 | 12/2003 | Benowitz et al. |
| 2004/0181581 A1 | 9/2004 | Kosco |
| 2004/0236838 A1 | 11/2004 | Tout |
| 2005/0144449 A1 | 6/2005 | Voice |
| 2005/0144450 A1 | 6/2005 | Voice |
| 2006/0005329 A1 | 1/2006 | Zager |
| 2006/0200530 A1 | 9/2006 | Tokuda et al. |
| 2007/0005967 A1 | 1/2007 | Mister et al. |
| 2007/0033419 A1 | 2/2007 | Kocher |
| 2007/0186101 A1 | 8/2007 | Ting et al. |
| 2009/0034729 A1 | 2/2009 | Brown et al. |
| 2009/0259840 A1 | 10/2009 | Campbell et al. |
| 2011/0191847 A1 | 8/2011 | Davis et al. |
| 2013/0103944 A1 * | 4/2013 | Adams .................... H04L 51/38 713/168 |
| 2013/0166914 A1 | 6/2013 | Vandervort |
| 2015/0121480 A1 | 4/2015 | Efrati |
| 2015/0149775 A1 | 5/2015 | Gadotti |
| 2016/0277336 A1 | 9/2016 | Sachtjen et al. |
| 2017/0230323 A1 | 8/2017 | Jakobsson |
| 2018/0152461 A1 | 5/2018 | Albisu et al. |
| 2018/0176222 A1 | 6/2018 | Bhaskar et al. |
| 2018/0191771 A1 * | 7/2018 | Newman ................ G06F 21/552 |
| 2018/0191781 A1 * | 7/2018 | Palani .................... G06F 21/552 |
| 2018/0295153 A1 | 10/2018 | Eisen |
| 2019/0199745 A1 | 6/2019 | Jakobsson |

FOREIGN PATENT DOCUMENTS

| | | | | |
|---|---|---|---|---|
| JP | 2005520230 A | * | 5/2020 | ......... G06F 16/9024 |
| WO | 2017/001972 | | 1/2017 | |

OTHER PUBLICATIONS

PCT/US2020/019196 Search Report and Written Opinion dated Jul. 1, 2020.
Jan. 29, 2020 Non-Patent Literature—Search Results.
Dec. 13, 2019 Non-Patent Literature—Search Results.
Nov. 8, 2019 Non-Patent Literature—Search Results.
Longe, O.B.; Enhanced Content Analysis of Fraudulent Nigeria Electronic Mails Using e-STAT; IEEE:2009; pp. 238-243.

* cited by examiner

2800

2900

3400

3400

SYSTEM AND APPARATUS FOR PROVIDING AUTHENTICABLE ELECTRONIC COMMUNICATION

CROSS-REFERENCE TO RELATED APPLICATION

This application is a continuation-in-part and claims priority to and the full benefit of currently pending U.S. Nonprovisional patent application Ser. No. 17/376,260 (filed Jul. 15, 2021, and titled "SYSTEM AND APPARATUS FOR PROVIDING AUTHENTICABLE ELECTRONIC COMMUNICATION"), which was a Continuation in Part of patented U.S. Nonprovisional patent application Ser. No. 17/112,432 (filed Dec. 4, 2020, and titled "SYSTEM AND APPARATUS FOR PROVIDING AUTHENTICABLE ELECTRONIC COMMUNICATION"), which was a Continuation in Part of patented Nonprovisional Patent application Ser. No. 16/858,315 (filed Apr. 24, 2020, and titled "SYSTEM AND APPARATUS FOR PROVIDING AUTHENTICABLE ELECTRONIC COMMUNICATION"), which was a Continuation in Part of patented Nonprovisional Patent application Ser. No. 16/548,178 (filed Aug. 22, 2019, and titled "SYSTEM AND APPARATUS FOR PROVIDING AUTHENTICABLE ELECTRONIC COMMUNICATION"), which was a Continuation of abandoned Nonprovisional Patent application Ser. No. 16/458,693 (filed Jul. 1, 2019, and titled "SYSTEM AND APPARATUS FOR PROVIDING AUTHENTICABLE ELECTRONIC COMMUNICATION"), which claimed priority to and the full benefit of U.S. Provisional Patent Application Ser. No. 62/809,669 (filed Feb. 24, 2019, and titled "SYSTEM AND APPARATUS FOR PROVIDING AUTHENTICABLE ELECTRONIC COMMUNICATION"), the entire contents of which are incorporated in this application by reference.

BACKGROUND OF THE DISCLOSURE

Phishing occurs when an individual, group, or pre-programmed artificial intelligence (the "sender") fraudulently attempts to obtain a recipient's personal or business information, such as credit card numbers, data, or passwords. Phishing generally involves the sender sending an email or other message to the recipient, the recipient opening that message, and the recipient going to unsecured links that then allow the sender to obtain the information or cause technological issues (such as downloading ransomware).

The average phishing victim faces large financial losses, either from the sender stealing banking information, requesting large ransom amounts, or the recipient generally recovering from a phishing attack. On the lower end of monetary loss, one in three victims pays ransom, which averages around $84,000. If a sender chooses, instead, to steal directly from the accounts that they were given access to through the attack, this may cost the recipient millions of dollars. In the U.S., laws require a phishing victim to inform its customers of any attacks, which, alone, cost around $740,000. A recent IBM report claims that the average successful phishing attempt costs the recipient around $8 million in the U.S. (and about half of that for international recipients).

Additionally, phishing attacks may harm the recipient in non-financial ways. A data breach of any kind may harm the recipient's reputation, especially if the recipient is known or used specifically for its data security. This may cause current customers to flee to other companies, potential customers to look elsewhere, and a lack of confidence in the company's overall abilities.

One of the simpler ways to prevent phishing is to educate employees on how to avoid falling into a sender's traps. Training may be costly for a larger company if seeking outside help, but this cost pales in comparison to the loss a company faces if involved in a phishing attack. Even with training, however, human error is no match for some phishing attempts. Ninety-seven percent of email users are unable to identify a sophisticated phishing message. These messages may come from seemingly reputable email addresses, sometimes even having the same domain as the recipient.

The problem continues even for less sensitive, but still incredibly critical, communications. Employees are now warned that, because of the sophistication of external technologies and techniques like phishing, not to click on certain emails or not to click on links within an email, even when those emails are purportedly from someone within their own company. This is compounded when an employee regularly receives communication from someone like a financial officer who has time constraints on closing a matter that involves money and expects the employee to diligently follow through on their requests. Sometimes the volume is such that it does not make sense for the financial officer to personally appear and make each request to the employee.

Some websites or plug-ins may warn a user when they receive a suspect email or might be heading to an unsecured website. However, a collaborative study between Brigham Young University and Google Chrome found that 87 percent of people ignored warning messages while transferring information, 79 percent ignored the message while watching a video, and 74 percent ignored the message while they were on their way to close out a window. The risk of ignoring warnings is only exacerbated when a user constantly receives standard or generic warnings for emails.

SUMMARY OF THE DISCLOSURE

What is needed is an effective security risk warning system that a recipient may actually acknowledge and act accordingly. Security insights may be provided explicitly in a security insight panel that may clearly identify vulnerabilities specific to a particular authenticable communication. This may limit risk that a recipient would ignore or not understand the risk. Security insights may be provided for a combination of indicated source, recipients, and content, such as links, text, attachments, and images. Security insights may be provided on site, such as on or proximate to the reviewed portions of the authenticable communication. In some implementations, a risk assessment system may exist as an external application or may be a plug in for existing authenticable communication access technology, such as local software applications, cloud services, or browsers, as non-limiting examples.

The present disclosure relates to a computer-implemented method for providing security insights for an authenticable communication. In some aspects, corresponding computer systems, apparatus, and computer programs recorded on one or more computer storage devices, may be configured to perform the actions of the methods. Implementations of the described techniques may comprise hardware, a method or process, or computer software on a computer-accessible medium.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods.

The present disclosure relates to a computer-implemented method for confining an authenticable communication until it may be authenticated. In some embodiments, the computer-implemented method may include accessing an authenticable communication that may comprise an indicated source, at least one recipient, and content, where the authenticable communication may comprise an electronic communication accessible via an access device; identifying the indicated source; identifying the content; assessing indicated source security risk; assessing content security risk; determining whether at least one of: the content, the at least one recipient, and the indicated source may comprise at least one security risk; and redirecting the authenticable communication to a separated server.

In some implementations, the method may comprise identifying content types within the content, where the content types may comprise at least two or more of text, images, attachments, or links; separating portions of the content by content types, where the assessing of the content security risk may be based on predefined criteria associated with content types; identifying the indicated source may comprise at least a review of a sender email address; developing content security insights and indicated source security insights for the authenticable communication, where security insights may comprise results of assessing content security risk and assessing indicated source security risk; generating a rendering of the authenticable communication to create proxy content; and presenting the proxy content to the at least one recipient, where the proxy content may comprise at least one of the content security insights and the indicated source security insights.

In some aspects, the proxy content may comprise at least a portion of the content. In some embodiments, the proxy content appends duplicate authenticable communication received from the same indicated source. In some implementations, the authenticable communication may be authenticated by a confirmation. In some aspects, approval of the confirmation releases the authenticable communication from the separated servers and allows the authenticable communication to be received by the at least one recipient. In some embodiments, the confirmation may be activated automatically after a predetermined period of time has lapsed with the authenticable communication in the separated server.

In some implementations, a response to the confirmation activates automated retention of the authenticable communication within at least one independent confinement database within the separated server. In some aspects, the security insights may comprise a third-party software integration that supplements the confirmation. In some embodiments, the third-party software integration provides at least partial authentication for the authenticable communication. In some implementations, the security insights may comprise information received from the third-party software integration. In some aspects, the at least one recipient may comprise a proxy recipient.

In some aspects, the method further may comprise identifying the at least one recipient; assessing a recipient security risk of the at least one recipient; developing recipient security insights for the at least one recipient, where the recipient security insights may comprise results of assessing the recipient security risk; and sending the authenticable communication back to the indicated source along with the recipient security insights. In some embodiments, upon determination that the indicated source may comprise the at least one security risk, any authenticable communication from the indicated source may be redirected to the separated server.

In some implementations, one or more previously received authenticable communication from the indicated source may be moved to the separated server. In some aspects, the separated server may comprise at least one independent confinement database for storage and retention of authenticable communication determined to may comprise at least one security risk. In some embodiments, the redirected authenticable communication may be accessible on the separated server. In some implementations, the redirected authenticable communication may be releasable from the separated server by the recipient.

The present disclosure relates to a risk assessment system that may include one or more processors; one or more memory resources may comprise an authentication mechanism database; an indicated source database; a confinement database; and where the one or more memory resources are connectable to one or more external devices through a communications network, where at least one of the one or more external devices may comprise an authenticable communication transmittal mechanism and at least one of the one or more external devices may comprise an authenticable communication receiving mechanism, authenticable communication transmittal mechanism, and at least one of the one or more external devices may comprise separate and independent from all other databases an authenticable communication receiving mechanism, where the confinement database may be contained within a separated server and may be logically and physically separate and independent from all other databases, where the one or more memory resources are executable by the one or more processors to perform the steps of accessing an authenticable communication may comprise an indicated source, at least one recipient, and content; determining whether at least one of: the content, the at least one recipient, and the indicated source may comprise at least one security risk, the content, the at least one recipient, and the indicated source may comprise at least one security risk; redirecting the authenticable communication to the separated server; identifying the content. The risk assessment system to includes identifying content types within the content, where the content types may comprise at least two or more of text, images, attachments, or links; separating portions of the content-by-content types.

In some embodiments, the risk assessment system may include assessing content security risk of the content based on predefined criteria associated with content types; identifying the indicated source may comprise at least a review of a sender email address, assessing indicated source security risk. In some implementations, the risk assessment system includes developing content security insights and indicated source security insights for the authenticable communication, where security insights may comprise results of assessing content security risk and assessing indicated source security risk; generating a rendering of the authenticable communication to create proxy content; and presenting the proxy content to the at least one recipient, where the proxy content may comprise at least a portion of the content and at least one of: the content security insights and the indicated source security insights.

In some aspects, the system where the one or more memory resources are executable by the one or more processors to perform additional steps of identifying the at least one recipient; assessing a recipient security risk of the at least one recipient; developing recipient security insights for the at least one recipient, where the recipient security insights may comprise results of assessing the recipient security risk; and sending the authenticable communication back to the indicated source along with the recipient security insights.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

Figure 1:
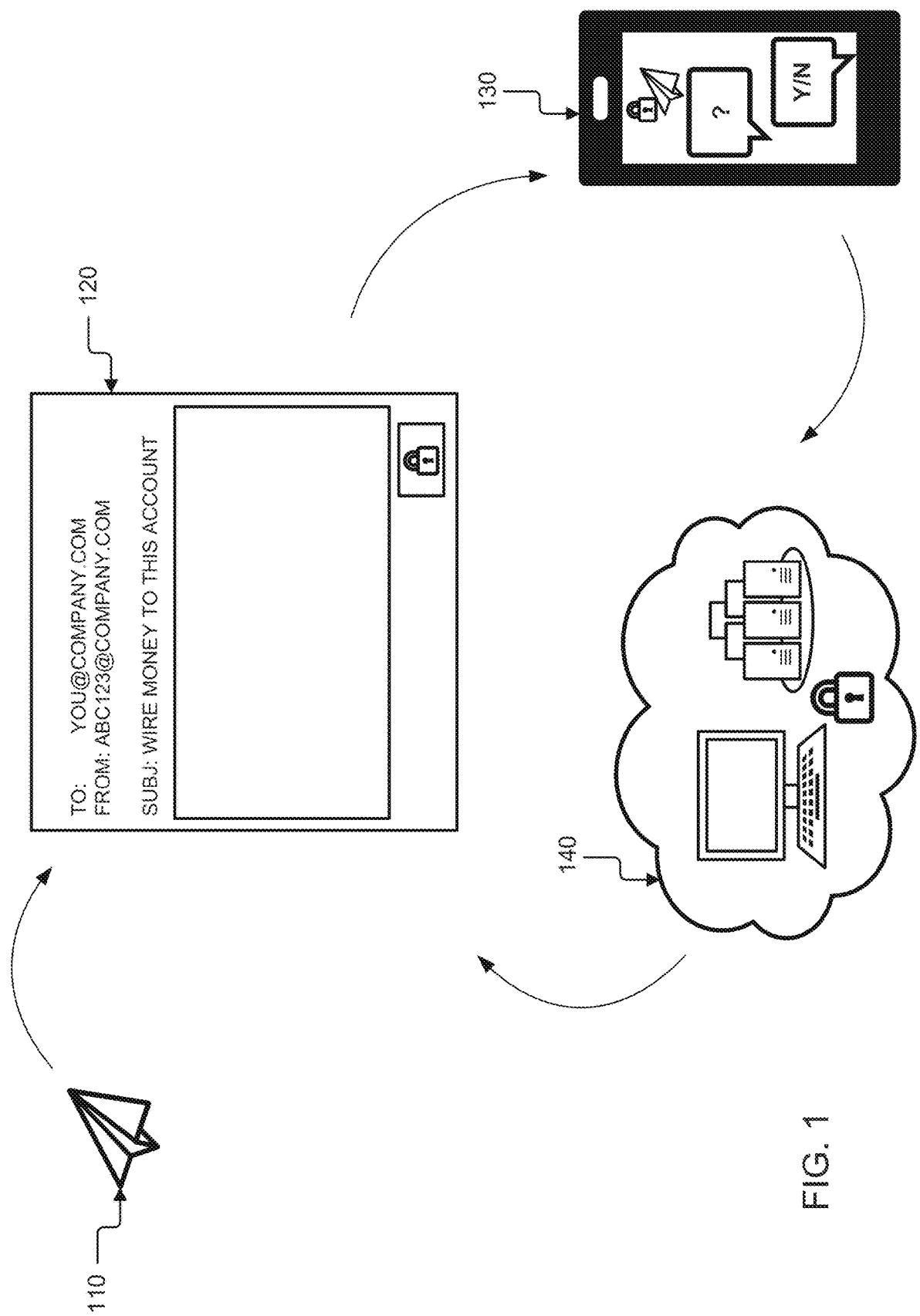
FIG. 1 illustrates an exemplary system of source authentication of an authenticable communication, according to some embodiments of the present disclosure.

The present disclosure provides generally for system and method of authenticating a source of electronic communication. According to the present disclosure, authenticable communications may allow for authentication of a source of the electronic communication, which may limit potential damage caused by fraudulent communications. In some aspects, an authenticable communication may allow the recipient to confirm that the indicated source is the actual source of the authenticable communication. In some embodiments, the authentication may not require an exchange of encrypted communications or an exchange of communications solely within the same communication system. Authenticable communications may provide a separate layer of security that may allow a recipient to review the contents with confidence that the communication is not fraudulent. Further, authenticable communications may provide the additional security without requiring specialized software.

In the following sections, detailed descriptions of examples and methods of the disclosure will be given. The description of both preferred and alternative examples though thorough are exemplary only, and it is understood that to those skilled in the art variations, modifications, and alterations may be apparent. It is therefore to be understood that the examples do not limit the broadness of the aspects of the underlying disclosure as defined by the claims.

Glossary

Authenticable Communication: as used herein refers to an electronic communication with at least one source authentication mechanism. In some aspects, an electronic communication may comprise a direct communication from a source to a recipient, such as an email, telemedicine, teleconferencing, video conferencing, or reservations. In some embodiments, an electronic communication may not have a specific recipient, such as a video, social media post, ad, video games, or article. In some implementations, an authenticable communication may be sent through an authenticable communication transmittal mechanism, such as an email application, enterprise application, authentication module, or other communication system.

Authentication Screen: as used herein refers to a screen that may at least partially obscure content in an authenticable communication, wherein the authentication screen may be removed when the authenticable communication is authenticated. In some embodiments, the authentication screen may be removed when one or both the sender or recipient is authenticated. In some implementations, the content of an authenticable communication may comprise attachments, text, images, links, or fillable forms, as non-limiting examples. In some embodiments, an authentication screen may comprise a message that may provide authentication information to a recipient, such as the purpose of the authentication screen, a prompt to authenticate, or an indication of the contents, as non-limiting examples.

Source Authentication: as used herein refers to verifying or confirming the source of an electronic communication. In some aspects, the source may be an individual person, such as a sender of an email or an author of an article. In some embodiments, the source may be an entity, such as an enterprise, business, or group. In some implementations, source authentication may occur by comparing an indicated source of an authenticable communication with the actual source. In some embodiments, the authenticable communication may further allow for verification that the recipient was the intended recipient.

Indicated Source: as used herein refers to an indicated source of an authenticable communication. For example, an indicated source may comprise an email address of a sender. In some aspects, a source may be indicated through branding or labeling on or near the authenticable communication. For example, an indicated source may comprise a person associated with a known social media handle, wherein the social media handle may be the apparent poster of a social media post. As another example, an indicated source may comprise an entity associated with a logo, wherein the logo may be embedded in a video.

Actual Source: as used herein refers to the true source of an authenticable communication. In some aspects, source authentication may confirm the indicated source and the actual source are the same. In some embodiments, source authentication may reject the indicated source and may find that the actual source of the authenticable communication is not the indicated source.

Security Insights: as used herein refers to an analysis of potential security risks of an authenticable communication. In some aspects, security insights may comprise an analysis of content within an authenticable communication, such as text, links, images, or attachments. In some embodiments, security insights may comprise an analysis of email addresses, such as those associated with a sender, a recipient, or reply address. In some implementations, security risk may be defined by rules, such as policies, compliance standards, and protocols. For example, compliance standards may control how a document with identifying information may be transferred, and security insights may identify and assess whether compliance standards are met. In some aspects, security insights may provide directive information about inbound and outbound authenticable communication. In some embodiments, security insights may provide feedback on server hygiene.

Security Insight Panel: as used herein refers to a separate display of security insights for an authenticable communication. In some aspects, a security insight panel may be integrated within one or both an authenticable communication or an authenticable communication access system, such as an application or browser. In some embodiments, a security insight panel may be pulled out of the authenticable communication and moved independently from the authenticable communication access system. In some implementations, a security insight panel may be paired with security insights provided with content of an authenticable communication, which may allow a user to view a separate summary of security insights in conjunction with security insights provided within the authenticable communication. In some aspects, a security insight panel may automatically populate when a recipient receives or opens an authenticable communication. In some embodiments, a security insight panel may be manually activated to review an authenticable communication, such as by a recipient, sender, or authorized user. A security insight panel may comprise a separate window or program that may have permissions to access one or more types of authenticable communications, such as those received through a predefined access method.

Risk Assessment System: as used herein refers to one or more computing systems configured to identify content types and indicated source of an authenticable communication and assess levels of security risk for at least the indicated source and a portion of the content types. A risk assessment system provides security insights for authenticable communications. In some embodiments, a risk assessment system may identify different content types, such as text, image, attachment, or links. The content type may determine the analysis and risk assessment technique. For example, text may be analyzed for linguistics through natural language processing, and attachments may be analyzed for executable programming that may run a function when opened or downloaded. Identifying the different types of content may allow for refined and more precise security insights than if each content type was analyzed through the same techniques.

On Site: as used herein refers to security insights that are provided directly on or proximate to the actual site of risk. For example, an on-site security insight for an indicated source may highlight the email address and have a call out proximate to the email address that provides the security insights. As another example, on-site security insights for content may be directly provided in conjunction with the content. A risk assessment system may identify text in the content and may underline any areas of text that are suspicious, such as use of a lowercase "L" or number "1" instead of an uppercase "I".

Confinement: as used herein refers to a process of intercepting authenticable communication from an indicated source and storing the authenticable communication in a secondary location. In some embodiments, confinement may comprise a plurality of automated security protocols that allow authenticable communication to automatically be assessed and confined if there are potential security risks within the authenticable communication. In some implementations, the confinement may comprise a content capturing process that allows confinement to send a release proxy content to the intended recipient. In some aspects, the proxy content may comprise an image or rendering of the content of confined authenticable communication. In some embodiments, the proxy content may comprise a notification designed to inform the recipient of the status of the confined authenticable communication. In some implementations, confinement may release authenticable communication via approval or manual release from the recipient or verification from the indicated source.

Referring now to FIG. 1, an exemplary system of source authentication of an authenticable communication 120 is illustrated. In some aspects, a source 110 may comprise a person or entity. In some embodiments, the authenticable communication 120 may comprise an indicated source, recipient, subject, and text body. In some implementations, the recipient may want to authenticate the source of the authenticable communication 120, such as where the authenticable communication 120 may include personal information, financial instruction, or other private communication.

In some aspects, a recipient may request source authentication, such as by clicking an icon within the email application. In some implementations, an authentication request may be transmitted to an indicated source 130. In some embodiments, a source authentication may comprise sending a text message to a phone number associated with the indicated source 130. In some aspects, a profile may be associated with a source, which may allow for the transmission of authentication requests when the indicated source is associated with the profile.

In some implementations, the response to the authentication request may be transmitted to an authentication system 140. In some aspects, the result of the authentication result may be transmitted back to the recipient. For example, a positive result may change an icon to a green check mark, and a negative result may change an icon to a red stop sign, which may indicate that the indicated source is not the actual source, such as through spoofing.

Figure 2A:
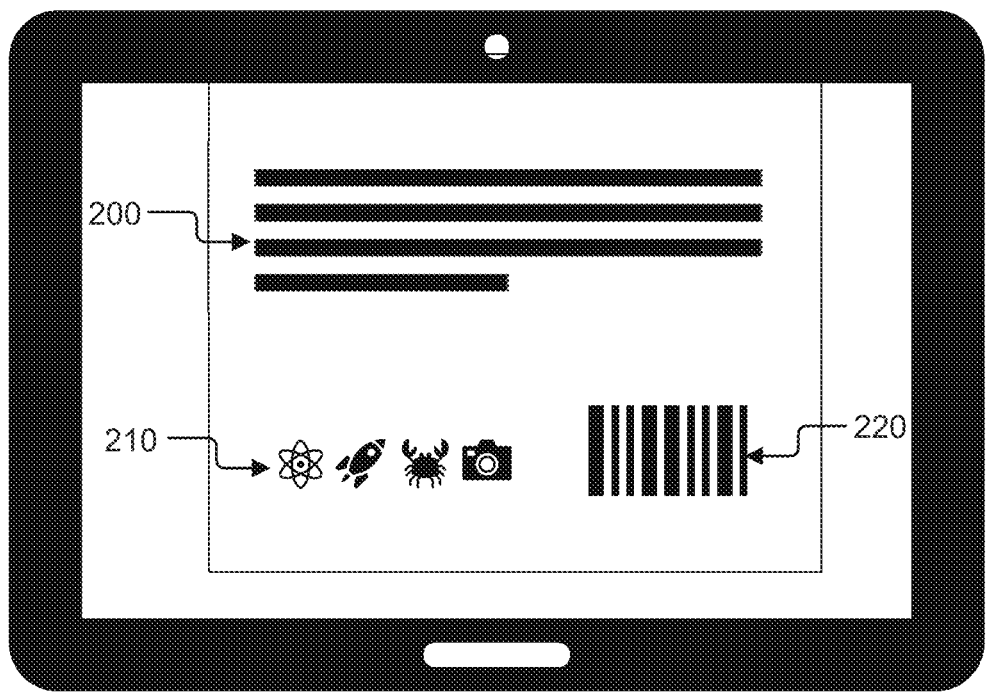
FIG. 2A illustrates an exemplary authenticable communication with an icon authentication and barcode authentication, according to some embodiments of the present disclosure.
Figure 2B:
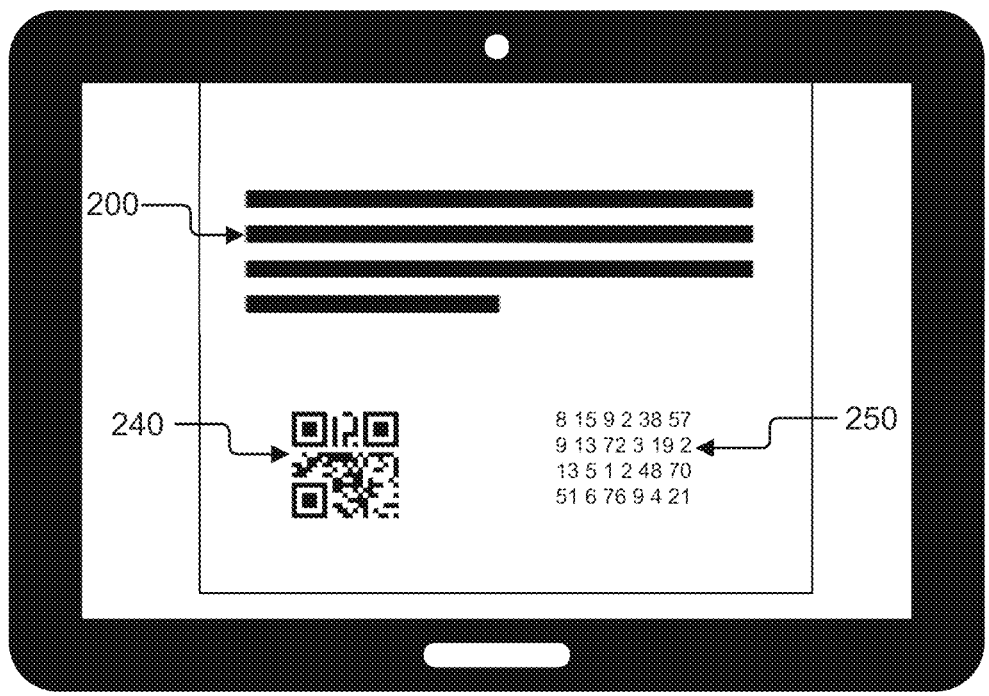
FIG. 2B illustrates an exemplary authenticable communication with a QR code authentication and a numeric grid, according to some embodiments of the present disclosure.

Referring now to FIG. 2A, an exemplary authenticable communication 200 with an icon authentication 210 and barcode authentication 220. Referring now to FIG. 2B, an exemplary authenticable communication 200 with a QR code authentication 240 and a numeric grid 250. In some aspects, the authenticable communication 200 may comprise a phone number that a recipient may call to confirm that the indicated sender is the actual sender. As part of the authentication, the phone number may connect the recipient to an authentication system. The authentication system may be automated, personal, or combinations thereof. The authentication system may confirm at least a portion of the authentication, such as for the icon authentication 210 or numeric grid 250.

In some embodiments, customer service may send an authenticable communication to a customer who is calling in as a substitute for requesting for confidential information. For example, typically, customer service may request a portion of the customer's social security number, and instead, by request or as part of a standard protocol, customer service may send the authenticable communication and request that the customer provide a portion of an identifier within the authenticable communication. This may limit exchange of personal and confidential information.

In some aspects, the authenticable communication 200 may comprise a physical document, such as a letter sent through the mail. In some embodiments, an authenticable communication 200 may be scanned to read a barcode authentication 220. Depending on the indicated source, the scanning may occur through an enterprise software or through a centralized software that may process authenticable communications 200 for multiple indicated sources. For example, the IRS or a large bank may provide an internal authentication module within their existing application or website. Hosting the programming within the enterprise may increase the sense of security and confidence a recipient may have in the authentication. It may also keep the data internal without requiring exchange of personal data or secure information through external servers.

In some implementations, the authenticable communication 200 may be split into multiple communications, which may comprise combinations of digital correspondence and paper correspondence. For example, a recipient may receive a physical letter with the icon identification 210 prompting the recipient to log into their account for the contents of their authenticable communication 200, which may only be accessible once the recipient correctly inputs the requested icons from the icon identification 210. Similarly, a recipient may receive a digital email with the icon identification 210 that may prompt the recipient to log into a portal to retrieve the content of the authenticable communication. In some aspects where the authenticable communication 200 may comprise multiple parts, the parts combined may be considered the authenticable communication. In some embodiments where the authenticable communication 200 may comprise multiple parts, at least some of the separate parts may be considered separate authenticable communications, including secondary authenticable communications.

In some embodiments, the authenticable communication 200 may comprise a product label that a recipient or potential purchaser may scan to authenticate the indicated source as well as other product characteristics. For example, a recipient may want to verify whether a product is actually from the manufacturing company associated with a brand and not a knock off. As another example, a recipient may want to verify a quality of the product, such as a manufacturing origin, certifications, or general authenticity. In some aspects, actual sources may provide an authentication module or participate in a collective authentication module where recipients may authenticate authenticable communications 200.

Figure 3:
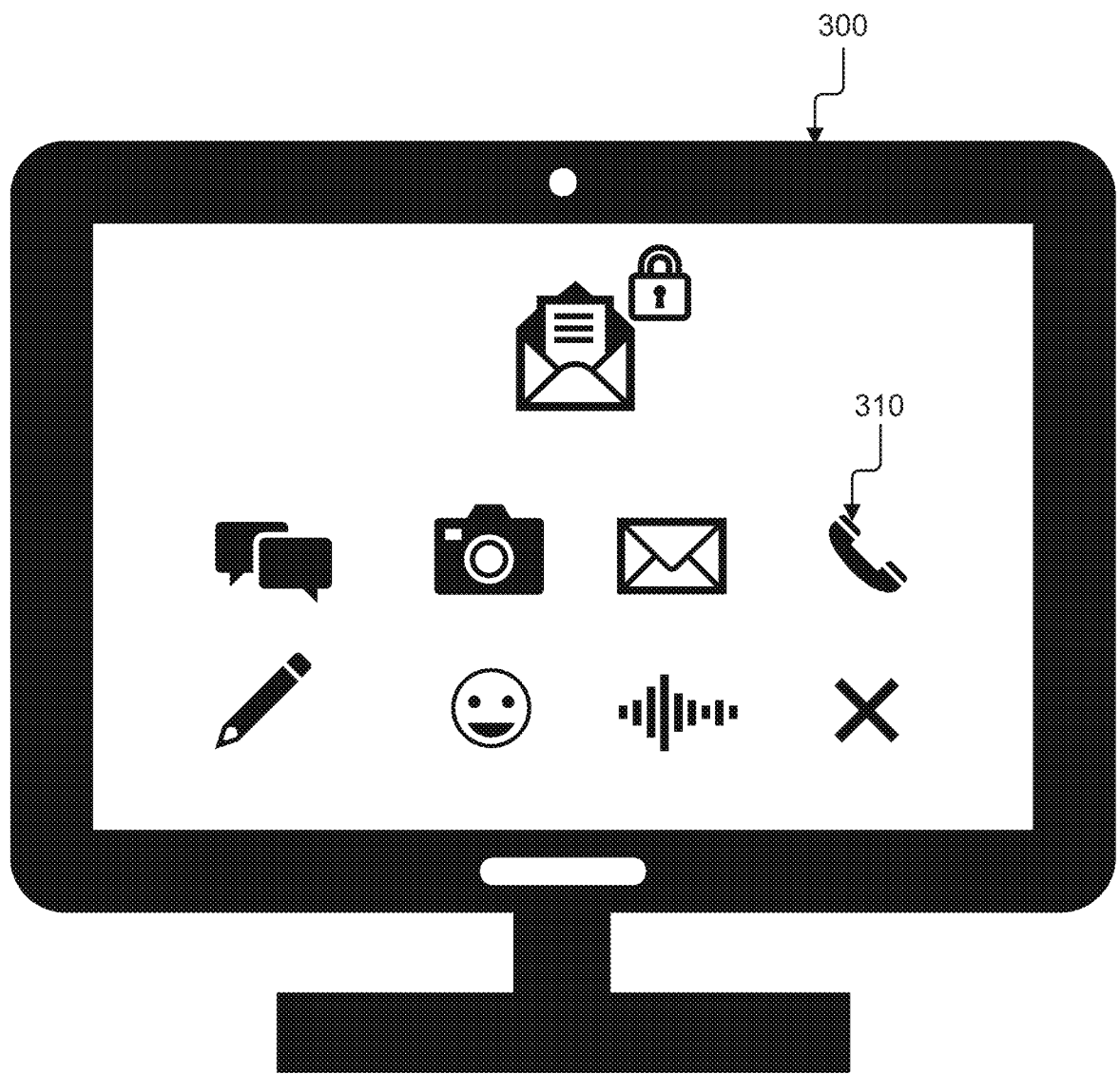
FIG. 3 illustrates an exemplary graphical user interface (GUI) for an authentication system, according to some embodiments of the present disclosure.

Referring now to FIG. 3, an exemplary graphical user interface (GUI) 300 for an authentication system is illustrated. In some aspects, the method of authentication 310 may be customizable, such as by a source, recipient, authentication application, or source enterprise, as non-limiting examples. In some embodiments, the GUI 300 may allow a source to pre-select methods of authentication 310, which may include text, image capture, email, phone call, handwriting recognition, facial recognition, or voice recognition, as non-limiting examples.

Where the source may pre-select methods of authentication 310, the source may also provide the base data for the methods of authentication 310. For example, the source may provide the best phone number or email address where the method of authentication 310 may comprise text or email. As another example, the method of authentication 310 may comprise facial recognition, and the GUI 300 may prompt facial capture to store the authenticating facial data. As another example, where the methods of authentication 310 may comprise voice or handwriting recognition, the GUI 300 may prompt input of baseline data. For voice recognition, the source may be prompted to speak a list of words or sounds, which may allow for a randomized authentication. For handwriting recognition, the source may be prompted to write a series of words or letters.

In some embodiments, the GUI 300 may be provided to a recipient or viewer, which may allow the recipient or viewer to select their preferred method of authentication 310. In some aspects, the selection of the method of authentication 310 may be pre-set as a standard for authenticable communications. In some implementations, the selection may occur for each authenticable communication. In some aspects, the methods of authentication 310 may be ranked by preference, wherein the authentication system may offer the method of authentication 310 with the highest ranking if there are multiple methods of authentication 310 offered with the authenticable communication.

As an illustrative example, a recipient may prefer text authentication, facial recognition authentication, then phone call authentication. Where an authenticable communication may provide either phone call authentication or text authentication, the authenticating system may offer the recipient only the text authentication. Where an authenticable communication may only offer handwriting authentication, the recipient may still be given the option to request the authentication based on handwriting authentication.

In some aspects, a recipient may decide to not authenticate an authenticable communication. Were the recipient to decline authentication, one or both the authenticable communication and authentication system may contain or provide a disclaimer of liability related to the content within the authenticable communication. Where the authentication system may be integrated as an add-on to a communication system, the unauthenticated communication may be highlighted or flagged as potentially fraudulent until or unless the recipient successfully authenticates the communication.

In some embodiments, a source may refuse to authenticate or an authentication may fail. In those cases, the recipient may receive a failure notification that warns against downloading, clicking, or performing any requested action prompted by the authenticable communication. In some aspects, such as through an add-on feature to a communication application, a failed authentication may cause a cautionary step, such as automatically deleting, blurring, or disabling the authenticable communication. In some implementations, such as where the authentication is controlled by an enterprise, a failure may further prompt reporting the failure to a regulating body, such as to an IT department, compliance department, or to the authentication system, as non-limiting examples. The reporting may flag one or more the type of authenticable communication, the authenticable communication, or indicated source of the authenticable communication as potentially fraudulent.

For example, an enterprise source may be an indicated source for a mass distribution authenticable communication. As authentications fail for the authenticable communication, a reporting may allow the enterprise to take precautionary steps to limit any damage caused by the fraudulent communication. The enterprise may send out an alert to potential recipients to ignore and delete the fraudulent communication. Where practical, the enterprise may revoke the fraudulent communication.

As another example, an individual source may be an indicated source for an authenticable communication requesting a transfer of funds to a specific account through an included link. A failed authentication may alert the individual that their systems may have been corrupted, hacked, or compromised in some way. The individual may be able to store the fraudulent communication with their profile as a mechanism to potentially identify patterns of fraud. For example, if a second authentication fails with the same content, the authentication system may be able to identify a pattern, which may allow for a better understanding of the fraudulent communication.

In some aspects, the authentication system may link or share fraud data between users, which may allow for the anticipation of fraudulent communications. For example, the authentication system may identify an enterprise phishing scam email. One or both the language and the actual source may be stored and flagged, wherein similar emails received from different enterprises or users may be more easily identified as fraud. In some embodiments, the authentication system may be accessed through a subscription model, such as by allowing a fixed number or type of authentication.

Figure 4:
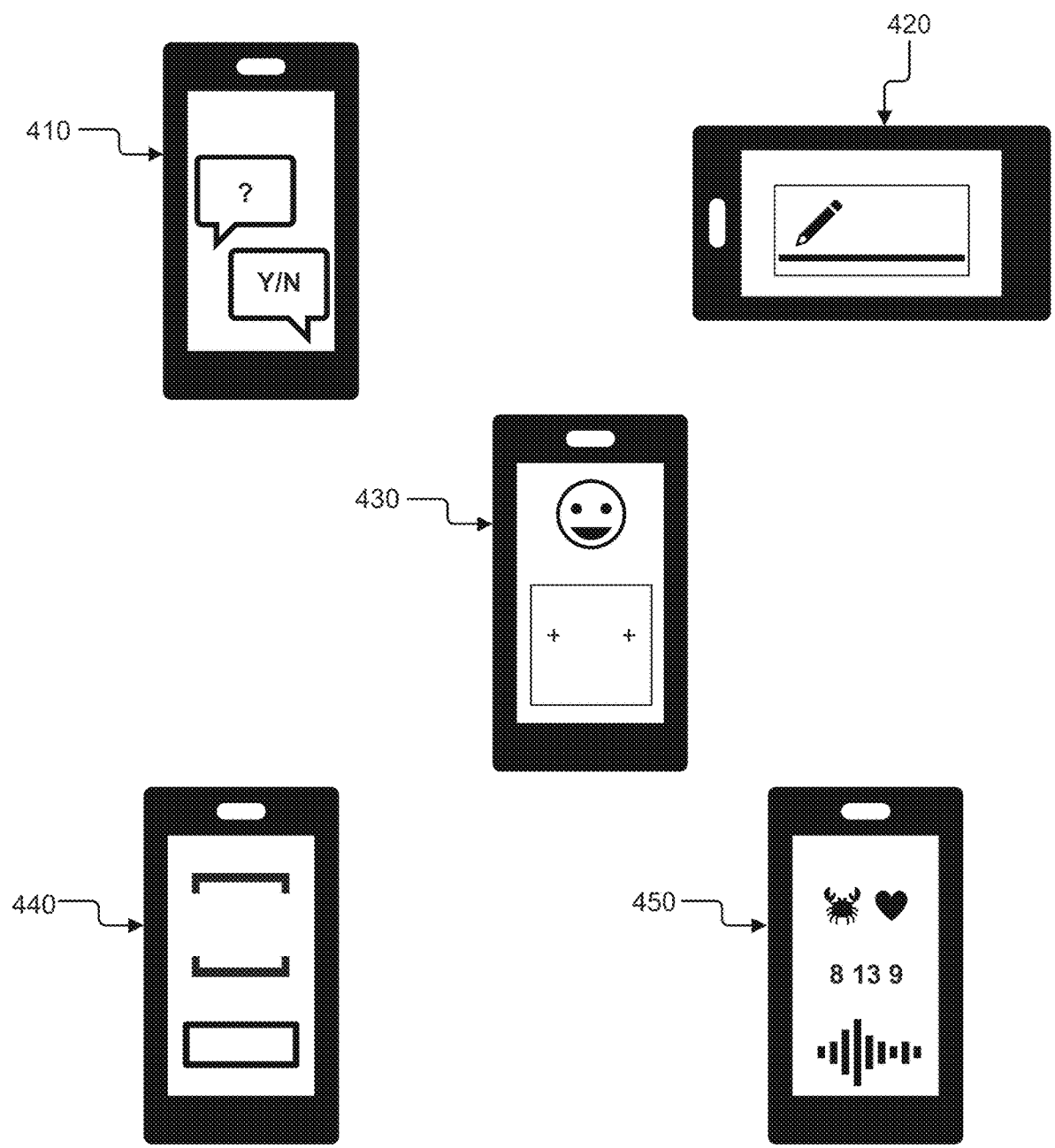
FIG. 4 illustrates exemplary authentication methods, according to some embodiments of the present disclosure.

Referring now to FIG. 4, exemplary authentication methods 410, 420, 430, 440, 450 are illustrated. In some aspects, a method of authentication may depend on user settings, recipient communication settings, authenticable communication settings, source communication settings, authentication application. In some embodiments, the authentication application may comprise a separate authentication application or portal, a feature within an enterprise application, or an add-on feature within the communication system.

In some implementations, authenticable communication may require multiple levels of authentication. In some aspects, one or more a source, recipient, or platform may set the number and types of authentication. In some embodiments, there may be a default authentication method, such as a handwriting recognition 420, bar code recognition 440, text authentication 410, or voice recognition, wherein the authentication data may be stored with a source profile. In some implementations, a recipient may request a separate type of authentication, which may or may not be verified or stored with the source profile. For example, a recipient may request a facial recognition snapshot 430, which may allow the recipient to confirm the source independently. Randomized or custom authentication requests may provide a further layer of protection against fraud.

In some aspects, an authenticable communication may require a multi-layered authentication 450, such as requiring an icon selection, numeric matching, and voice recognition. A multi-layered authentication 450 may provide increased security against fraud. For example, a multi-layered authentication 450 may be useful where the authenticable communication may be requesting a financial transaction, social security number, or other action related to confidential information or finance.

Figure 5A:
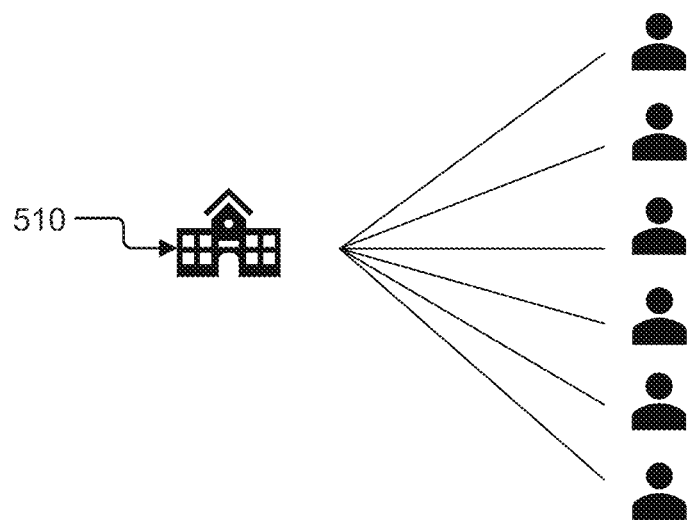
FIG. 5A illustrates an exemplary transmission of electronic communication from an enterprise source to external recipients, according to some embodiments of the present disclosure.
Figure 5B:
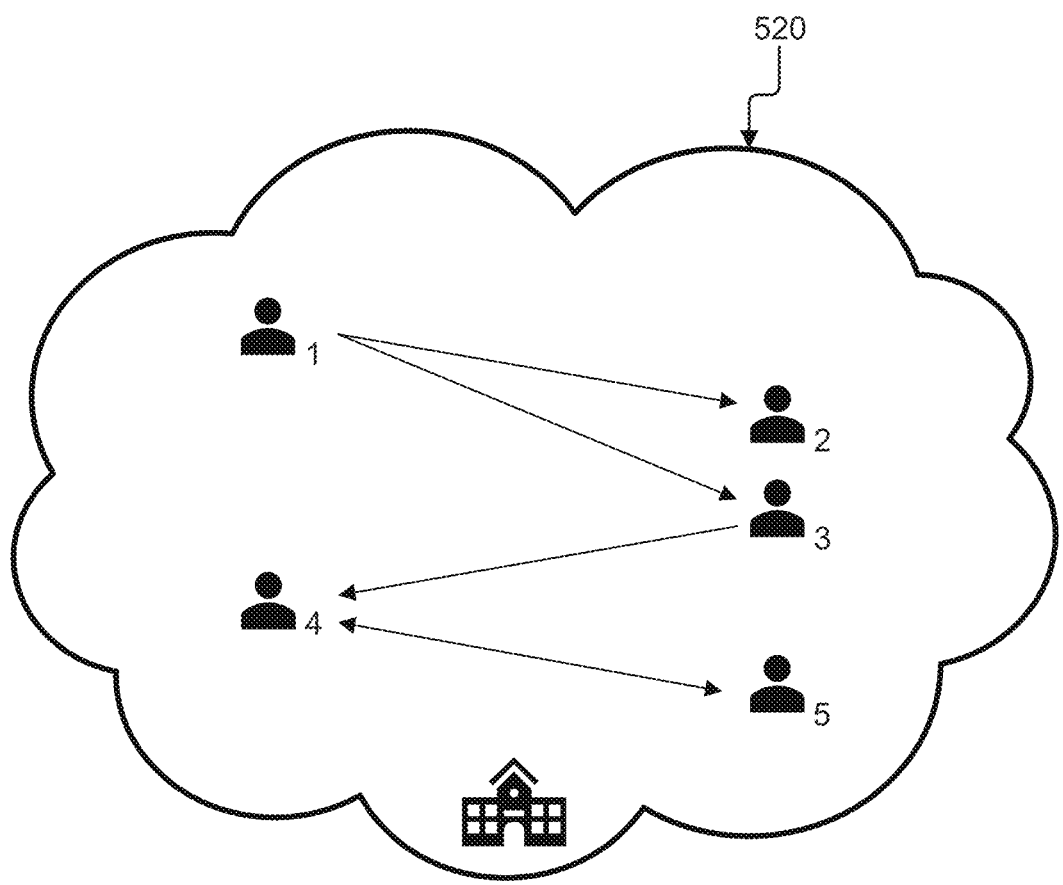
FIG. 5B illustrates an exemplary transmission of electronic communication between sources and recipients within an enterprise, according to some embodiments of the present disclosure.

Referring now to FIG. 5A, an exemplary transmission of electronic communication from an enterprise source 510 to external recipients is illustrated. Referring now to FIG. 5B, an exemplary transmission of electronic communication between sources and recipients within an enterprise 520. In some aspects, electronic communication from an enterprise source 510 may be sent to multiple recipients, wherein the recipients may want to know whether the communication is from the enterprise source 510 and not necessarily the person who may have sent it. In some embodiments, the source in communications within an enterprise 520 may be individuals, such as employees. In some implementations, the source within an enterprise may comprise departments, such as from human resources or compliance.

In some embodiments, communications within an enterprise 520 may have hierarchies of authentication. For example, a low-level employee may never send authenticable communication as their communications may never contain secure information, and each of their communications may be marked as non-authenticable, which may provide sufficient warning to any recipients that their communications should not contain confidential information. A manager may periodically send confidential information and may designate authenticable communication based on the contents of each communication. Employees from the human resources department may only send authenticable communications because all or most of their communications may relate to confidential or personal data. Employees from the finance department may only receive authenticable communications internally, which may limit the effectiveness of fraudulent internal instructions.

In some aspects, the authentication may occur on the backend of the communication exchange, wherein the sources may not be required to take an additional step to authenticate a communication. In some implementations, the authentication may occur through a third party, such as through a call center, an authentication system, or controlling department, as non-limiting examples. For example, the IT department may be responsible for authentications. In some embodiments, failed authentications may prompt further action, such as investigation, blocking of the indicated source, or blocking of the actual source, as non-limiting examples. Blocking the indicated source may be temporary until the cause of the breach is further understood.

In some embodiments, the authentication may occur one way or two way. For one-way authentication, only the source may be authenticated, and for two-way authentication, both the source and the recipient may be authenticated. Two-way authentication may be useful to confirm the correct person received the authenticable communication. Further, two-way communication may allow for the open exchange of communications where the recipient may reply to the authenticable communication and become the indicated source of the reply.

For example, a health care provider may transmit a document with information protected by HIPAA to a patient. It may be helpful or required to stay compliant to verify both the source and the recipient, which may occur automatically, manually, or a combination. A source authentication may occur automatically once the authenticable communication is transmitted, and the recipient authentication may be initiated by opening the authenticable communication. At least a portion of the contents of the authenticable communication, such as the personal or confidential material, may be obscured or blocked to the recipient until both the source and recipient are authenticated.

Figure 6:
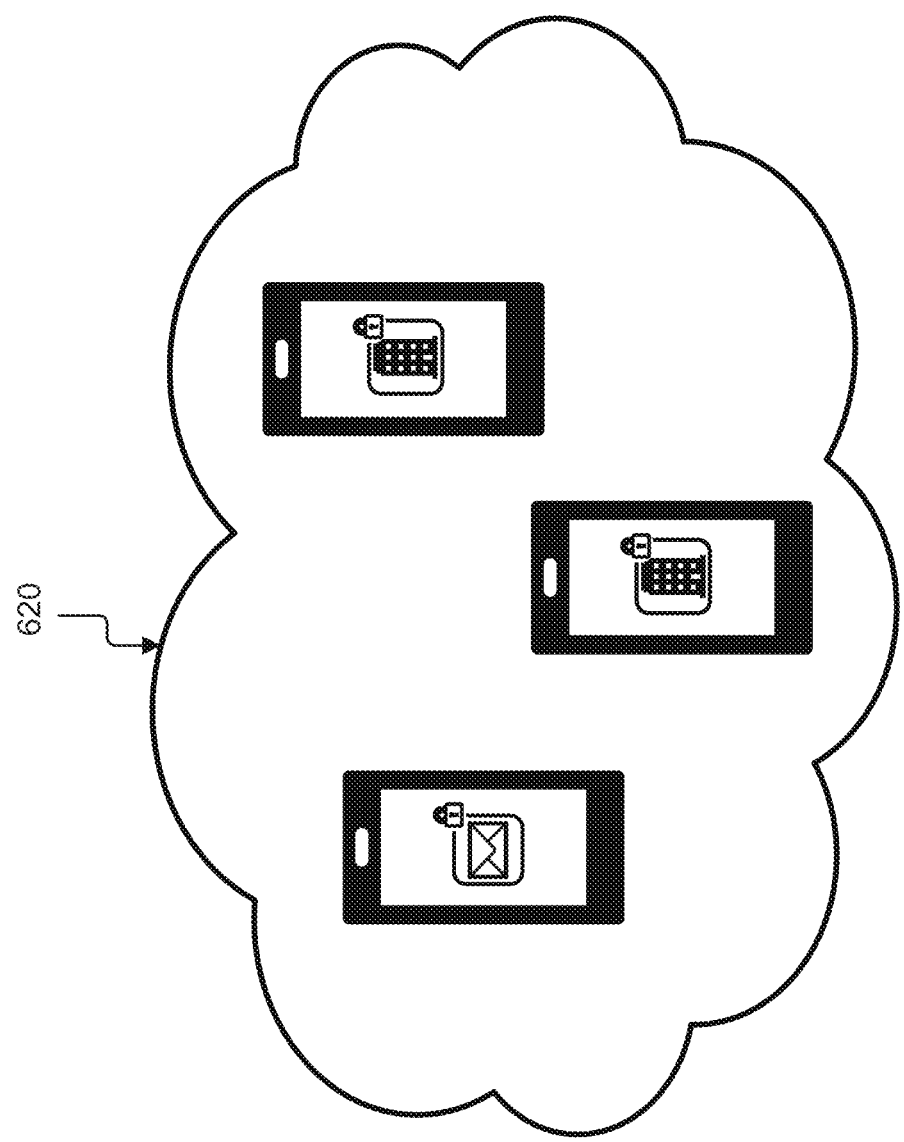
FIG. 6 illustrates an exemplary transmission of authenticable communication from an enterprise source 610 to external recipients, according to some embodiments of the present disclosure.
Figure 6:
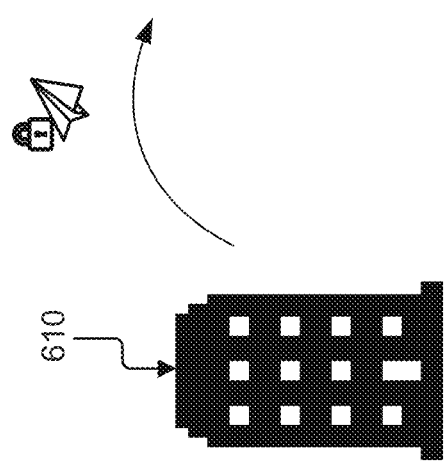

Referring now to FIG. 6, an exemplary transmission of authenticable communication from an enterprise source 610 to external recipients 620 is illustrated. In some aspects, some of the recipients may have an enterprise application on their portable device, such as a smartphone or tablet. Where the recipient may have the enterprise application, the transmission of authenticable communication may be directly through the enterprise application. In some embodiments, some of the recipients may only receive authenticable communication through a secondary communication source, such as an email application. Where the recipient may not have the enterprise application, the authenticable communication may be sent through a non-enterprise application.

In some aspects, such as where the authenticable communication may be sent through an enterprise application, the authentication methods may be less stringent than those sent through a third-party application. For example, source authentication for enterprise application authenticable communications may comprise a single authentication method that may be internal to the enterprise application, and source authentication for external authenticable communications may comprise multiple authentication methods that may require an affirmative authentication request.

Figure 7:
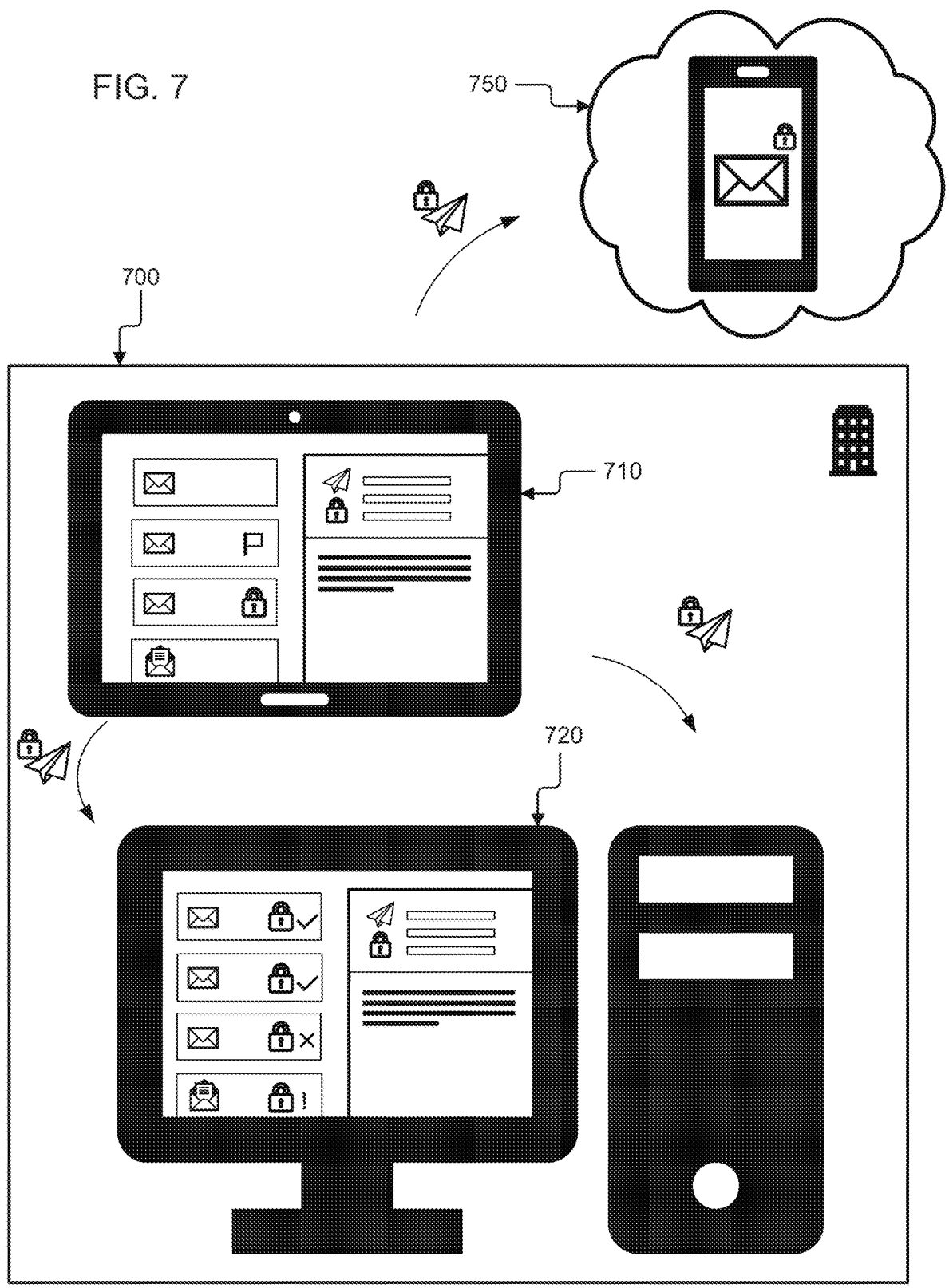
FIG. 7 illustrates exemplary authenticable communication exchanges, according to some embodiments of the present disclosure.

Referring now to FIG. 7, exemplary authenticable communication exchanges are illustrated. In some aspects, sources of authenticable communication may comprise employees within an enterprise 700. In some embodiments, a first employee 710 may exchange authenticable communications with a second employee 720. In some implementations, the indicated source may comprise an enterprise, wherein the authenticable communication may be external communications between external recipients and one or more within the enterprise, 700 and the employees 710, 720.

In some implementations, employees may have a set of permissions and email requirements. Some may be required to use secure mail for both incoming and outgoing, such as an employee responsible for the exchange of personal, private, confidential, or financial information. In some aspects, some mail types may be authenticable communication, such as those containing personal, private, confidential, or financial information. In some embodiments, the source may identify the content or mail type, which may determine whether a communication is authenticable or not. In some implementations, the source may actively flag a communication as authenticable, such as when the source wants to alert the recipient that the contents need to be authenticated. Internal emails may automatically be checked, such as through the enterprise communication infrastructure.

Figure 8:
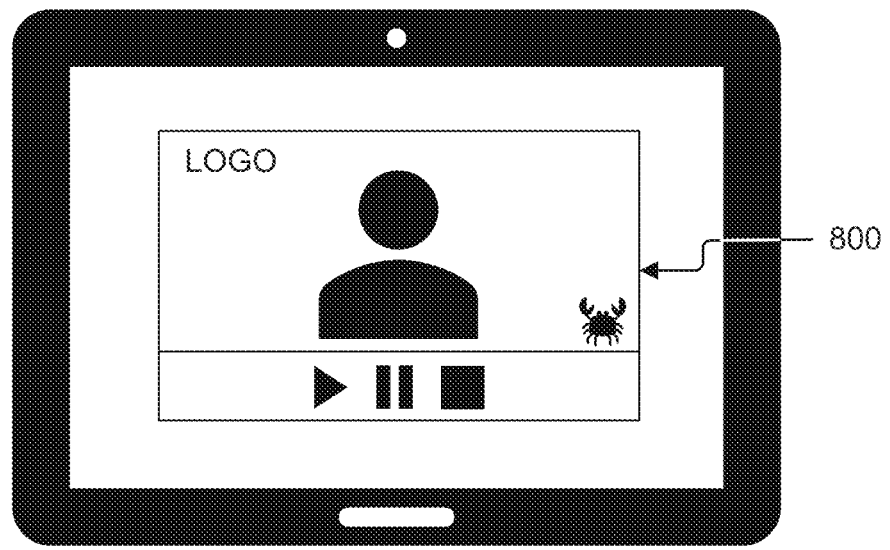
FIG. 8 illustrates an exemplary authenticable communication, wherein the authenticable communication may comprise a video.

Referring now to FIG. 8, an exemplary authenticable communication 800 is illustrated, wherein the authenticable communication 800 may comprise a video. In some aspects, the authenticable communication 800 may comprise a logo or watermark that identifies the indicated source. In some embodiments, a source may want to provide an authentication method so that a viewer may be certain that the video was actually from the source. This may limit the legitimacy of fake videos or videos incorrectly associated with an official source. In some implementations, the authentication method may comprise correctly identifying icons at a corner of the video at specific time stamps. In some embodiments, an official source may have a public authentication portal, which may allow viewers to authenticate an authenticable communication 800.

In some aspects, the authenticable communication 800 may comprise a live feed between an indicated source and a viewer, such as for telemedicine, online gaming, teleconferencing, or distance education, as non-limiting examples. Where the authenticable communication 800 may be live and ongoing, authentication may be periodic to ensure that the indicated source continues to be the actual source. For example, an authentication system may periodically prompt a viewer to input an authenticating mark on the video or may prompt a source to periodically authenticate their presence. As another example, each participant for a conference call may be considered a source, wherein each may authenticate their presence, such as through text, telephone number, email, or voice recognition, as non-limiting examples. In some aspects, participation in a teleconference may be prohibited unless and until the source is authenticated. Where the authentication occurs periodically through the teleconference, a participant may be kicked out of the teleconference if an authentication fails.

As an illustrative example, a viewer may access the authentication portal on an authentication system site, the source site, or other third-party site, such as the authenticable communication 800 platform. The viewer may input an identifier for the authenticable communication 800, such as a title or label. In some aspects, the portal may immediately report that the authenticable communication 800 is not associated with the source. In some embodiments, the portal may further prompt the viewer to input an authentication mechanism, such as icons at specific time stamps. The time stamp requests may be randomly generated, which may further limit false positives.

Figure 9:
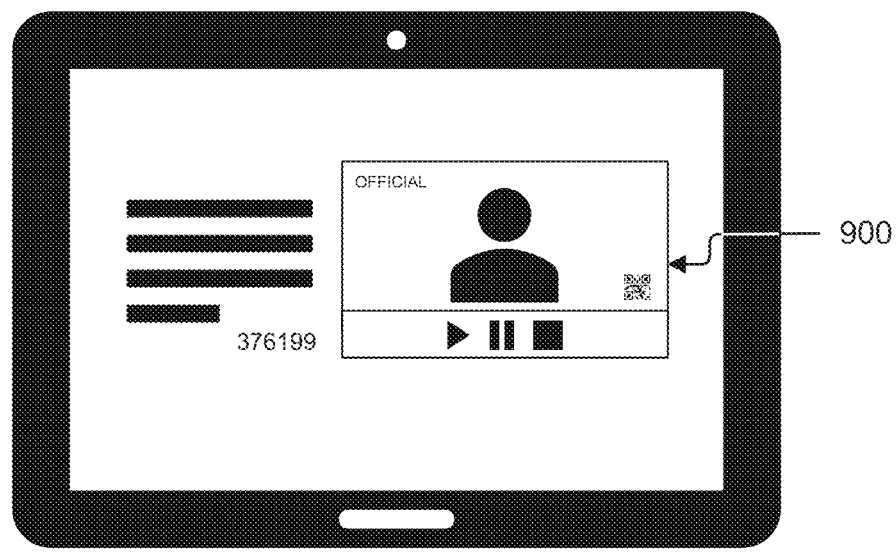
FIG. 9 illustrates an exemplary authenticable communication, wherein the authenticable communication may comprise an article with an embedded video.

Referring now to FIG. 9, an exemplary authenticable communication 900 is illustrated, wherein the authenticable communication 900 may comprise an article with an embedded video. In some aspects, one or both the article and the embedded video may be associated with an indicated source, which may be the same or different. For example, the video may be from a news source, and the article may be independently written by an individual commenting on the material of the video but not associated with the news source.

As another example, the embedded video may comprise an advertisement that may be separate from the article. In some aspects, multiple authenticable communications may be contained within the same page, interface, or document. Where the authenticable communication may comprise independent indicated sources, each portion may be independently authenticated. For example, a viewer may care to authenticate the article and may not care to authenticate the advertisement, as the viewer may not be interested in interacting with the ad. As another example, an ad may appear to be associated with the article, so a viewer may want to authenticate only the embedded video to determine whether it is an advertisement or pertinent to the article.

Where the indicated sources may be different, each portion of the authenticable communication 900 may comprise separate source authentications. In some aspects, each indicated source may have their own authentication process, such as through a phone call, authentication portal, or other mechanism. In some embodiments, both indicated sources may be authenticated through the same authentication system, which may allow for layered authentication.

As an illustrative example, the article may comprise a dual-layered authenticatable communication. A viewer may access the authentication method, input an authenticable communication identifier, such as a domain, title, or tag, and provide two authentication requests. One request may be through the content of the article, and the other request may be acquired through navigating the embedded. The indicated sources of each portion may be separately authenticated, and the combination may also be authenticated. Authenticating the combination may provide the viewer with confidence that the authenticated article actually refers to the authenticated video.

Figure 10:
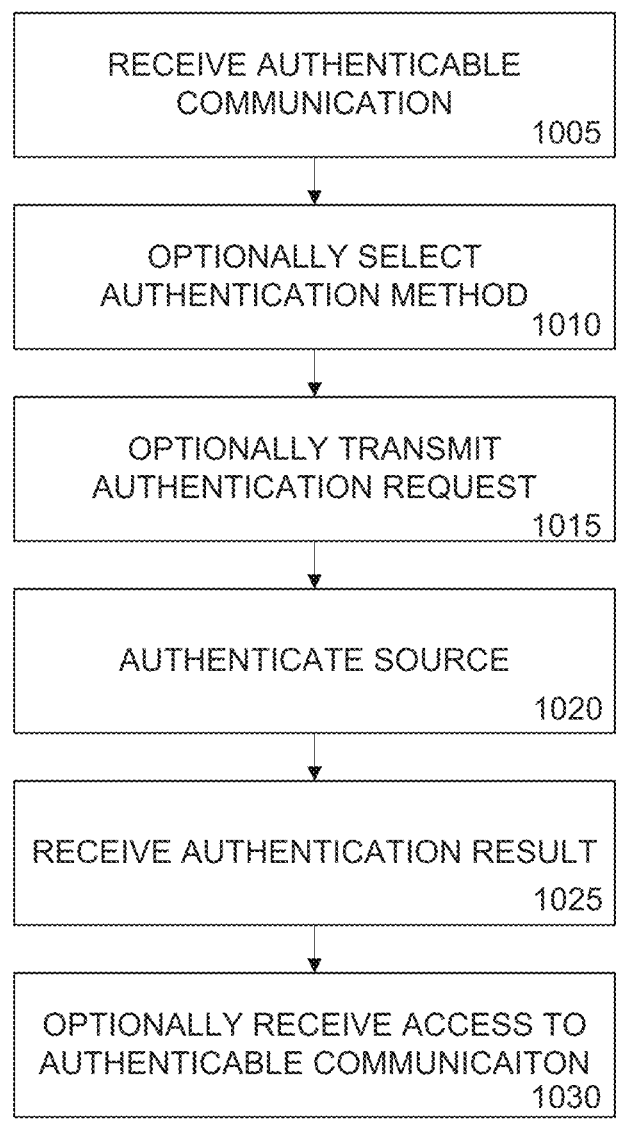
FIG. 10 illustrates exemplary method steps for requesting a source authentication, according to some embodiments of the present disclosure.

Referring now to FIG. 10, exemplary method steps for requesting a source authentication are illustrated. At 1005, an authenticable communication may be received. In some aspects, at 1010, an authentication method may be selected. In some embodiments, at 1015, an authentication request may be transmitted. At 1020, the source may be authenticated. At 1025, the authentication result may be received. In some embodiments, at 1030, access to the authenticable communication may be received. In some implementations, the steps from 1010 to 1020 may be automated on a backend, wherein a recipient may not be required to perform additional actions to initiate the authentication. In some aspects, a recipient may initiate authentication, such as through clicking an authenticate button within the communication system or by inputting authentication information into an authentication system.

In some embodiments, source authentication may be requested through a system with system protocols. For example, the authenticable communication may comprise a document sent for secure signature from a predefined person, and the source authentication may occur automatically when the executed document is received. The source authentication may confirm that the indicated source of the signer is the actual source and that the actual source matches the predefined person. In some aspects, the source authentication for an executed document may be prompted manually by a recipient trying to confirm that the predefined person actually executed the document. The source authentication may request input or scanning of a code or identifier on the document. The source authentication may prompt a secondary authenticatable communication that may be generated to ensure the indicated source of the signature is the actual source.

In some aspects, authenticable communication may comprise a point of action communication, such as a purchase of a regulated product, voting, logging into a secure Wi-Fi system, transmission of personal health data to a health provider source, scanning a ticket for entrance into a venue, purchasing a ticket, boarding transportation, or other action where confirming that the indicated source is the same as the actual source is significant. In some embodiments, authentication may be requested automatically once the action is initiated. In some aspects, authentication may be requested prior to transmission of the authenticable communication. For example, a vote in a political race may not be officially transmitted until after the authentication occurs. As another example, sale of a lottery ticket may not be fully executed and transmitted until the authentication further confirms the age of the actual source.

Figure 11:
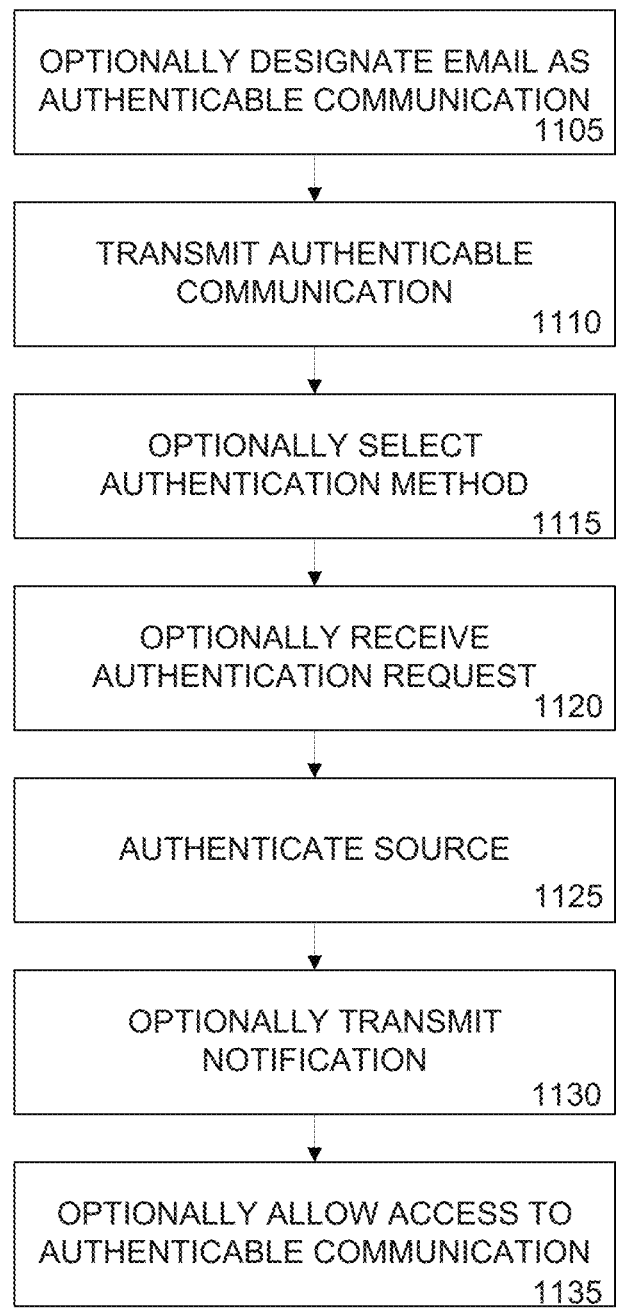
FIG. 11 illustrates exemplary method steps for transmitting an authenticable communication, according to some embodiments of the present disclosure.

Referring now to FIG. 11, exemplary method steps for transmitting an authenticable communication are illustrated. In some embodiments, at 1105, a communication may be designated as an authenticable communication. At 1110, an authenticable communication may be transmitted. In some implementations, at 1120, an authentication request may be received. At 1125, an authenticable communication may be authenticated. In some aspects, at 1130, a notification of the authentication result may be transmitted. In some embodiments, at 1135, access to the authenticable communication may be accessed. For example, wire information may be partially obscured until the source is authenticated.

Figure 12:
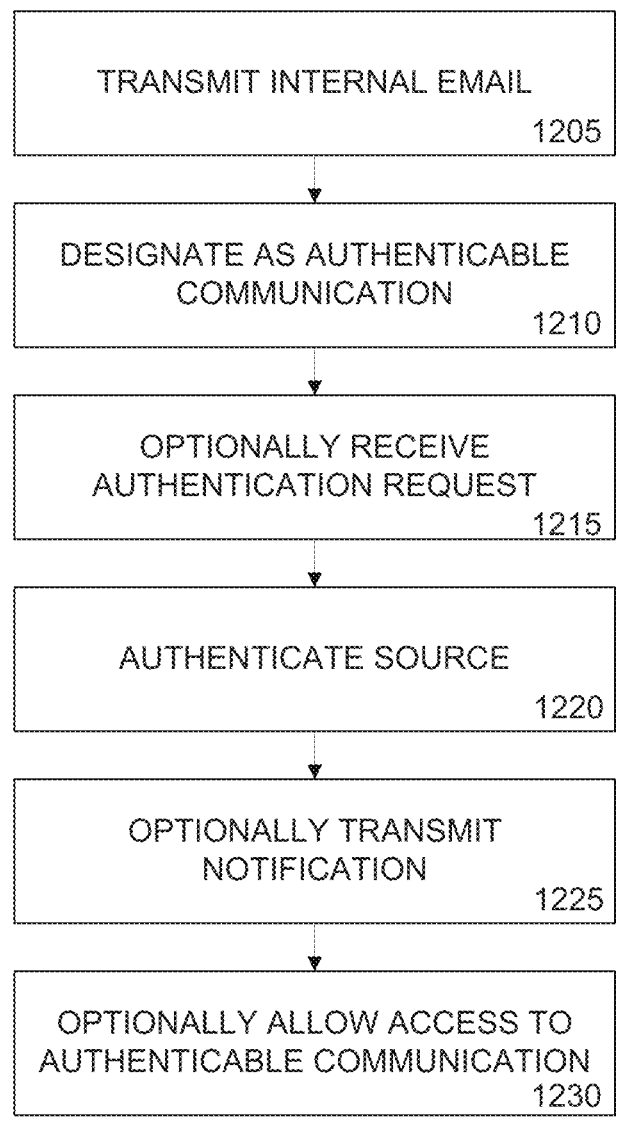
FIG. 12 illustrates exemplary method steps for transmitting an internal enterprise communication, according to some embodiments of the present disclosure.

Referring now to FIG. 12, exemplary method steps for transmitting an internal enterprise communication are illustrated. At 1205, an internal communication may be transmitted. At 1210, the internal communication may be designated as authenticable communication. In some aspects, at 1215, an authentication request may be received. At 1220, the authenticable communication may be authenticated. In some embodiments, at 1225, an authentication result may be transmitted. In some implementations, at 1230, access to the authenticable communication may be allowed.

Figure 13:
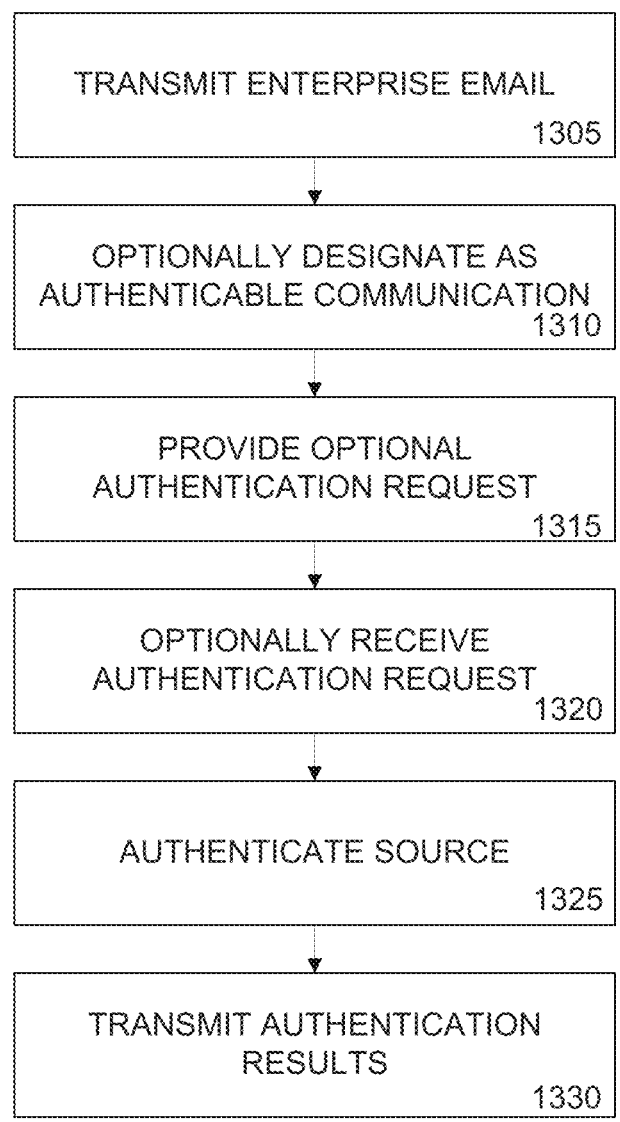
FIG. 13 illustrates exemplary method steps for transmitting an external email, according to some embodiments of the present disclosure.

Referring now to FIG. 13, exemplary method steps for transmitting an external email are illustrated. At 1305, an external enterprise email may be transmitted. In some aspects, at 1310, the enterprise email may be designated as an authenticable communication. At 1315, an authentication request option may be provided within the authenticable communication. In some embodiments, at 1320, an authentication request may be received. At 1325, the authenticable communication may be authenticated. At 1330, the authentication results may be transmitted.

Figure 14:
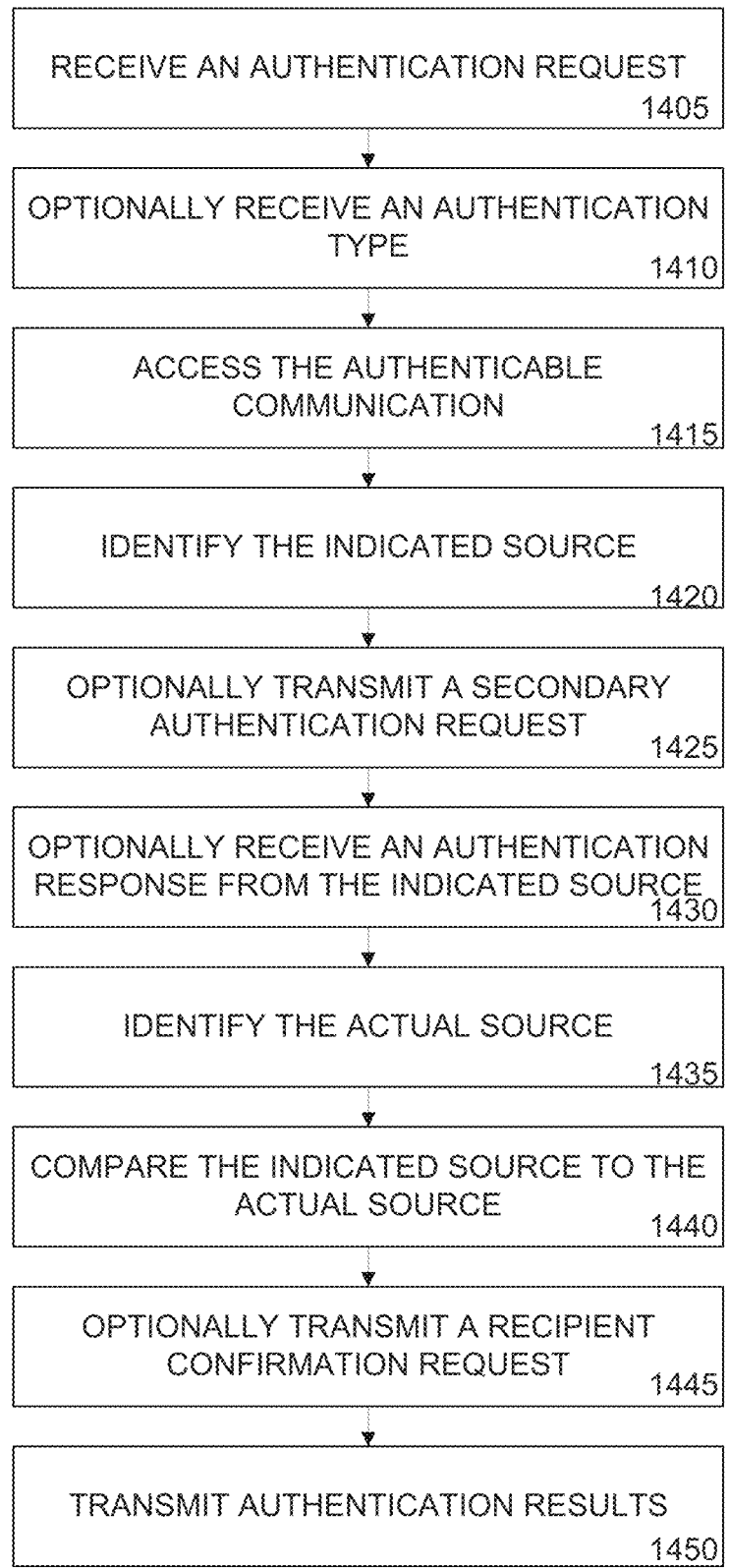
FIG. 14 illustrates exemplary method steps for authenticating a source of an authenticable communication, according to some embodiments of the present disclosure.

Referring now to FIG. 14, exemplary method steps for authentication a source of an authenticable communication is illustrated. At 1405, an authentication request may be received. In some aspects, at 1410, an authentication type may be received, such as where the authentication type may be selectable by one or both the recipient and the actual source. At 1415, the authenticable communication may be accessed. At 1420, the indicated source may be identified.

In some embodiments, at 1425, a secondary authentication request may be transmitted, such as to the indicated source, which may prompt an action from the indicated source, and at 1430, the authentication response from the indicated source may be received. At 1435, the actual source may be identified, which may be informed at least in part by the authentication response received at 1430. At 1440, the indicated source may be compared to the actual source.

In some implementations, at 1445, a recipient confirmation request may be sent to the indicated source to confirm that the recipient or recipients were the intended recipients of the authenticable communication. At 1450, the authentication results may be transmitted. In some aspects, the authentication results may be transmitted to the authentication system, which may trigger access for the recipient to the contents of the authenticable communication. In some embodiments, the authentication may occur internally and automatically within the system without notifications or prompts sent to the recipient or the indicated source. In some implementations, portions of the process may include notifications or prompts to one or more of the indicated source, the actual source, and the recipient.

For example, where security may increase confidence in the authenticable communication, transmitting the authentication results at 1450 to the recipient may reassure the recipient that the authenticable communication is real and safe. As another example, such as with exchange of external authenticable communications, the enterprise may be concerned with internal cybersecurity issues that may not affect or even be considered by the indicated source and the recipient. There, the system may perform the authentication internally without providing results to the indicated source or the recipients.

Figure 15:
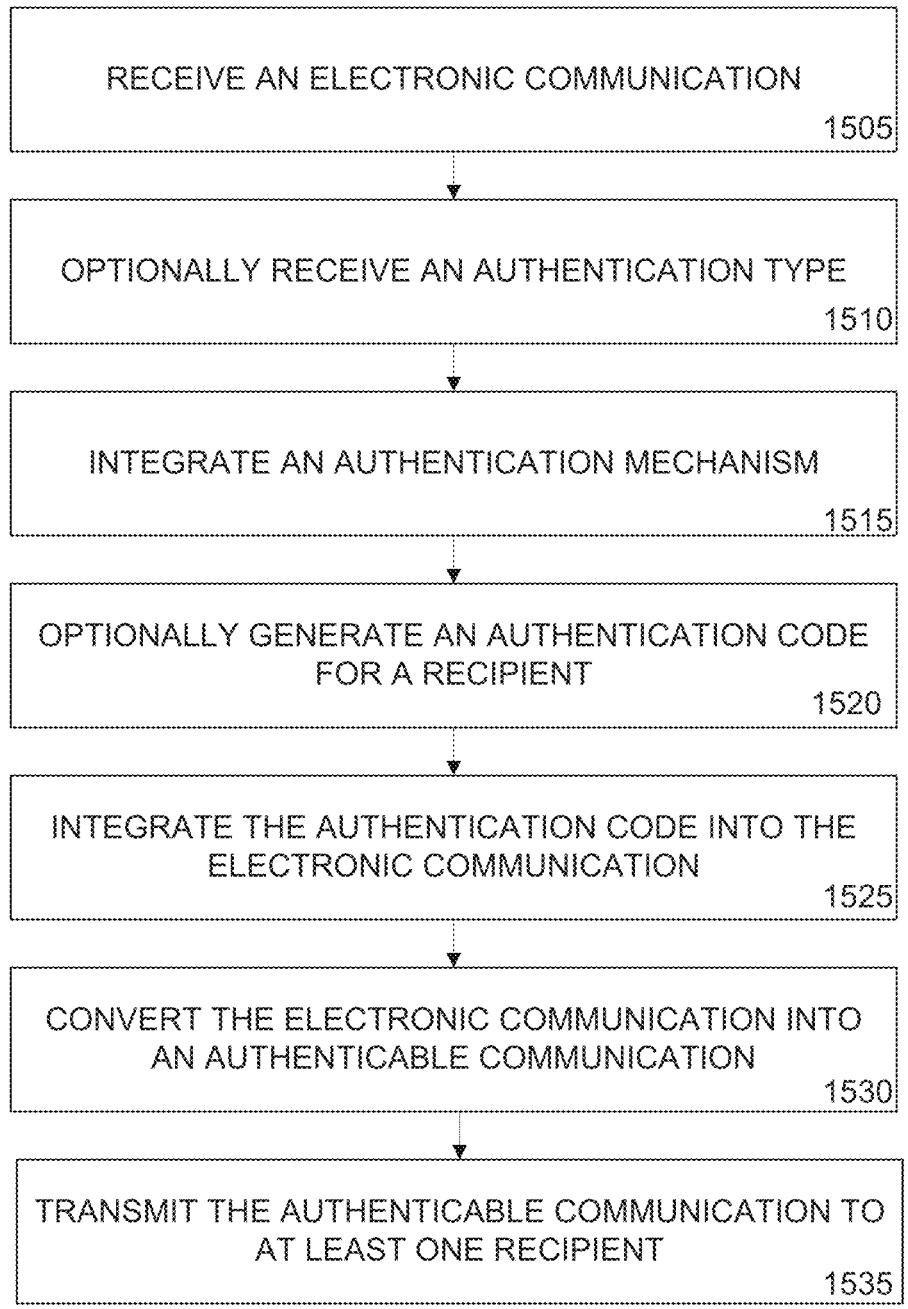
FIG. 15 illustrates exemplary method steps for providing an authenticable communication, according to some embodiments of the present disclosure.

Referring now to FIG. 15, exemplary method steps for providing an authenticable communication are illustrated. At 1505, an electronic communication may be received. In some aspects, at 1510, an authentication type may be received, such as may be set or selected by an actual source, a recipient, or enterprise. At 1515, an authentication mechanism may be integrated into the electronic communication. In some embodiments, at 1520, an authentication code may be generated for the recipient or recipients, wherein the authentication code may be unique to each recipient or general based on the indicated source. At 1525, the authentication code into the electronic communication. At 1530, the electronic communication may be converted to an authenticable communication, and at 1535, the authenticable communication may be transmitted to at least one recipient. In some implementations, the authenticable communication may be presented to the actual source prior to the transmission at 1535.

Figure 16:
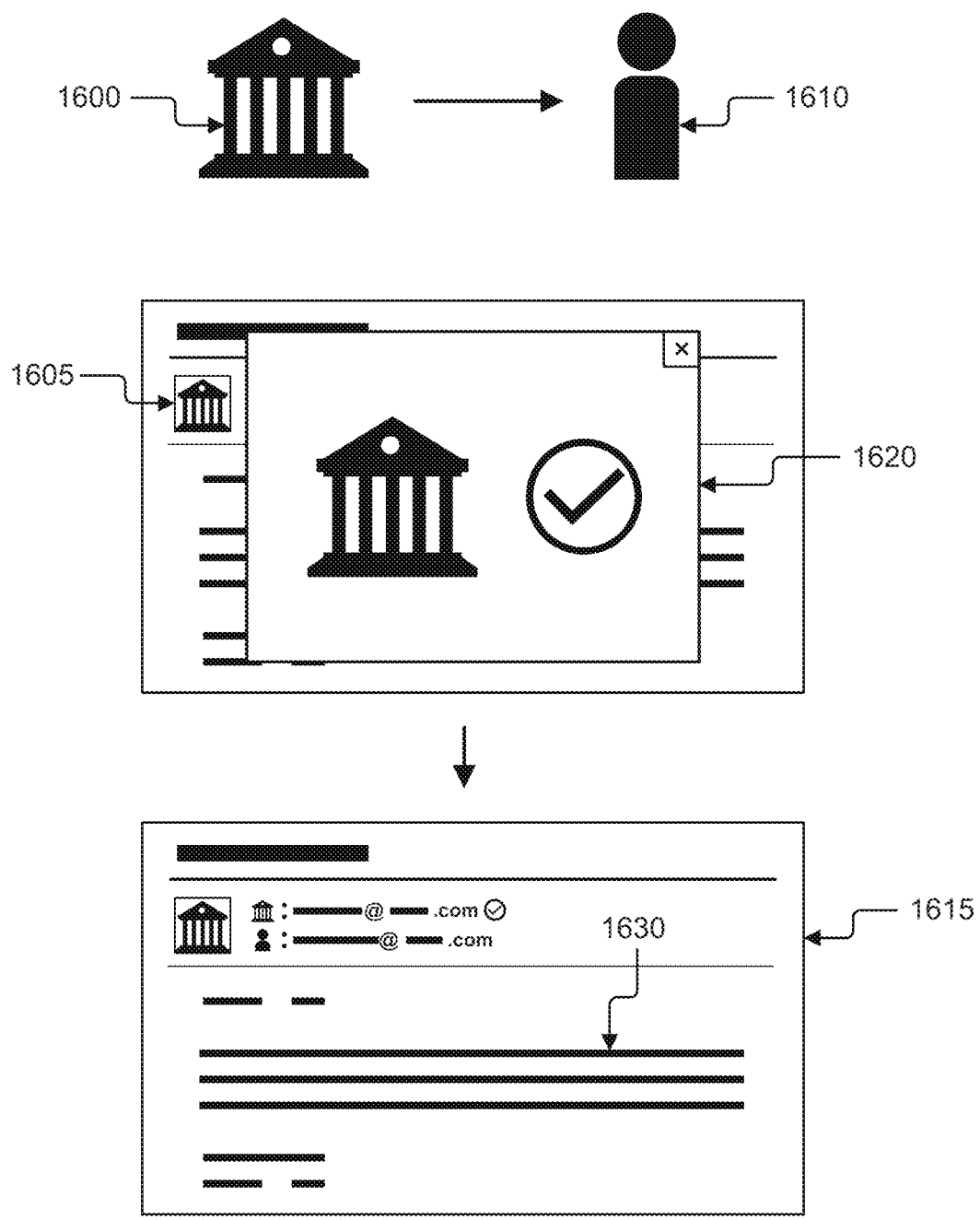
FIG. 16 illustrates exemplary process steps for providing content in an authenticable communication, according to some embodiments of the present disclosure.

Referring now to FIG. 16, exemplary process steps for providing content 1630 in an authenticable communication is illustrated. In some aspects, the institution 1600 may transmit a communication to an intended recipient 1610. In some embodiments, a communication may comprise an indicated source 1605, an intended recipient, and content 1630. In some implementations, a communication may be converted to an authenticable communication 1615. In some aspects, a conversion may embed at least one authentication mechanism, such as described in FIGS. 2A-4, as non-limiting examples. In some embodiments, a conversion may embed an authentication screen 1620, which may at least partially obscure content 1630.

In some aspects, an authenticable communication 1615 may be transmitted to the intended recipient 1610. In some implementations, a recipient may open the authenticable communication 1615, such as by clicking into it through an email platform, and an authentication screen 1620 may at least partially obscure content 1630. In some embodiments, the authentication screen 1620 may cause or prompt authentication of one or both the indicated source 1605 and the intended recipient 1610. An authentication screen 1620 may reappear based on predefined conditions, such as after a set amount of idle time or each time the authenticable communication 1615 is reopened, as non-limiting examples.

In some embodiments, the content 1630 may be provided in full to the recipient once the authentication screen 1620 is removed and one or both the indicated source 1605 and the intended recipient 1610 are authenticated. In some implementations, the authentication screen 1620 may be used to ensure that the intended recipient 1610 opens content 1630 safely. For example, content 1630 may comprise a link or attachments, and the intended recipient 1610 may click on the link or attachment, prompting the authentication screen 1620 to appear. In some implementations, access to the attachments may be locked until one or both the source and recipient are authenticated.

In some aspects, the locking may occur by withholding the attachments until authentication occurs. In some embodiments, the attachments may be temporarily stored in an intermediary database, such as an authentication system. Once authenticated, the attachments may be transmitted and deleted from the intermediary storage, which may limit the storage requirements and security risks for the authentication system.

Requiring authentication of one or both the indicated source 1605 and the intended recipient 1610 for the intended recipient 1610 to access content 1630 may limit exposure to security risks or sharing of sensitive information between incorrect parties. In some embodiments, the authentication screen 1620 may selectively obscure content 1630 that may be particularly sensitive or risky, such as links, attachments, and requests for personal information. In some embodiments, the intended recipient 1610 may be provided a limited view of content 1630 that may allow for general understanding of the purpose of the authenticable communication 1615 and may encourage authentication.

In some embodiments, an authenticable communication 1615 may comprise an article or news outlet, wherein a recipient 1610 may visit a website to access the authenticable communication 1615. In some aspects, authentication may allow the recipient to verify that the website was legitimately from a known source. In some implementations, authentication may allow the recipient to verify the author of the article. This may allow for increased confidence in quality and dependability when reading articles.

Figure 17A:
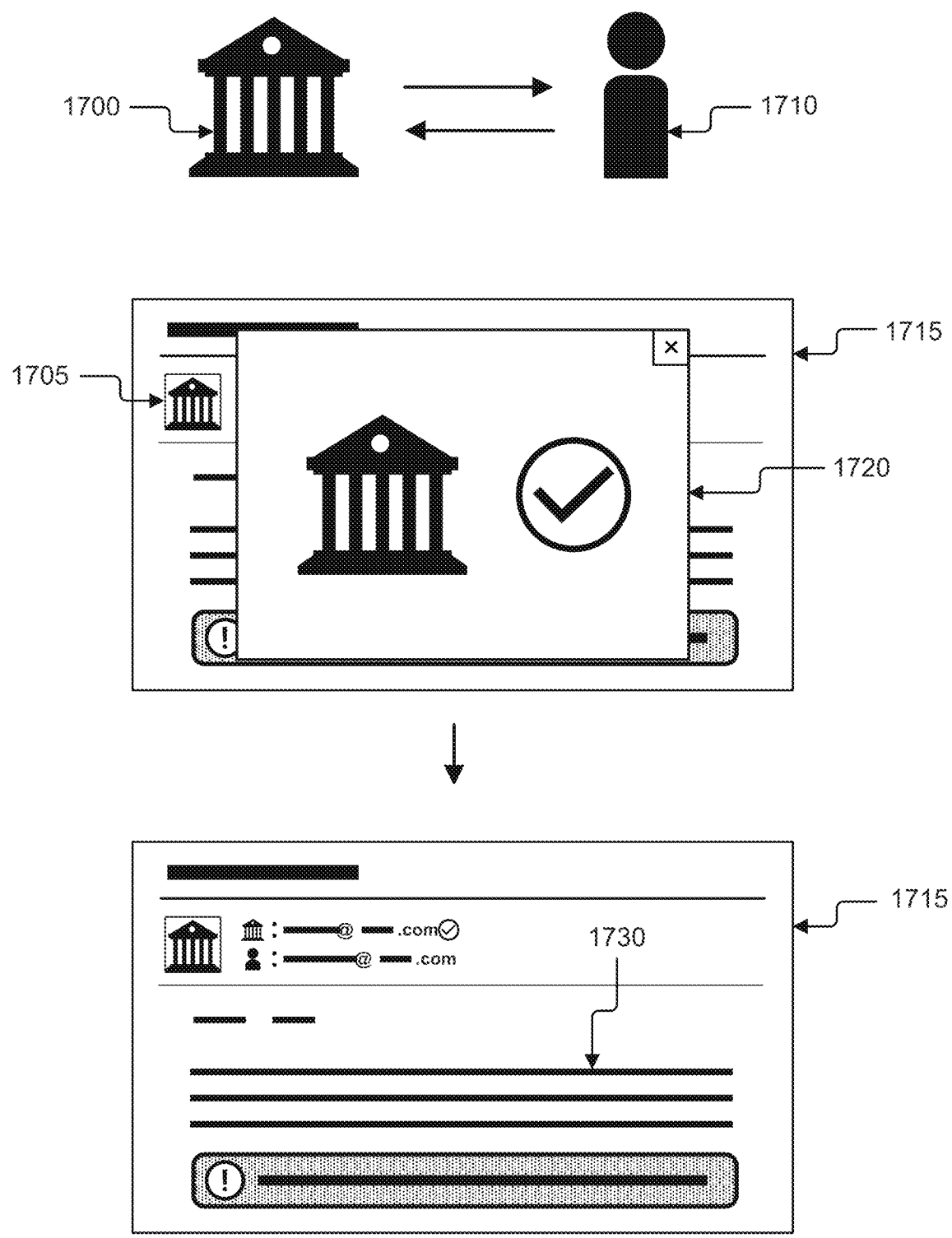
FIG. 17A illustrates exemplary process steps for providing content in an authenticable communication, according to some embodiments of the present disclosure.
Figure 17B:
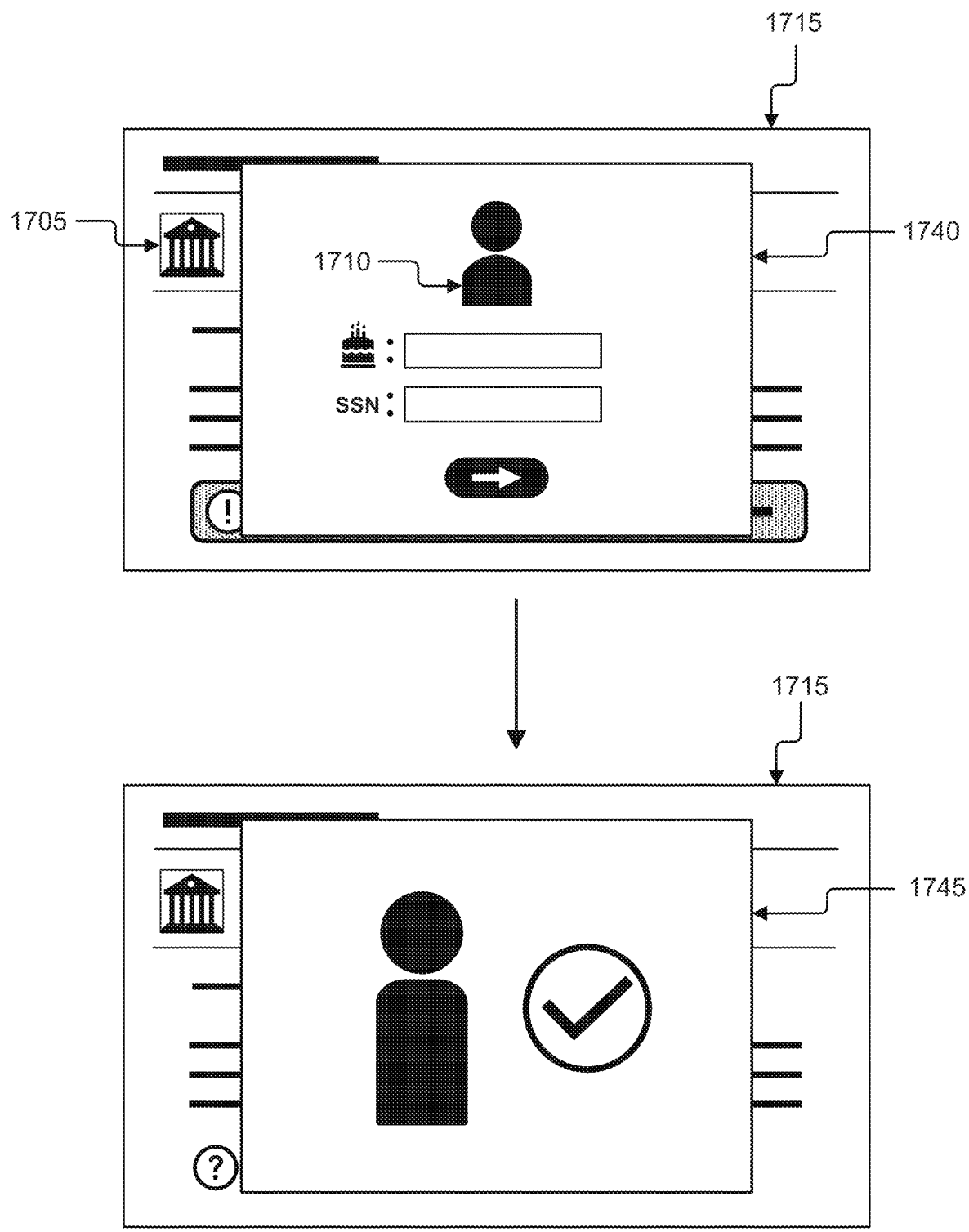
FIG. 17B illustrates exemplary process steps for providing content in an authenticable communication, according to some embodiments of the present disclosure.
Figure 17C:
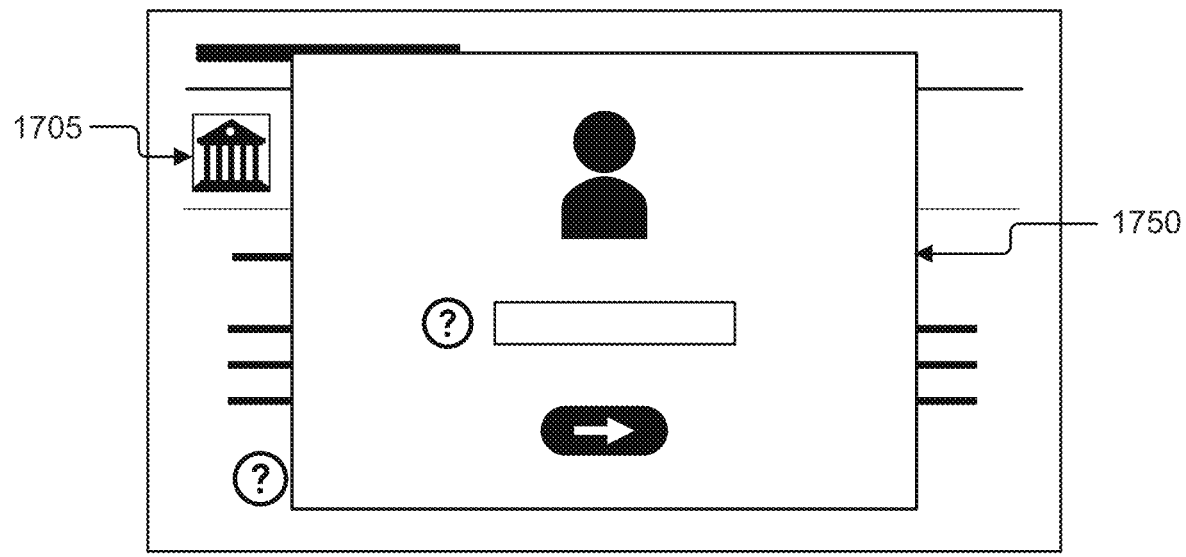
FIG. 17C illustrates exemplary process steps for providing content in an authenticable communication, according to some embodiments of the present disclosure.
Figure 17C:
Figure 17C:
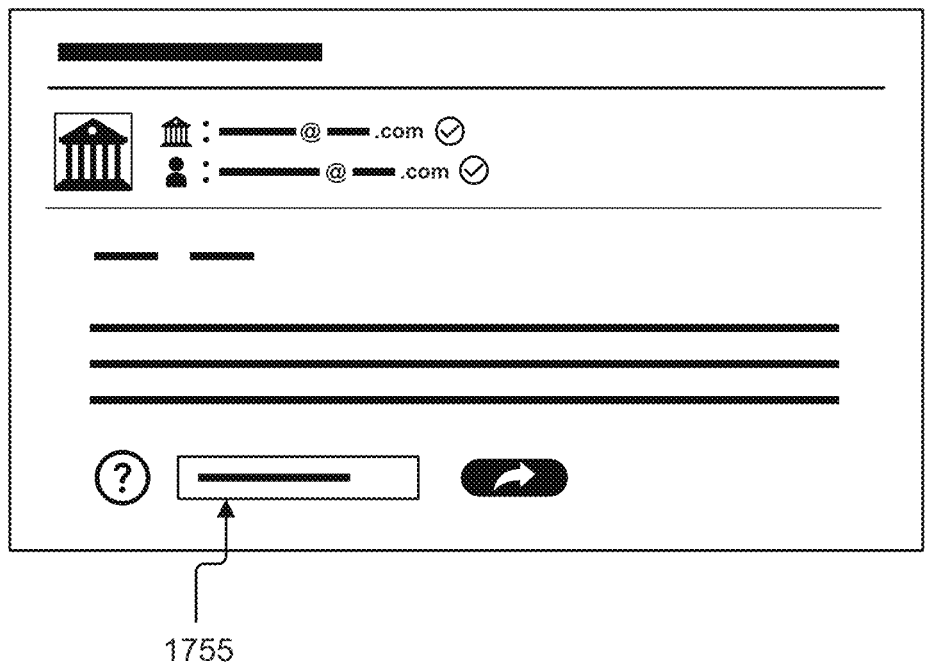

Referring now to FIG. 17A-C, exemplary process steps for providing content in an authenticable communication 1715 is illustrated. In some aspects, an actual source 1700 may comprise an institution 1700 and may send an intended recipient 1710 an authenticable communication 1715 requesting information. In some implementations, the indicated source 1705 may determine which communications are sent with an authentication screen 1720. In some embodiments, embedding an authentication screen 1720 may be automatic based on predefined conditions, such as an external communication, communications to specific recipients or recipient groups, or content 1730, as non-limiting examples.

An authenticable communication 1715 may comprise an authentication screen 1720 that partially obscures content 1730 from the intended recipient 1710. In some aspects, the content 1730 may be completely blocked. The level of content blocked may be set by an actual source 1700, an intended recipient, a system, or combinations thereof. In some embodiments, a first authentication screen 1720 may authenticate the indicated source 1705 to confirm that it was an actual source 1700. This may provide the intended recipient 1710 with confidence knowing it originated from the indicated source 1705.

In some implementations, the content 1730 may request information from the recipient, and a recipient authentication screen 1740 may appear, which may request authentication of the intended recipient 1710. For example, before the user has full access to the content 1730, a recipient authentication screen 1740 may require specific information from the recipient such as, but not limited to, a password, access code, or clearance level to access the content 1730. In some implementations, once an intended recipient is authenticated 1745, an information input screen 1750 may appear and prompt input of the requested information from the content 1730. In some implementations, the recipient 1710 may have the ability to bypass the authentication screen 1720 based on their clearance level, type of content 1730 and other non-limiting factors.

In some embodiments, the recipient authentication screen 1740 may look similar to that of the authentication screen. In some aspects, the recipient authentication screen 1740 may comprise an input mechanism and prompt for information known by one or both the authentication system and the indicated source 1705. In some embodiments, the recipient authentication screen 1740 may have a series of questions rather than one singular question. In some embodiments, the intended recipient 1710 may be granted access to the content 1730 once all questions or required information has been provided and verified.

In some aspects, the information input screen 1750 may auto trigger a reply communication once the intended recipient 1710 has put in their information, and the communication reply may populate the response with the collected information 1755. In some aspects, the reply communication may be to a different address than the original sender. For example, the general email address for an institution may be the actual sender, and a reply communication may go to a specific individual within the institution assigned to the account. In some aspects, once the information input screen 1740 has been bypassed or completed, then the populated information 1745 may populate into the authenticable communication 1715.

In some implementations, the authenticable communication 1715 may comprise a document, such as a Word document or Adobe PDF. The authentication may occur within the document, wherein content access and editing abilities may be locked to one or both a recipient or source is authenticated. This may allow for secure access and editing of documents, such as may be useful for tax documents, documents requiring signature, or documents requesting sensitive information.

As an illustrative example, an authenticable communication 1715 may request address, income, personal information of family members, and tax information, and an intended recipient may enter the information into the information input screen 1750. That information may be populated into a response or directly into a system, such as through the actual source. The authenticable communication 1715 may comprise internal functionality that may allow for direct collection of data from an intended recipient without requiring a reply or other additional recipient actions.

In some embodiments, the authentication process may continue within a communication chain. For example, once the populated information 1755 is sent back to the source 1700 or reply recipient, the source 1700 or reply recipient may be treated as a recipient, requiring authentication. When the source 1700 becomes the recipient, the method of authentication may be the same or different than the source authentication.

Figure 18A:
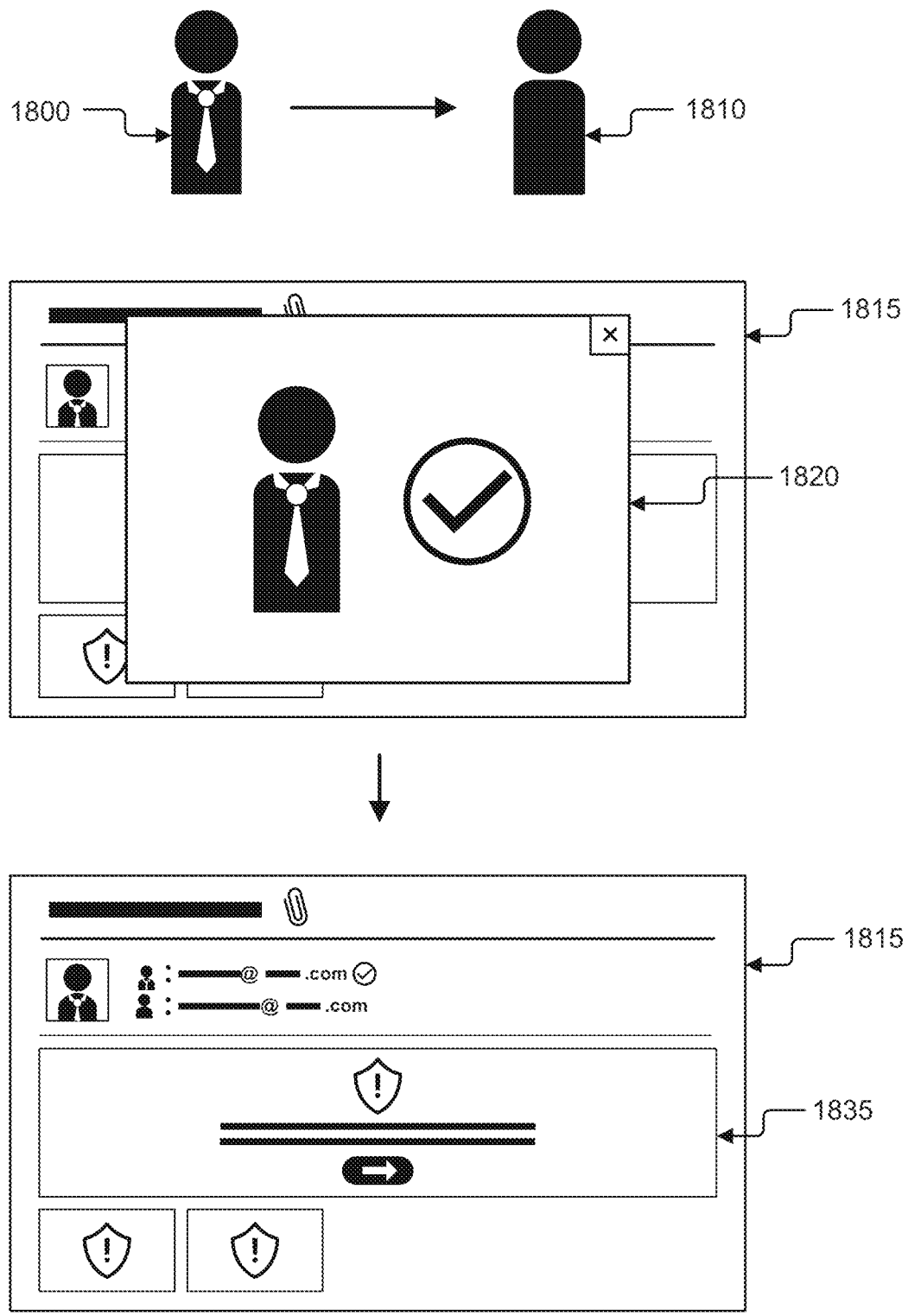
FIG. 18A illustrates exemplary process steps for providing content in an authenticable communication, according to some embodiments of the present disclosure.
Figure 18B:
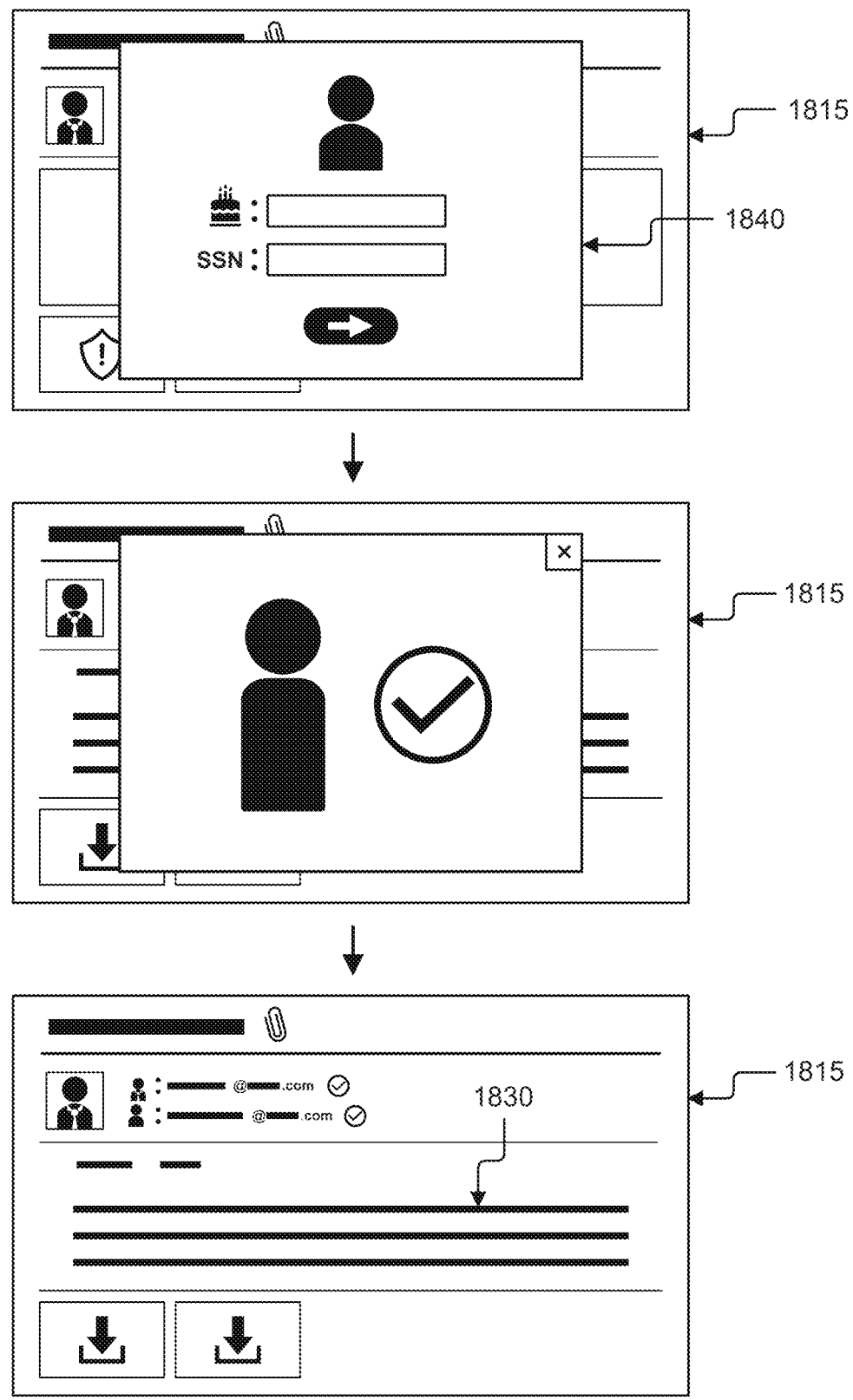
FIG. 18B illustrates exemplary process steps for providing content in an authenticable communication, according to some embodiments of the present disclosure.

Referring now to FIG. 18A-B, exemplary process steps for providing content 1830 in an authenticable communication 1815 are illustrated. In some aspects, the actual source 1800 may be an individual such as a doctor, tax person, lawyer, or professor as non-limiting examples. In some aspects, the actual source 1800 may have a professional relationship with the intended recipient 1810 and may exchange authenticable communications 1815 when discussing sensitive topics, such as health care, financial, or legal. In some aspects, the actual source 1800 may send an authenticable communication 1815, and an authentication screen 1820 may pop up when the intended recipient 1810 attempts to access the content 1830.

The authentication screen 1820 may at least partially obscure content 1830 from the intended recipient 1810. In some aspects, the intended recipient 1810 may be required to actively request authentication of the indicated source 1800. In some implementations, authentication may automatically occur when the intended recipient attempts to access the content 1830, and the authentication screen 1820 may indicate the results of the authentication. In some embodiments, authentication of the indicated source may require input from the intended recipient 1810 into the authentication screen 1820

In some embodiments, once the authentication screen 1820 has been removed and the indicated source authenticated, a pre-authentication screen 1835 may indicate that more authentication may be required to fully access the content 1830. In some embodiments, a pre-authentication screen 1835 may not always be needed after the authentication screen 1820. In some aspects, a pre-authentication screen 1835 and authentication screen 1820 may be redundant and only one may be required to gain access. In some embodiments, the authentication screen 1820 may be a precursor to the pre-authentication screen 1835 letting the intended recipient 1810 know that authentication may be required in the following steps.

In some implementations, a recipient authentication screen 1840 may require the intended recipient 1810 to enter required information, which may allow the system to confirm that the intended recipient 1810 is the actual recipient. In some embodiments, the recipient authentication screen 1840 may request a username and password, a pin, or other authenticating code to gain access to the content 1830. In some aspects, the recipient authentication screen 1840 may be predictable, wherein the intended recipient 1810 may input the same information each time. In some implementations, the recipient authentication screen 1840 may appear randomized, wherein the prompts may be selected from a group of predefined questions each time a recipient authentication screen 1840 is presented.

Figure 19A:
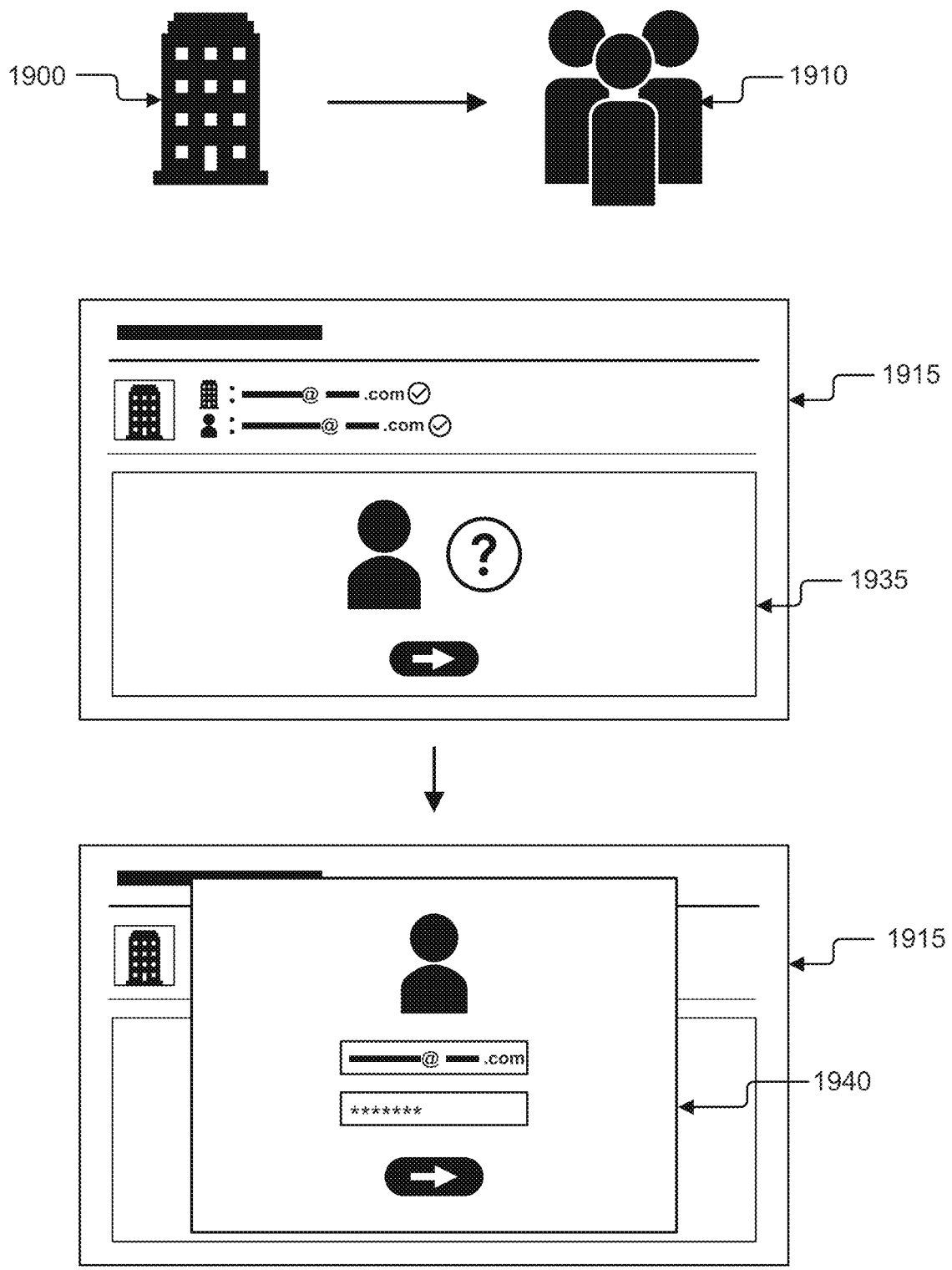
FIG. 19A illustrates exemplary process steps for providing content in an internal authenticable communication, according to some embodiments of the present disclosure.
Figure 19B:
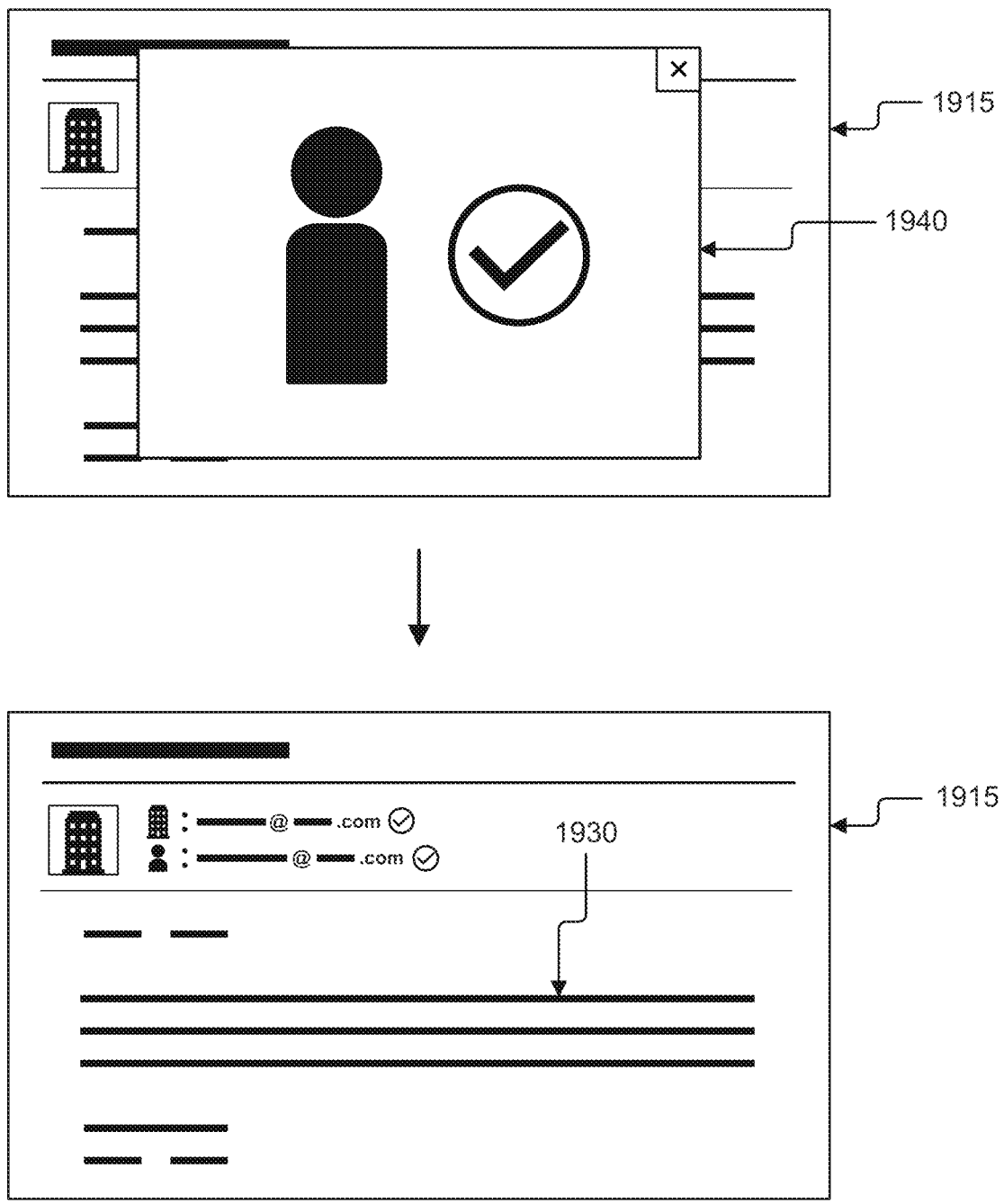
FIG. 19B illustrates exemplary process steps for providing content in an internal authenticable communication, according to some embodiments of the present disclosure.

Referring now to FIG. 19A-B, exemplary process steps for providing content 1930 in an internal authenticable communication 1915 are illustrated. In some aspects, the actual source 1900 may be an institution, company, or individual from within an institution or company, as non-limiting examples. In some embodiments, the intended recipients 1910 may be one or more individuals within an institution 1900. In some aspects, an internal authenticable communication 1915 may allow for automatic authentication of an indicated source 1900. In some implementations, an authenticable communication 1915 may provide a pre-authentication screen 1935 that may indicate that authentication may be required from the recipient 1910. In some aspects, the recipient authentication screen 1940 may require the intended recipient 1910 to put in their username and password, such as may be provided by the institution. In some aspects, the recipient authentication screen may partially obscure the content 1930 until the intended recipient 1910 is authenticated.

In some aspects, an intended recipient 1910 may initiate the authentication and click on the pre-authentication screen 1935, which may prompt display of the recipient authentication screen 1940. In some embodiments, the content 1930 may be partially filtered based on the intended recipient 1910 and the clearance level of the person viewing the content 1930. For example, one intended recipient 1910 may have a different view of the content 1930 than another. One recipient may have full access to the content 1930 whereas another may only have view of the first part of the content 1930. As another example, all recipients may have a limited view of the content 1930, and then some recipients may gain further access based on their input on the recipient authentication screen 1940.

Figure 20A:
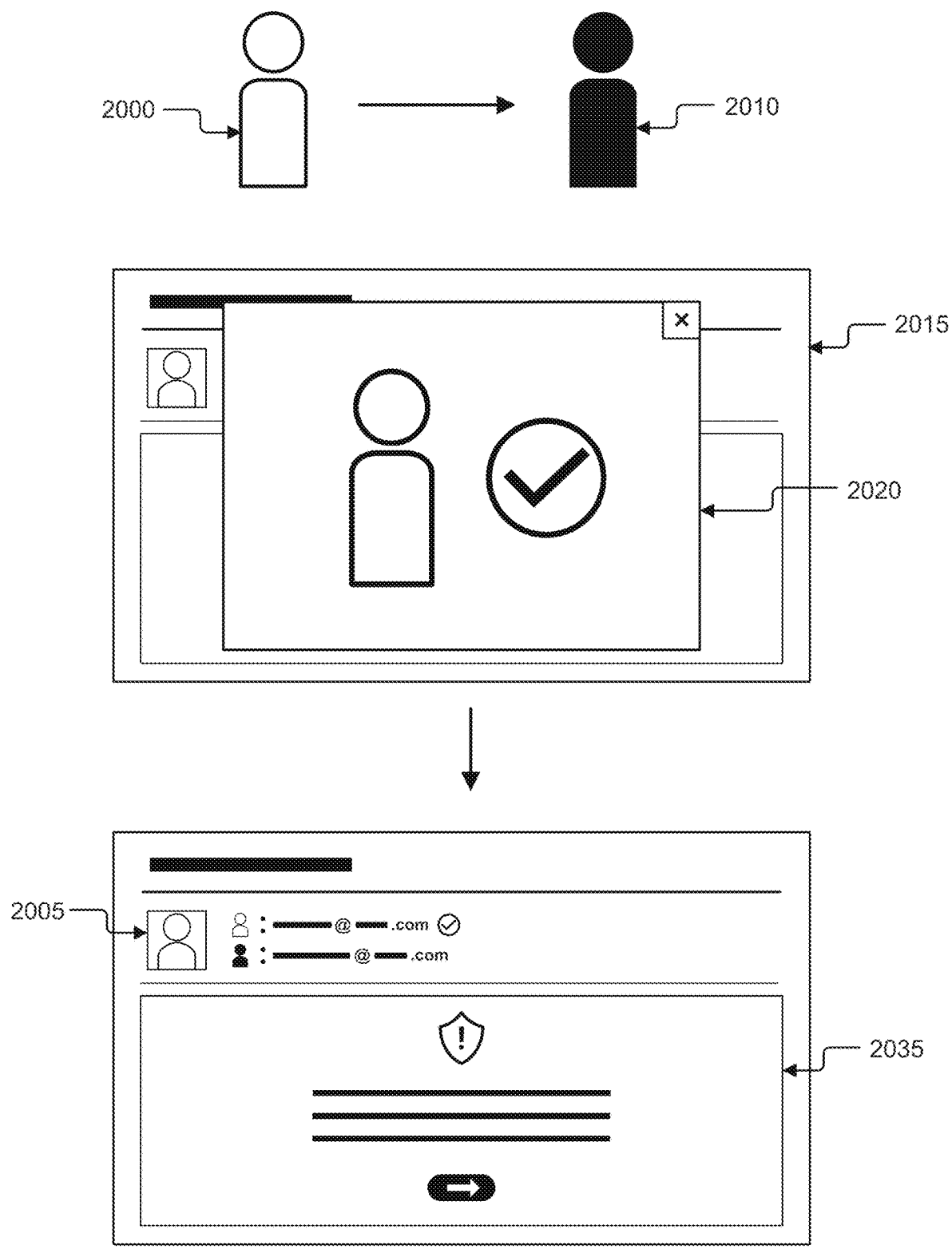
FIG. 20A illustrates exemplary process steps providing content in a personal authenticable communication, according to some embodiments of the present disclosure.
Figure 20B:
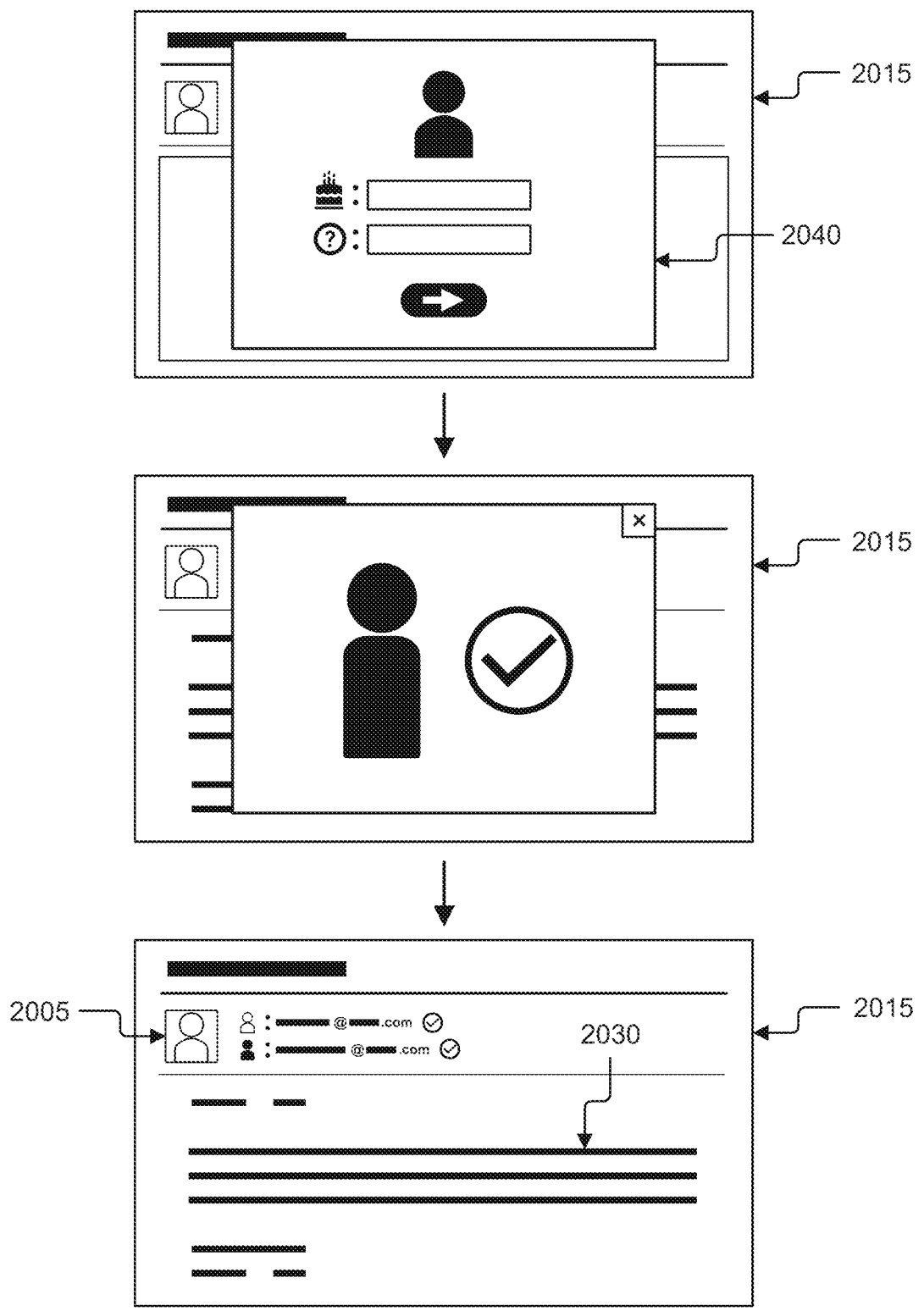
FIG. 20B illustrates exemplary process steps providing content in a personal authenticable communication, according to some embodiments of the present disclosure.

Referring now to FIG. 20A-B, exemplary process steps providing content in a personal authenticable communication 2015 are illustrated. In some aspects, the actual source 2000 may be an individual sending a personal authenticable communication 2015 to an intended recipient 2010 who may be a friend or acquaintance. In some embodiments, the actual source 2000 may be sending a personal message to an intended recipient 2010. In some implementations, a recipient may attempt to access the content 2030, and an authentication screen 2020 may obscure at least a portion of the content 2030. In some aspects, the authentication screen 2020 may authenticate the indicated source 2000.

In some embodiments, the initial authentication screen 2020 to separately authenticate an indicated source 2000 may not be required. In some aspects, a pre-authentication screen 2035 may serve as an initial screen that may block the content 2030 and notify a recipient that authentication may be necessary. In some implementations, a pre-authentication screen 2035 may provide a brief summary or hint to the actual content 2030.

In some embodiments, one or both the pre-authentication screen 2035 and the recipient authentication screen 2040 may provide information that may allow the intended recipient 2010 to personally confirm that the indicated source is the actual source 2000. For example, the pre-authentication screen 2035 may describe a personal memory or inside joke. In some aspects, the questions presented in the recipient authentication screen 2040 may allow the intended recipient 2010 to personally confirm the indicated source 2005. This may allow for secure communication between friends and acquaintances, where they could exchange communications knowing only the intended recipient would be able to access the content 2030.

In some embodiments, the question or required information asked by the recipient authentication screen 2040 may ask a personal question or for personal information that may be known by the actual source 2000. For example, the security question may ask where the intended recipient 2010 ate lunch last week with the indicated source 2005, their favorite horror film, favorite television show, or nickname, as non-limiting examples. In some implementations, the acceptable input to the prompt may be set by the actual source 2000, such as through an authentication system database, where authentication mechanisms and authentication data may be collected and stored.

In some aspects, content 2030 may be provided once the recipient has been authenticated. In some embodiments, response data may be transmitted back to the actual source 2000. In some implementations, the intended recipient may have the ability to view the content 2030 in full once they have passed the recipient authentication screen 2040. In some aspects, the recipient 2010 may only have access to part of the content 2030 depending on the answers provided.

Figure 21A:
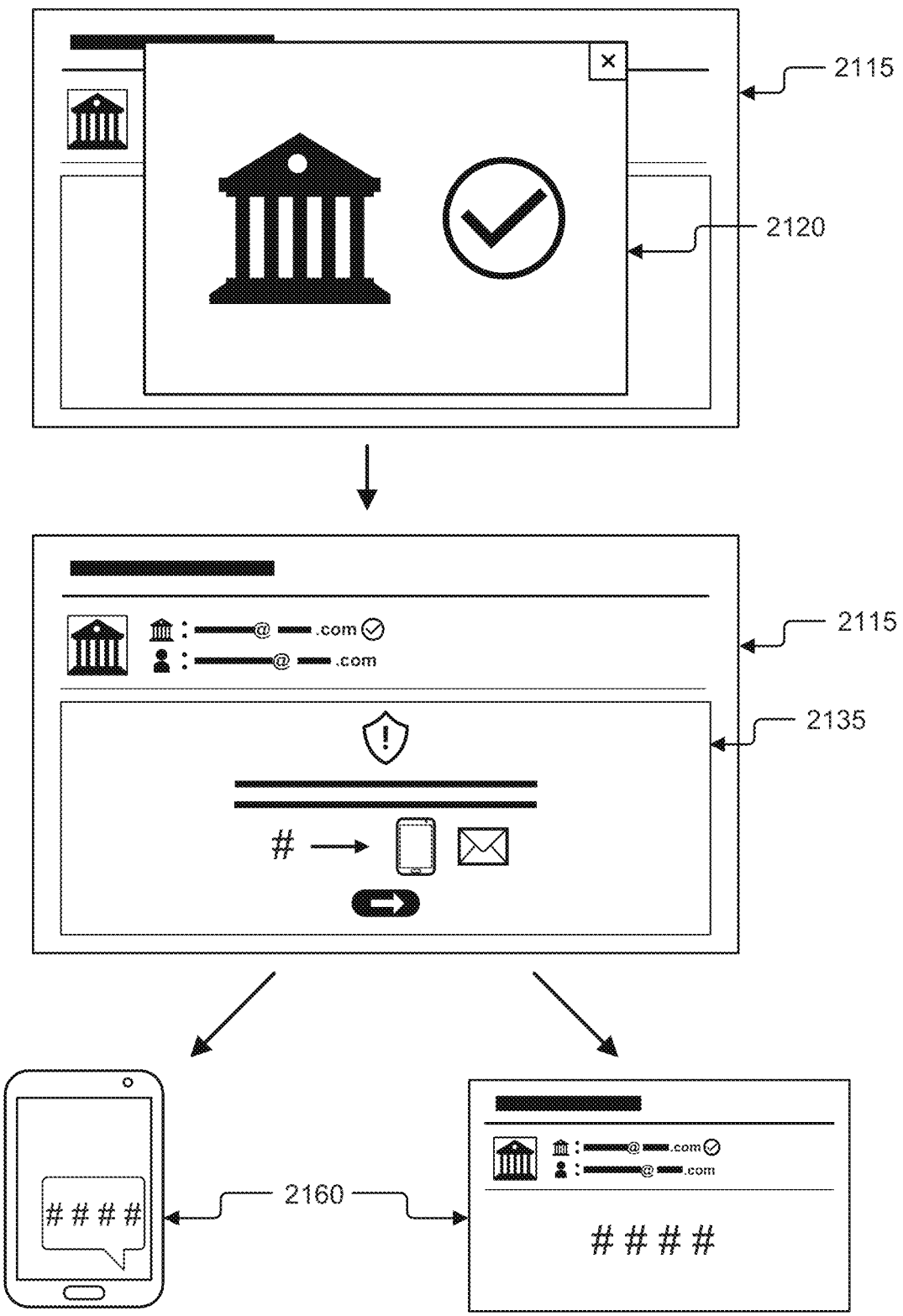
FIG. 21A illustrates exemplary process steps for providing content for an authenticable communication through an external authentication communication, according to some embodiments of the present disclosure.
Figure 21B:
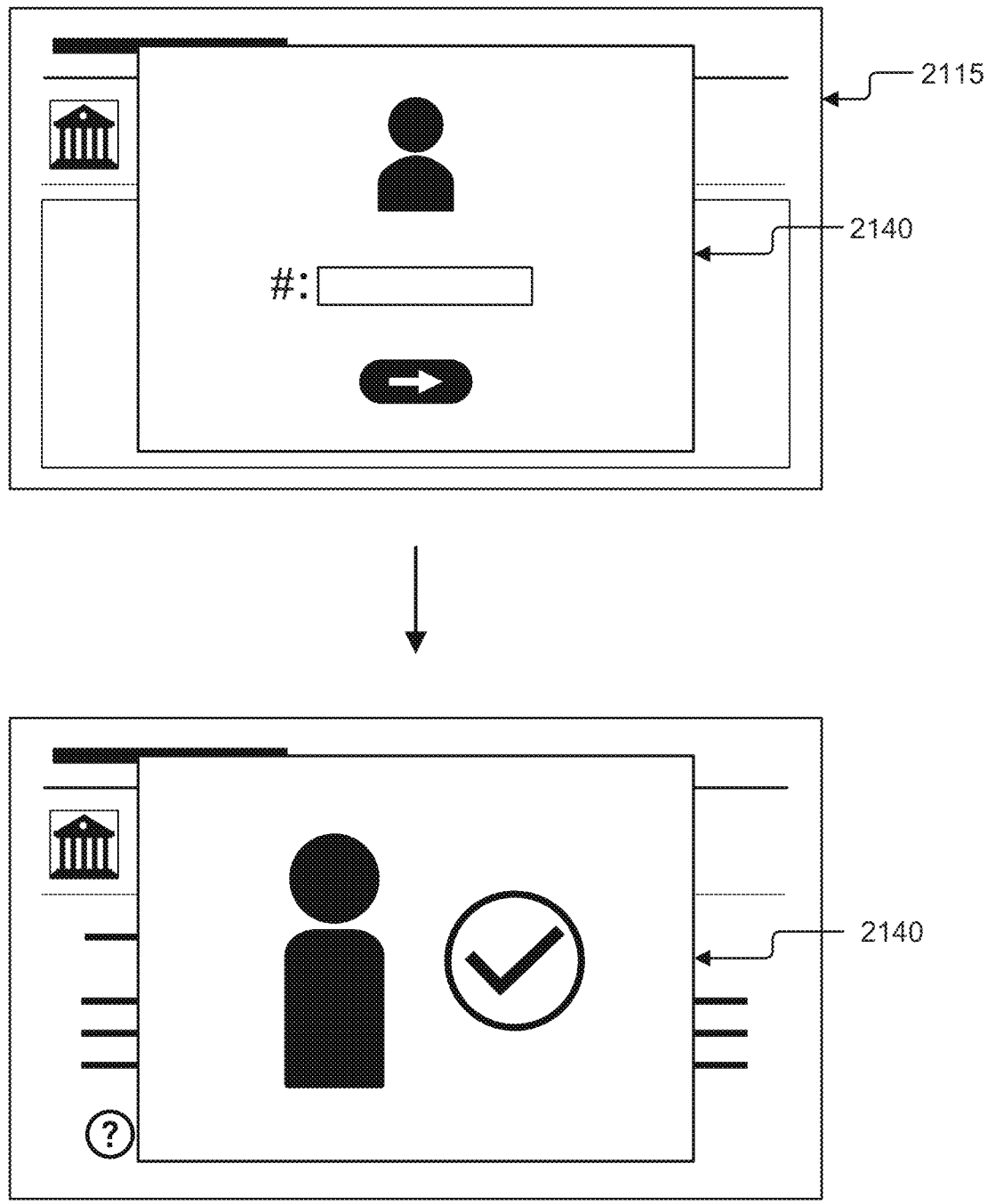
FIG. 21B illustrates exemplary process steps for providing content for an authenticable communication through an external authentication communication, according to some embodiments of the present disclosure.
Figure 21C:
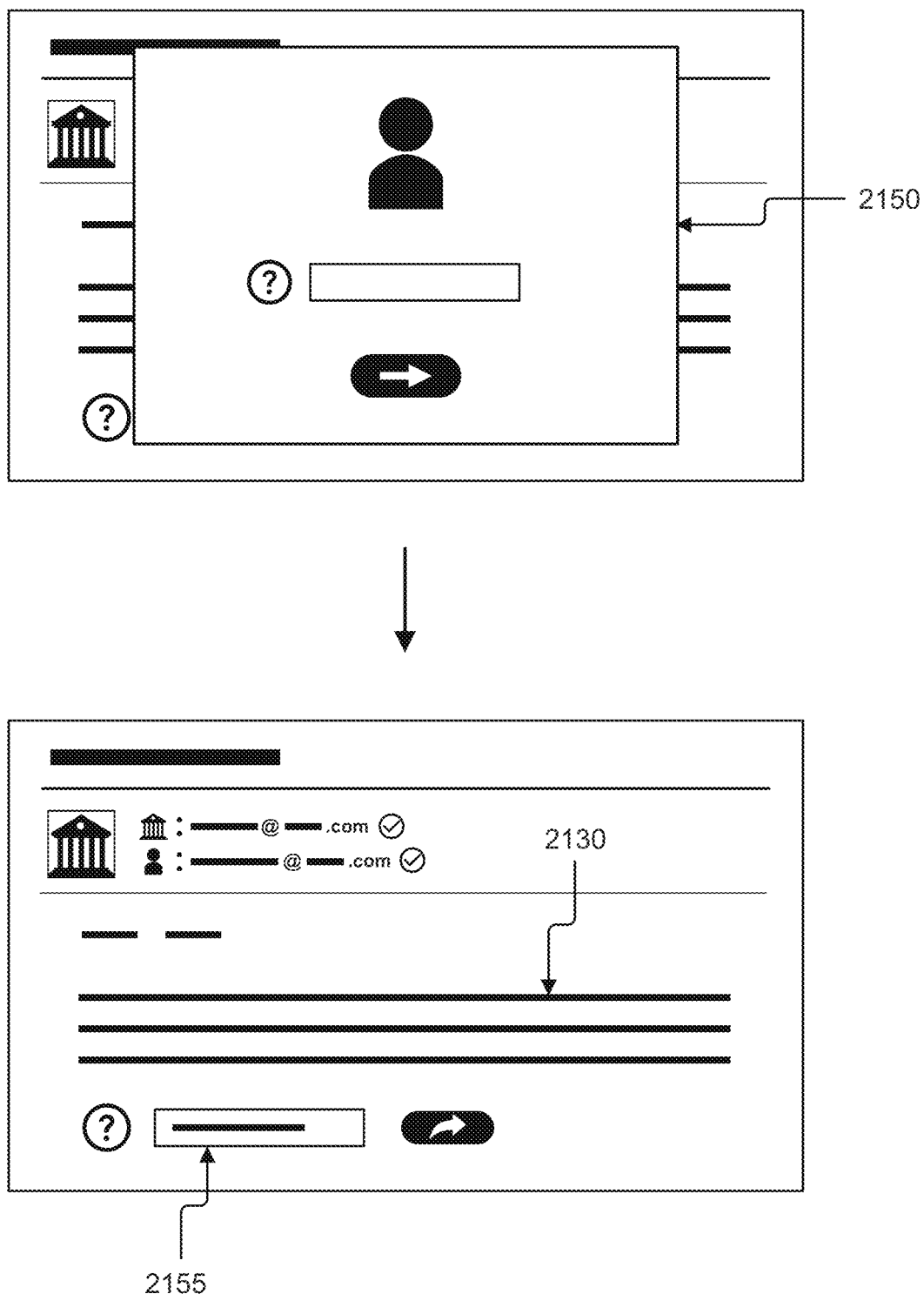
FIG. 21C illustrates exemplary process steps for providing content for an authenticable communication through an external authentication communication, according to some embodiments of the present disclosure.

Referring now to FIG. 21A-C, exemplary process steps for providing content 2130 for an authenticable communication 2115 through an external authentication communication 2160 are illustrated. In some aspects, source authentication may occur automatically and a source authentication screen 2120 may be displayed to confirm to the recipient that authentication occurred. In some embodiments, an intended recipient may be registered with an authentication system, directly or indirectly through an actual source, wherein a destination for an external authentication communication 2160 may be predefined.

In some aspects, a pre-authentication screen 2135 may indicate to the recipient that they need to access an external authentication communication 2160, such as text, email, push notification from a software application, or internal software application message, as non-limiting examples. In some aspects, an external authentication communication 2160 may be automatically transmitted when a recipient attempts to access the content 2130, such as when they open the authenticable communication 2115, click into a pre-authentication screen 2135, or explicit request transmission through the pre-authentication screen 2135.

In some embodiments, the external authentication communication 2160 may provide a time-limited code, wherein a recipient must input the code into a recipient authentication screen 2140 within a predefined time to access the content 2130. In some aspects, the recipient may have been pre-enrolled in the authentication system that allows them to authenticate the message containing the content 2130 from an external source.

In some aspects, the external authentication communication 2160 may be transmitted through a smart device, mobile device, or computer, as non-limiting examples. In some aspects, the external authentication communication 2160 may be transmitted through an app associated with the actual source, such as a banking application or tax provider application. In some embodiments, the external authentication communication 2160 may be transmitted through a central authentication app, which may be used by multiple sources. In some aspects, clicking into the authenticable communication 2115 may automatically send an authentication code to the external source allowing the recipient to access the content 2130. In some aspects, the source may send an authentication code through text, email or in-app depending on the recipient preference. In some implementations, pre-registering recipients may allow for efficient authentication without requiring layers of logging in to separate systems and applications.

In some embodiments, once the recipient logs in then they may gain access to the recipient authentication screen 2140. In some embodiments, the recipient may then enter their access code or required information to bypass the recipient authentication screen 2140 and view content 2130. In some embodiments, the recipient may enter an access code, password and username, personal information, or any other non-limiting example that may grant the recipient access to the content 2130.

In some embodiments, once the recipient has been authenticated, they may gain access to an information input screen 2150. In some embodiments, the information input screen 2150 may allow for direct input of recipient information based on source requested data. In some implementations, the content 2130 may be fully accessible once the recipient has been granted by the system. In some implementations, the populated information 2155 may be directly input into a response or document that would be sent back to the actual source or another designated location.

As an illustrative example, the actual source may comprise a tax advisor who may have a small local company. The tax advisor may periodically send and request sensitive information and documents to clients, and the tax advisor may not be large enough to have their own software application. The tax advisor may request that their clients register with an authentication system, which may require input of limited personal information, contact information, and answers to predefined questions, as non-limiting examples. That information may be used to create a dynamic authentication method for each client. Some of the clients may prefer answering specific questions in a recipient authentication screen 2140, and others may prefer receiving an external authentication communication 2160 that contains no personal information.

The tax advisor may be able to adjust the authentication requirements depending on the content of the authenticable communication. A general information communication may not need to be authenticable. A communication providing tax guidance or other information that a recipient may only trust if it came directly from the tax advisor may be embedded with a source authentication screen and source authentication mechanism. A communication sending or requesting personal documents and information may require a dual layer of authentication. In some aspects, the dual layer may comprise two separate authentication screens that may separately authenticate the source and the recipient. In some embodiments, the dual layer may comprise transmission of an external authentication communication that could only transmit to the recipient if the indicated source was the actual source.

The tax advisor may request that a client complete a form or provide specific information. For efficiency and security, once fully authenticated, an authenticable communication may prompt input of the requested information, which may be directly inserted or populated into the reply or the document. This may limit the need to visit an external site or app to complete the request and may allow the recipient to operate within the authenticable communication.

Figure 22:
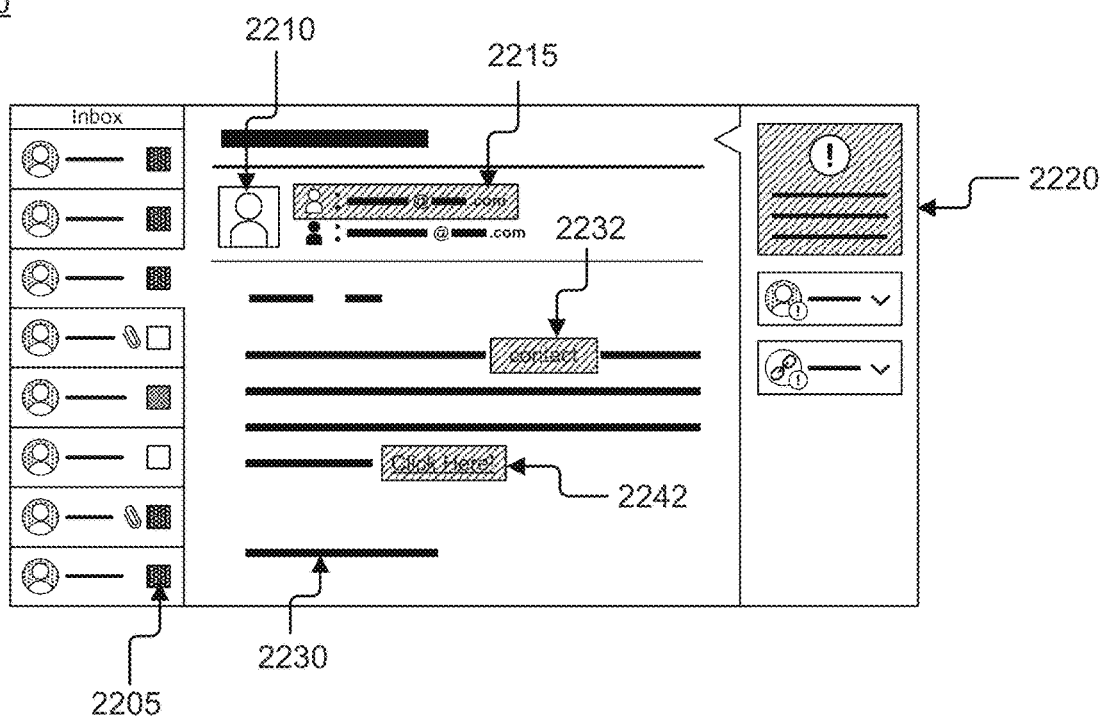
FIG. 22 illustrates exemplary security insights, wherein security insights are provided with the content of the authenticable communication and displayed in a security insight panel.

Referring now to FIG. 22, exemplary security insights are illustrated, wherein security insights are provided with the content 2230, 2232 of the authenticable communication 2200 and displayed in a security insight panel 2220. In some embodiments, an authenticable communication 2200 may comprise a quick view of authenticable communications, which may include a security insight indicator 2205. A security insight indicator 2205 may provide a shorthand understanding of risk assessment based on threshold levels of security risk. For example, security levels may comprise green for safe, yellow for potentially risky, and red for dangerous.

In some aspects, an authenticable communication 2200 may comprise an indicated source 2210, recipients, and content 2230, 2232. A risk assessment system may review and analyze the indicated source 2210 and at least a portion of content 2230, 2232. In some embodiments, analysis of content 2230, 2232 may be based on content type. For example, analysis and risk assessment of text content 2230 may be different than risk assessment of a link 2232, attachment, or image.

Date of creation of a link may suggest spam. Where the company may be a startup, a recent date of creation of an indicated source 2210 or link 2232 may not be suspicious. Where the indicate source 2210 may be an established person or company, a recently created link 2232 or email address may be suspicious. In some aspects, link security insights 2242 may highlight the link 2232. In some embodiments, an interstitial warning page may pop up if the recipient clicks the suspicious link 2232, allowing one more opportunity to avoid clicking the link 2232.

In some aspects, a risk assessment system may identify one or more recipients included in the authenticable communication 2200. An authenticable communication 2200 may be transmitted to a large group of recipients. A portion of those recipients may be suspicious, or the recipients may be unrelated. In some aspects, recipient analysis may include analysis of the "to" recipients, "cc" recipients, and anonymous "bcc" recipients, which may not be individually discernable. The recipient may be blind copied on an authenticable communication 2200. All recipients may be blind copied, which may indicate spam. One more of the direct recipients and carbon copied recipients may be suspicious or unrelated. In some embodiments, other recipients may be compared to other email addresses within the recipient's folders. Some overlap may be less suspicious than no overlap.

In some implementations, content security insights 2242 and indicated source security insights 2215 may be provided one or both directly on or proximate to the content 2230, 2232. In some aspects, content and indicated source security insights 2242, 2215 may be provided where a security risk level exceeds a threshold level. A low security risk may not trigger an onsite security insight, as mixing low risk and high-risk assessment may reduce the ability to understand or identify dangerous portion of an authenticable communication 2200.

In some embodiments, risk assessment of an indicated source may include a tracing of the pathway from one or both the indicated source to the recipient or the recipient reply back to the indicated source 2210. If the number of redirects exceeds a threshold level, the indicated source may be deemed suspicious. In some aspects, a reply email address may be different that the original email address of the indicated source, which may suggest that the indicated source is suspicious. The risk assessment may be mitigated or confirmed when combined with assessments of content within an authenticable communication. In some embodiments, a link may be unwound to understand the path and final destination, which may be compared to the alleged destination.

For example, different reply addresses may be legitimately used for salespeople. Where content is deemed safe, then the different reply address may be noted as potentially suspicious and the overall security insight conclusion may be that the authenticable communication is safe. Where at least a portion of content is deemed suspicious, then the different reply address may confirm or support a conclusion that the authenticable communication presents a high security risk. In some aspects, a security insight panel 2220 may allow for direct messaging with the indicated source 2210. The communication may be independently connected, wherein the direct messaging may occur between known actual sources and the recipient, which may limit risk of communication with a suspicious sender. This may allow for personal confirmation that the indicated source 2210 is the actual source.

In some embodiments, a security insight panel 2220 may provide information about an indicated source 2210. For example, a security insight panel 2220 may provide name, department, photograph, a summary of previous security insights from previously received authenticable communications. Understanding the department associated with the indicated source 2210 may confirm or reject other security insights. An indicated source 2210 may be associated with a logistics department and an attachment may pertain to a wire transfer, and the logistics department may never be involved in invoicing or billing. This may indicate an increased security risk, even if the indicated source 2210 and attachment are not independently suspicious.

A security insight panel 2220 may provide security insights for the authenticable communication 2200. A security insight panel 2220 may call out specifically identified security insights that may alert a recipient of potential risks or danger. Frequently, users ignore general or standard warnings, such as warnings that an email originated from a source external to the company or a standard warning not to open attachments unless you know the source. A security insight panel 2220 may increase the likelihood a recipient will heed the warnings.

In some aspects, a security insight panel 2220 may call out security insight issues that are specific to the actual content 2230, 2232 and indicated source 2210 instead of generic or standard notices. In some embodiments, a security insight panel 2220 may direct the recipient to specific actions, such as to avoid clicking on content, avoid replying to the authenticable communication 2200, or contact management, as non-limiting examples. The security insight panel 2220 may allow a recipient to directly chat with management, IT, or a risk assessment system representative.

Security insights 2215 for an indicated source 2210 may be highlighted based on predefined factors. For example, predefined factors may comprise date of creation, association of the email address with the indicated source 2210, or whether a reply address is the same as the original address. A recent date of creation for an indicated source 2210 that is not as recent may indicate potential phishing or scams. Security insights may identify when the email address of the indicated source 2210 does not match known email addresses associated with the indicated source 2210.

For example, an indicated source 2210 may suggest origination from a large enterprise, but the email address includes a domain name not associated with the same enterprise. In some embodiments email addresses may reviewed and researched through external sources, such as WHOIS or DNS record information. This comparison may allow for identification of potential spoofing risks.

In some aspects, security insights 2242 for content 2230, 2232 may increase risk or may lower risk. For example, if the content 2230, 2232 is not suspicious, but the email address is new, then the authenticable communication 2200 may not be flagged as dangerous. In some embodiments, security insights 2242, 2215 may be provided based on threshold or selected risk levels.

Figure 23:
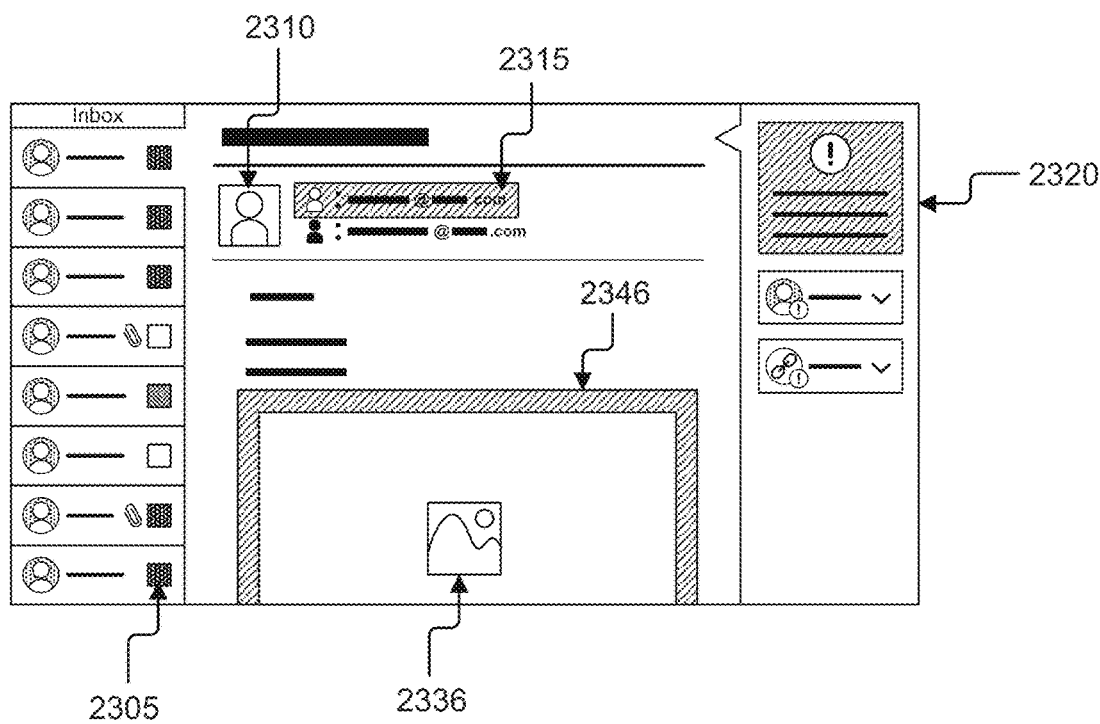
FIG. 23 illustrates exemplary security insights, wherein security insights are provided with the content of the authenticable communication and displayed in a security insight panel.

Referring now to FIG. 23, exemplary security insights are illustrated, wherein security insights are provided with the content 2336 of the authenticable communication 2300 and displayed in a security insight panel 2320. In some aspects, a risk assessment system may identify an image 2336 within content of an authenticable communication 2300. The image 2236 may be analyzed for metadata that may contradict the indicated source 2310 or may separately indicate risk. For example, a seemingly innocuous email from a colleague with an image 2236 may be tagged as "trojanhorse", in a different language than the colleague typically speaks, or may be a series of symbols. Those tags may indicate a security risk. In some aspects, image security insights 2346 may identify that an image 2336 may actually contain a link.

Figure 24:
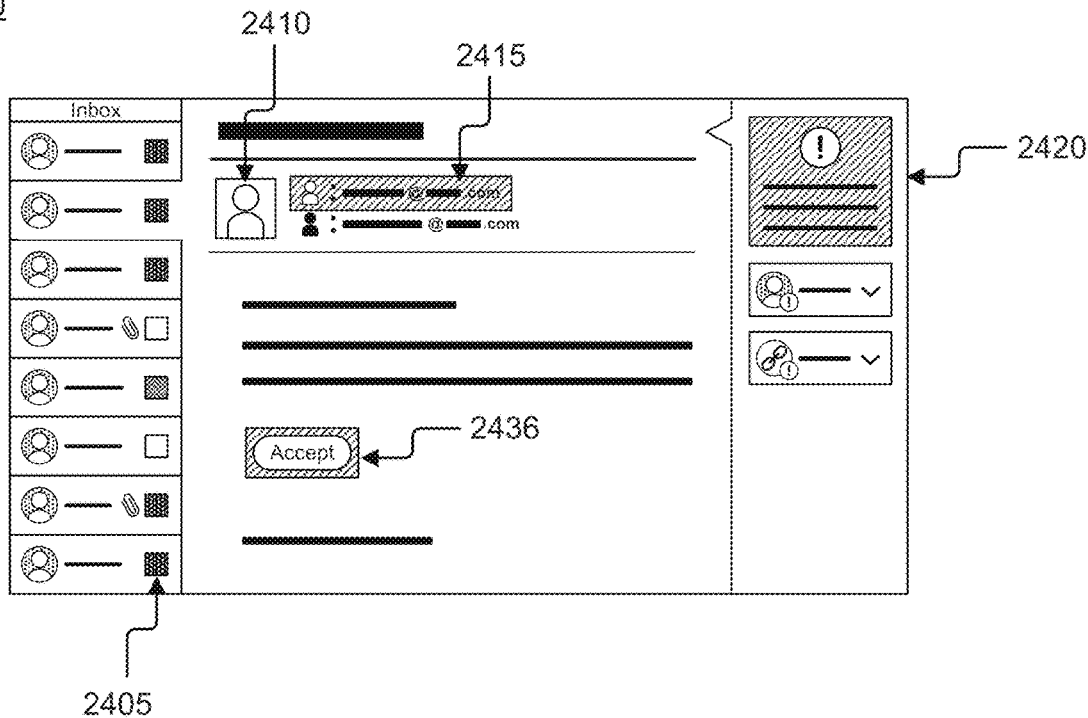
FIG. 24 illustrates exemplary security insights, wherein security insights are provided with the content of the authenticable communication and displayed in a security insight panel.

Referring now to FIG. 24, exemplary security insights 2415, 2446 are illustrated, wherein security insights 2415, 2446 are provided with the content 2436 of the authenticable communication 2400 and displayed in a security insight panel 2420. In some aspects, content may comprise an image 2436 flagged as suspicious. An image 2436 may appear to be a button or link. An image 2436 may appear to be an active link but does not comprise a link, which may indicate that the authenticable communication 2400 may comprise other suspicious content that lures a recipient in through other means. An image 2436 may comprise a link that is not associated with the indicated source 2410, which may support indicated source security insights 2415 that indicate that the authenticable communication 2400 does not originate from the indicated source 2410.

Figure 25:
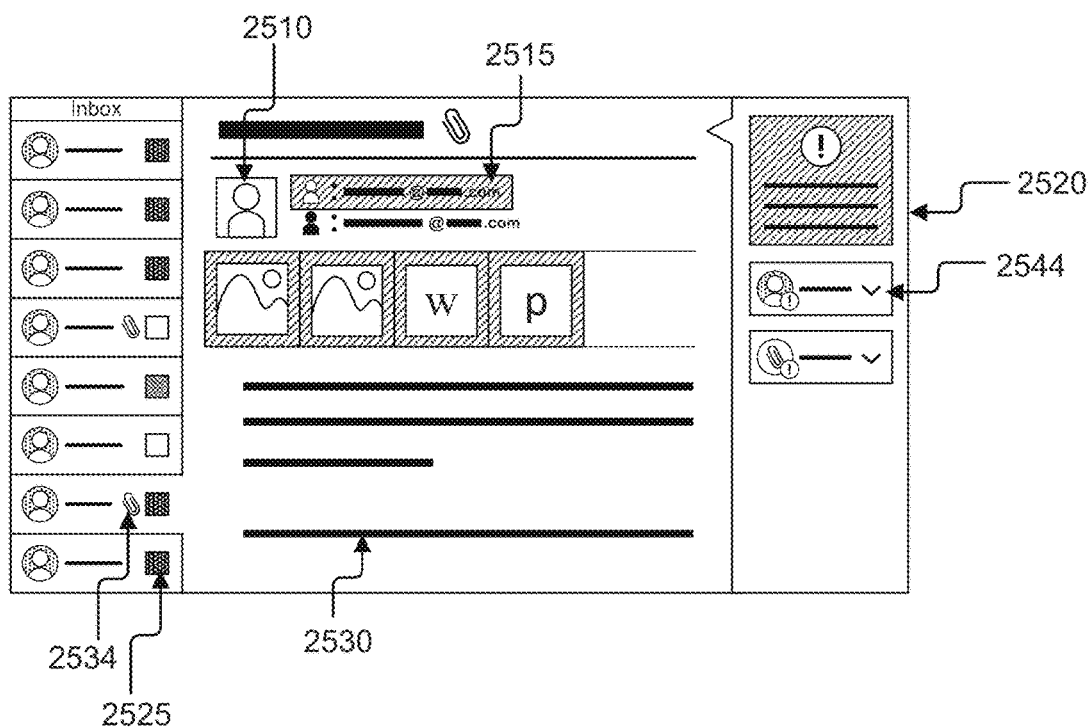
FIG. 25 illustrates exemplary security insights, wherein security insights are provided with the content of the authenticable communication and displayed in a security insight panel.

Referring now to FIG. 25, exemplary security insights 2515, 2544 are illustrated, wherein security insights 2515, 2544 are provided with the content 2534 of the authenticable communication 2500 and displayed in a security insight panel 2520. In some embodiments, content may comprise one or more attachment 2534. Attachments 2534 may be reviewed and analyzed. In some aspects, such as shown in FIGS. 38A-38D, suspicious attachments 2534 may be previewed safely, such as through use of an external sandbox that prevents a recipient from downloading the attachment 2534 locally to their computer.

In some embodiments, attachment security insights 2544 may identify risky attachments with explanation of risk. In some aspects, explanation of risk may be included in a security insight panel 2520. In some implementations, explanation of risk may be an optional view, such as a hover over informational display, which may be useful where security insights include technical terminology that a recipient may not be familiar with. Where the explanation of risk is specific to the authenticable communication 2500, the explanation may be highlighted for recipient review.

Figure 26:
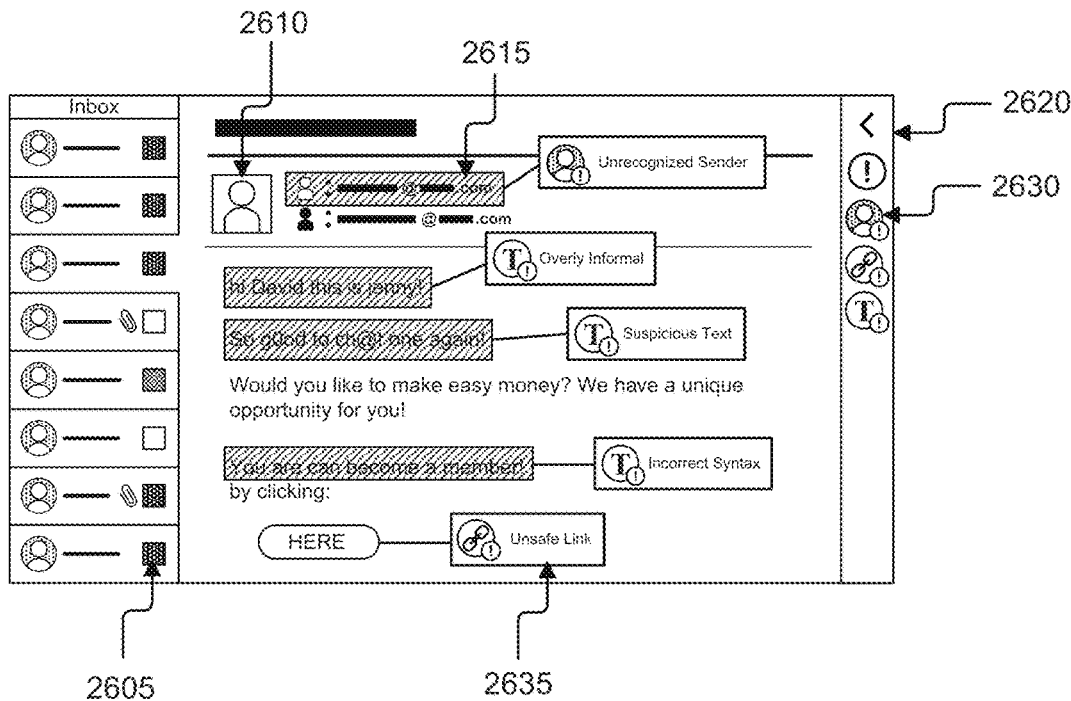
FIG. 26 illustrates exemplary security insights, wherein security insights are provided with the content and displayed in a security insight panel in a collapsed view.

Referring now to FIG. 26, exemplary security insights 2615, 2640 are illustrated, wherein security insights 2615, 2640 are provided with the content 2630 and displayed in a security insight panel 2620. In some aspects, content may comprise text 2630. In some embodiments, a security insight panel 2620 may be expanded or collapsed based on screen size or preference. This may allow for effective view of the authenticable communication 2600 and security insights 2615, 2640. In some embodiments, when the security insight panel 2620 is collapsed, the security insights 2615, 2640 may necessarily be provided on site. When the insight panel 2620 is expanded, on site security insights 2615, 2640 may be optional.

Figure 27:
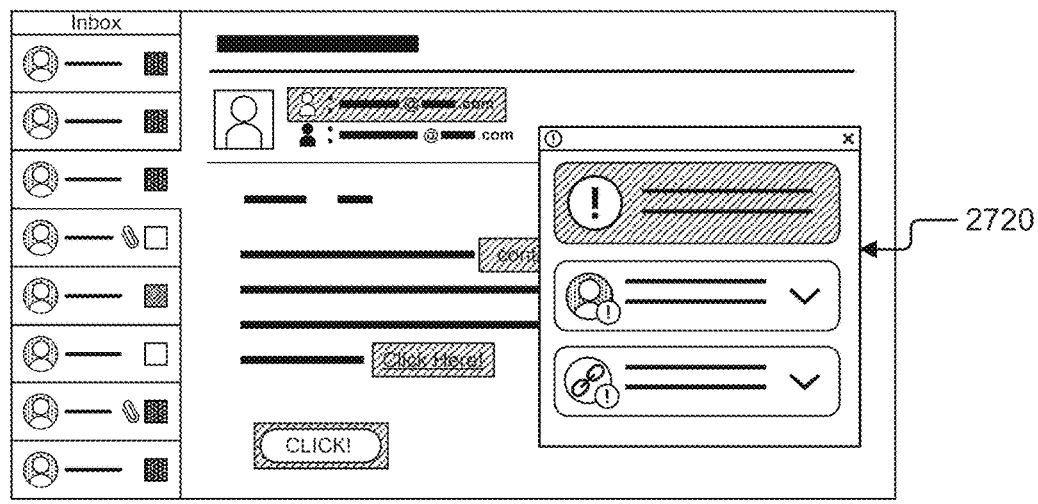
FIG. 27 illustrates exemplary security insights, wherein security insights are provided with the content and displayed in a security insight panel in a pop-out view.

Referring now to FIG. 27, exemplary security insights are illustrated, wherein security insights are provided with the content and displayed in a security insight panel 2720 in a pop-out view. In some aspects, a security insight panel 2720 may comprise an independent window, which may allow a recipient to move the security insight panel 2720. In some embodiments, a security insight panel 2720 may originally be located within an authenticable communication 2700. The security insight panel 2720 may popped out, such as by dragging the security insight panel 2720 outside of the access method, such as a software application or browser, as non-limiting examples.

Figure 28:
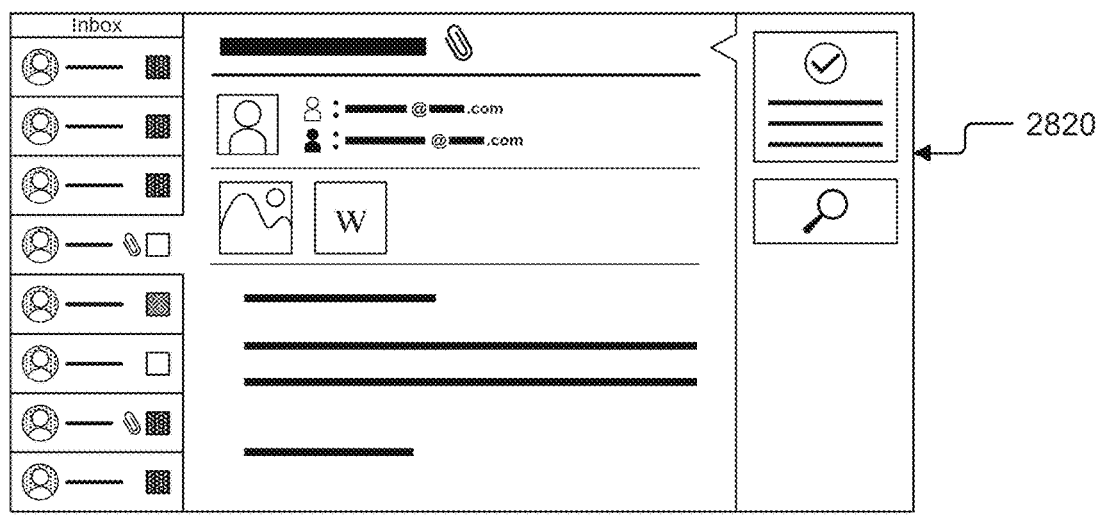
FIG. 28 illustrates exemplary security insights, wherein security insights are displayed in a security insight panel.

Referring now to FIG. 28, exemplary security insights are illustrated, wherein security insights are provided in a security insight panel 2820. In some aspects, a risk assessment system may review an indicated source and content of an authenticable communication 2800 and determine that there is little to no risk associated with the authenticable communication 2800. In some embodiments, a security insight panel 2820 may indicate that the authenticable communication 2800 is not risky, which may allow a recipient to understand that the authenticable communication 2800 has been processed and reviewed.

In some implementations, security insights may be provided with one or more of the indicated source or content. For example, security insights for an indicated source may explain that the email address is commonly associated with the indicated source, which supports a conclusion that the indicated source and actual source are the same. As another example, content may comprise text and attachments. The text may be analyzed through natural language processing, wherein review indicates that the linguistics and syntax match the indicated source.

Text may be reviewed for interrupter symbols or numbers that may typically cause a word to be overlooked in a security review. In some embodiments, an embedded image may be converted to text to analyze its contents as if it were text. The conversion may occur separately and isolated, which may limit download of contents. In some embodiments, identified issues may be specifically highlighted or underlined, such as underlining suspicious text portions. In some aspects, an image may be appear to be text, which may be suspicious. The image may be clickable, which may increase the security risk of the authenticable communication.

Reviewed attachments may be designated as safe and actually originated by the indicated source. Providing additional information regarding security insights when the authenticable communication 2800 is deemed safe may allow the recipient to feel confident with the authenticable communication 2800. The safe security insights may inform a recipient of what characteristics appear safe and what criteria are analyzed.

Figure 29:
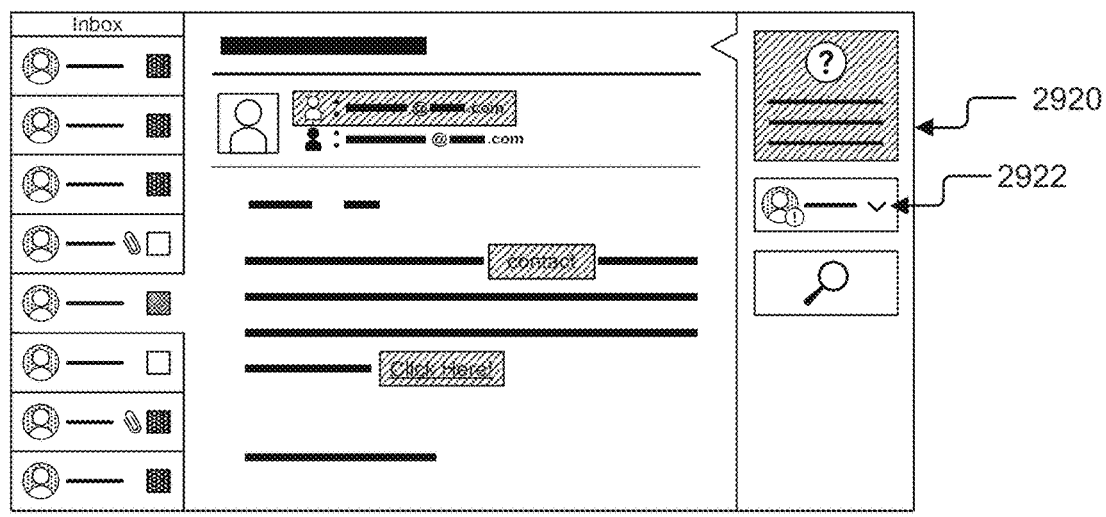
FIG. 29 illustrates exemplary user functions within a security insight panel, according to some embodiments of the present disclosure.

Referring now to FIG. 29, exemplary recipient functions 2922 within a security insight panel 2920 are illustrated. In some aspects, an insight panel 2920 may provide security insights for an authenticable communication 2900. The security insights may comprise a summary that indicates the overall risk level of the authenticable communication 2900. In some aspects, security insights may include details of suspicious characteristics of the authenticable communication 2900, such as an indicated source that does not align with an actual source or an image that contains a hidden link to a suspicious site.

In some embodiments, a recipient may be able to submit work orders related to security insights. For example, a recipient may request additional explanation as to why an indicated source was deemed suspicious. As another example, security insights may determine that a link has low security risk, but the recipient may believe that the link is still suspicious, such as based on prior interactions with the indicated source. The recipient may request additional review of the link.

In some aspects, only a portion of content may be reviewed, such as based on settings, preferences, or subscription levels. For example, security insights may be limited to a risk assessment of the indicated source and attachments. A recipient may manually review the remaining content and may submit review requests for manually identified suspicious content. In some embodiments, a recipient may request crowd sourced data for at least a portion of the authenticable communication 2900. For example, a recipient may request how many people have received an authenticable communication 2900 with the same or similar attachments. In some aspects, the request may be submitted to one or more of a risk assessment system, an IT department within a corporation, or a risk administrator.

Figure 30:
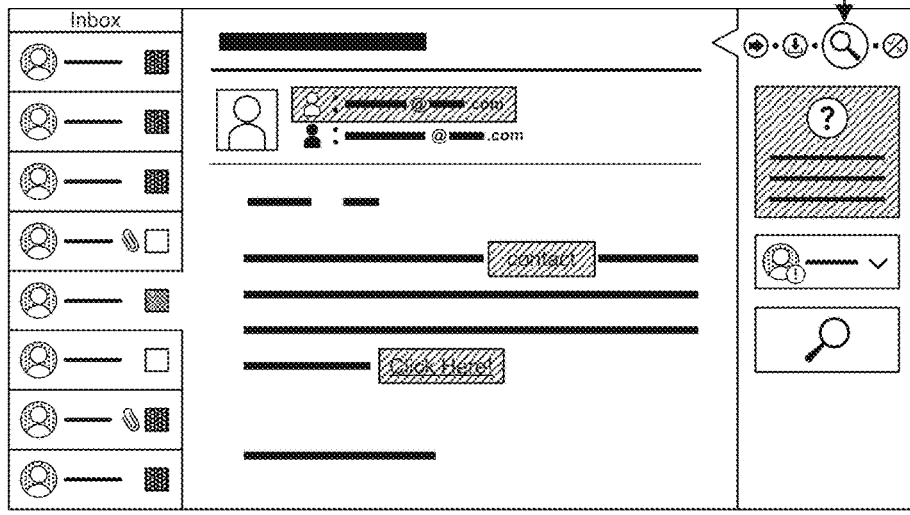
FIG. 30 illustrates exemplary user functions within a security insight panel, according to some embodiments of the present disclosure.

Referring now to FIG. 30, exemplary recipient functions 3022 within a security insight panel 3020 are illustrated. In some embodiments, a recipient may be able to track submitted work orders related to security insights for an authenticable communication 3000. Frequently, recipients are unable to track or know the status of submitted work orders, which may suspend recipient activity or cause a relationship to stagnate as the recipient may be unable to respond to an authenticable communication 3000 until the issue is resolved.

A security insight panel 3020 may allow the recipient to track work orders submitted for the specific authenticable communication 3000. Tracking the status may allow the recipient to act accordingly while awaiting response. For example, while waiting on confirmation of a security insight, the recipient may call the indicated source and notify them that they are working on a response, which allows the recipient to preserve communications and relationships.

Figure 31:
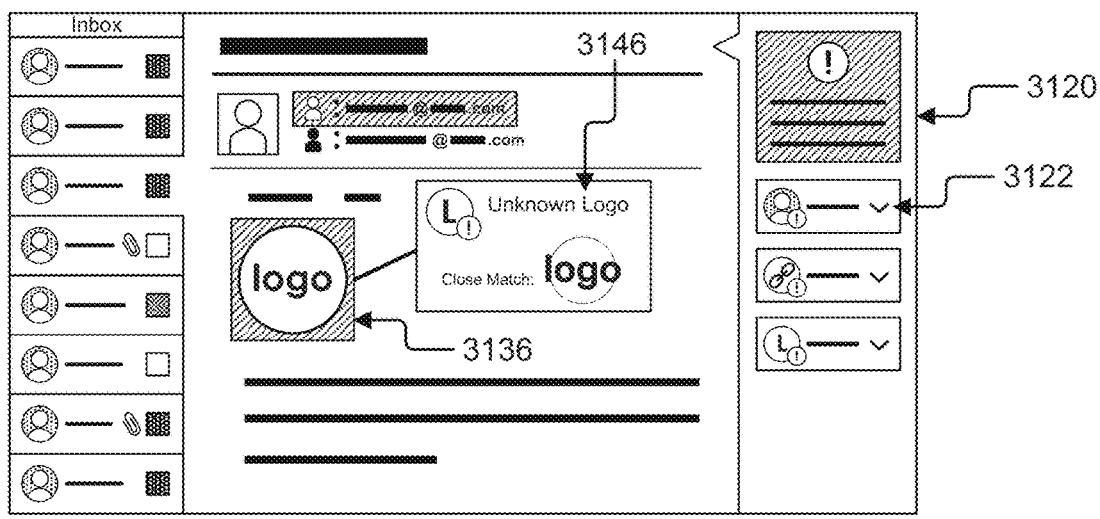
FIG. 31 illustrates exemplary user functions within a security insight panel, according to some embodiments of the present disclosure.

Referring now to FIG. 31, exemplary recipient functions 3122 within a security insight panel 3120 are illustrated. In some embodiments, recipient functions 3122 may allow a recipient to select portions of content that they are requesting review of. The ability of the recipient to independently request review of targeted portions of the authenticable communication 3100 may allow for more precise security insights. Tracking requests and work orders for each submitted portion may be useful, particularly where the requests may be transmitted to multiple or different reviewers.

For example, a user may request review of an image 3136 in an authenticable communication 3100. The request may be transmitted directly or indirectly to a risk assessment system, such as through an IT department or an administrator. The image 3136 may comprise a logo for the indicated source. An assessment of the image 3136 may compare the image 3136 to actual logos associated with the indicated source. Image security insights 3146 may indicate that the image 3136 includes a skewed or warper version of the actual logo, which may suggest the image 3136 is not from the indicated source. Image security insights 3146 may indicate the image 3136 comprises a different logo than an actual logo. For example, the image 3136 may comprise a slightly different color, misspelling, or a slightly different design.

Figure 32:
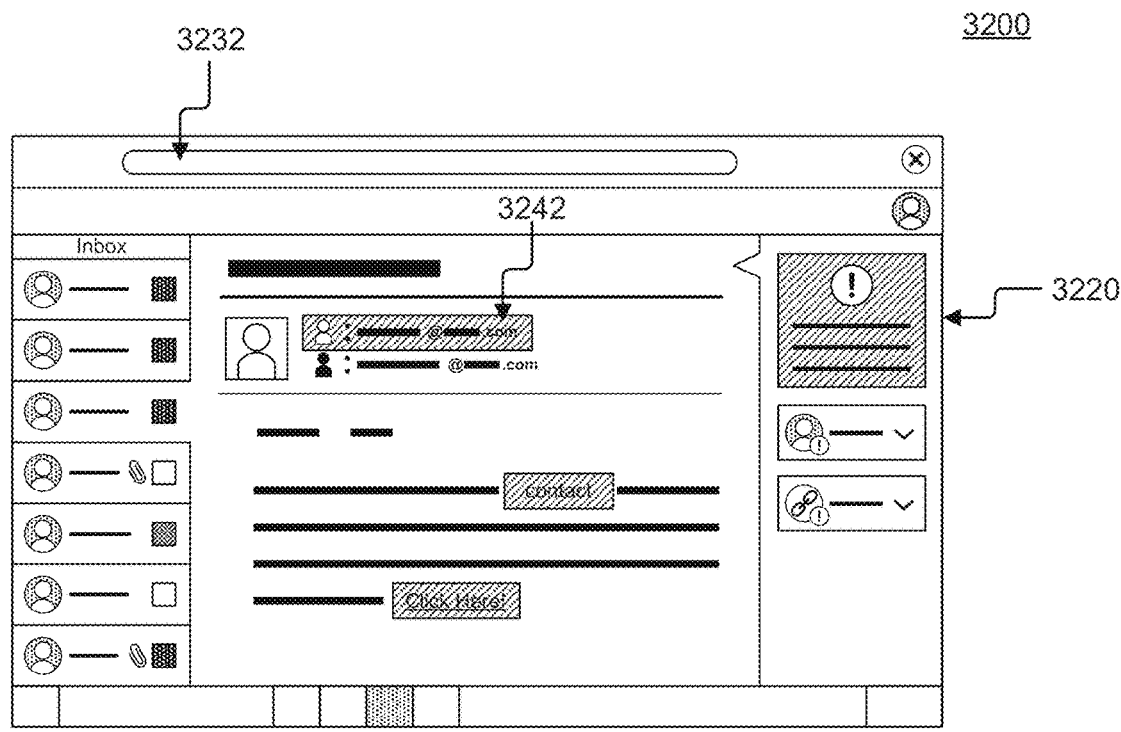
FIG. 32 illustrates exemplary security insights and security insight panel, wherein an authenticable communication is accessed through a browser.

Referring now to FIG. 32, exemplary security insights 3242 and security insight panel 3220 are illustrated, wherein an authenticable communication 3200 is accessed through a browser. In some aspects, an authenticable communication 3200 may be accessed through a browser, such as through a portal, online version of a software, or online-based services. In some embodiments, indicated source and content of the authenticable communication 3200 may be reviewed.

In some implementations, the web address 3232 for the browser may be reviewed with domain security insights 3242. For example, a website may appear to originate from the indicated source, but the web address 3232 may not be associated with the indicated source. This may indicate that the site is not legitimate. In some aspects, a risk assessment system may be integrated with a browser, such as through a plug in. This may allow for an active risk assessment of a website when the browser is used, wherein each site or page may be reviewed as an authenticable communication 3200. In some embodiments, a browser risk assessment may be used independently or in conjunction with multiple risk assessment systems or authenticable communication access methods.

In some implementations, content of the authenticable communication 3200 may be compared and contrasted, which may provide layers of understanding. For example, an authenticable communication 3200 alleging to be a news source, but the web address 3232 is not associated with that news source, the authenticable communication 3200 and its contents may be flagged for fraud or misleading information. This may allow recipients to confirm that information is coming from a reliable source.

In some embodiments, an authenticable communication 3200 may comprise a website that prompts download of a program. Downloaded or downloadable content may be treated as an attachment that may be assessed for security insights. In some aspects, downloadable content may be intercepted for security review before allowing local download of the file. The interception may allow for a sand boxed analysis of the file without affecting a recipient's local device. This may allow for control of program usage within an enterprise. For example, the enterprise may utilize a particular project management tool that encrypts all communications and project details. Limiting access to downloads may prevent an individual from downloading a different project management tool.

Figure 33:
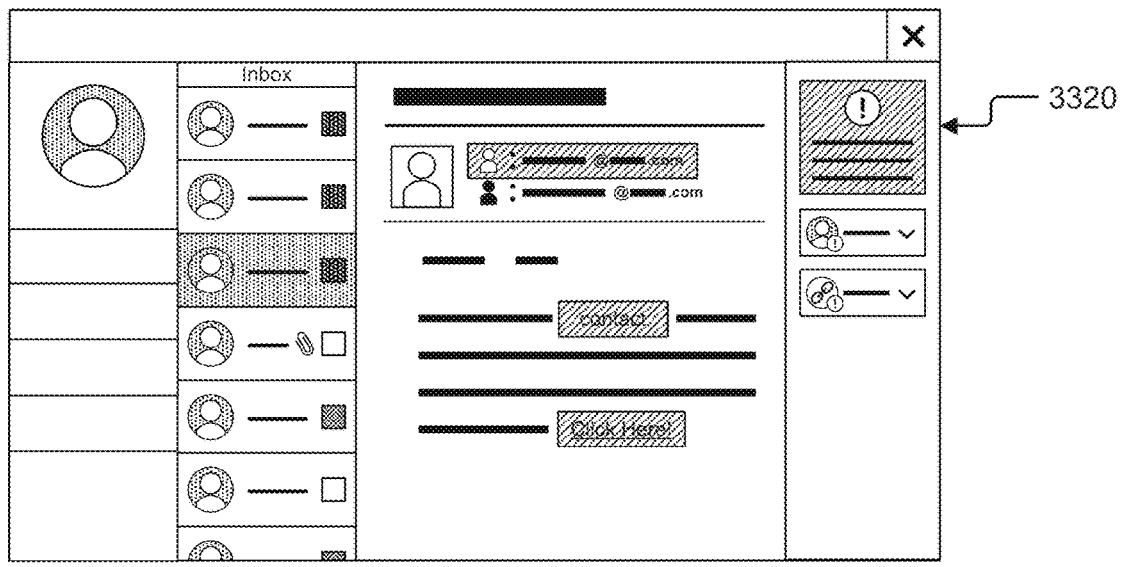
FIG. 33 illustrates exemplary security insights and security insight panel, wherein an authenticable communication is accessed through a portable device.

Referring now to FIG. 33, exemplary security insights and security insight panel 3320 are illustrated, wherein an authenticable communication 3300 is accessed through a portable device. In some aspects, a security insight panel 3320 may be adaptive to multiple access devices, such as desktops, laptops, or tablets. Adaptability may allow for consistent review of authenticable communications 3300 over multiple devices.

Figure 34A:
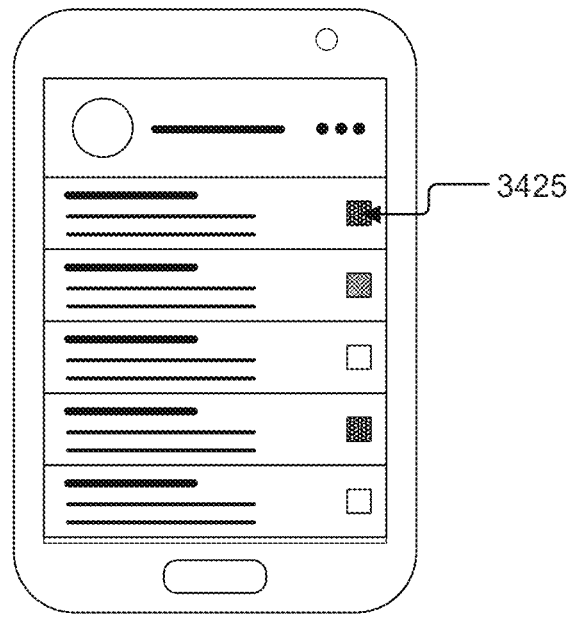
FIG. 34A illustrates exemplary security insights and display of security insights, wherein an authenticable communication is accessed through a mobile application.

Referring now to FIG. 34A, exemplary security insights and display of security insights are illustrated, wherein an authenticable communication is accessed through a portable mobile application. In some embodiments, a risk assessment system may be integrated or downloaded locally to a portable device. A local version of a risk assessment system may provide security insights for multiple applications and authenticable communication access methods. In some embodiments, an overview of multiple authenticable communications may comprise security insight indicators 3425, which may allow for a quick understanding of risk.

Figure 34B:
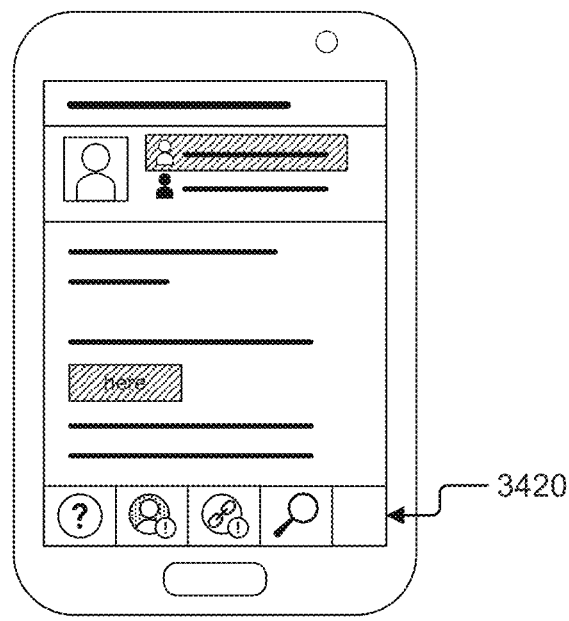
FIG. 34B illustrates exemplary security insights and display of security insights, wherein an authenticable communication is accessed through a mobile application.

Referring now to FIG. 34B, exemplary security insights and display of security insights through a security insight panel 3420 are illustrated, wherein an authenticable communication 3400 is accessed through a mobile application. In some embodiments, a security insight panel 3420 may be located at a base of the screen when the portable device is vertically oriented and may shift to a side panel when the portable device is horizontally oriented, which may allow for convenient viewing with limited blocking of the authenticable communication 3400.

Figure 35A:
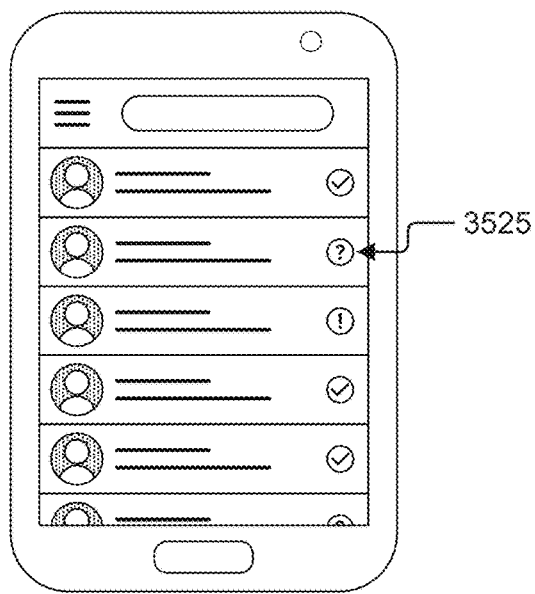
FIG. 35A illustrates exemplary security insights and display of security insights, wherein an authenticable communication is accessed through a messaging application.
Figure 35B:
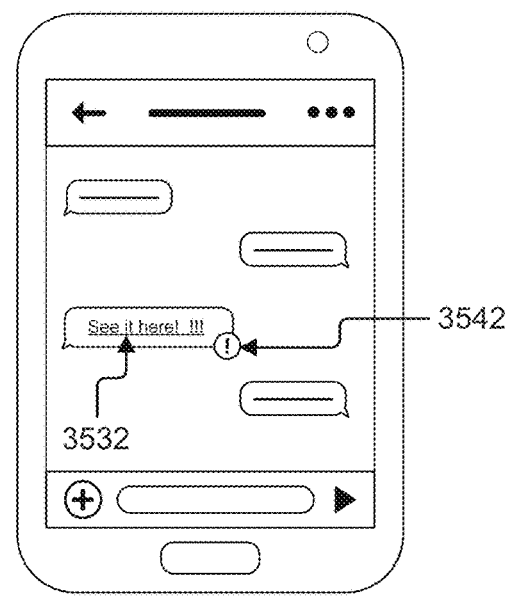
FIG. 35B illustrates exemplary security insights and display of security insights, wherein an authenticable communication is accessed through a messaging application.

Referring now to FIG. 35A, exemplary security insights and display of security insights are illustrated, wherein an authenticable communication 3500 is accessed through a messaging application. Referring now to FIG. 35B, exemplary security insights and display of security insights are illustrated, wherein an authenticable communication 3500 is accessed through a messaging application. In some embodiments, authenticable communications may comprise texts and communications through a messaging application. In some implementations, an overview view of multiple conversations may comprise security insight indicators 3525.

Security insight indicators 3525 may allow a recipient to see a suspicious indicator without having to click into the authenticable communication 3500, which may limit risk of interfacing with the authenticable communication 3500. For example, an authenticable communication 3500 may originate from a questionable apparent or actual source. In some aspects, a risk assessment system may evaluate content of an authenticable communication 3500 without requiring a recipient to click into the authenticable communication 3500. A risk assessment may include identifying an indicated source, at least one recipient, and content. Content may comprise images, attachments, text, and links. In some implementations, authenticable communications 3500 sent to a large group may be more suspicious than authenticable communications 3500 sent directly to the recipient.

In some embodiments, an authenticable communication 3500 may comprise a link 3532. Link security insights 3542 may indicate that the link 3532 is suspicious. For example, the link 3532 may cause a download of executable software. Link security insights 3542 may be highlighted in the messaging application, which may clearly indicate security risks limiting the chance that a recipient will click a link 3532 without understanding the risk.

In some aspects, text may be reviewed based on natural language processing. For example, where an authenticable communication 3500 is a continuing conversation with a known indicated source, new text may be compared to known linguistic tendencies of the indicated source. For new indicated sources, the text may be reviewed based on standard linguistics, such as syntax and vocabulary that may be generated through translation of one or more foreign languages or computer generation.

Figure 36:
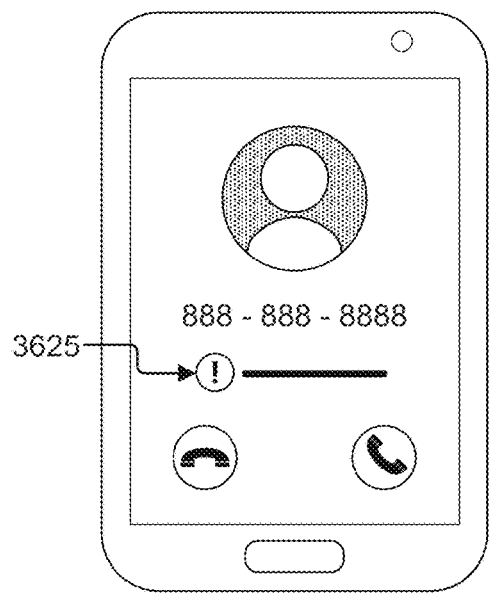
FIG. 36 illustrates exemplary security insights and display of security insights, wherein an authenticable communication is accessed through a calling application.

Referring now to FIG. 36, exemplary security insights and display of security insights are illustrated, wherein an authenticable communication 3600 is accessed through a calling application. In some aspects, security insights may be provided in real time as a call is received. In some embodiments, a security insight indicator 3625 may immediately convey a risk level associated with the phone number. In some implementations, a recipient may be able to click into a security insight indicator 3625 to review more details on the security insight.

In some embodiments, a risk assessment system may access voicemails and messages left by indicated sources. Voicemail content may be compared to indicated sources. For example, an indicated source may be a company, and the voicemail may not mention any company. In some aspects, voicemail may be reviewed through natural language processing. For example, a voicemail may be automated or prerecorded, which may indicate that the indicated source is suspicious or at least that the voicemail is not personal to the recipient.

In some embodiments, a risk assessment system may identify whether the phone number originates from an online communication system. In some implementations, a risk assessment system may determine whether the call was set to ring once or not ring at all, wherein the indicated source could directly leave a message and eliminate the possibility that a recipient could answer the call.

Figure 37A:
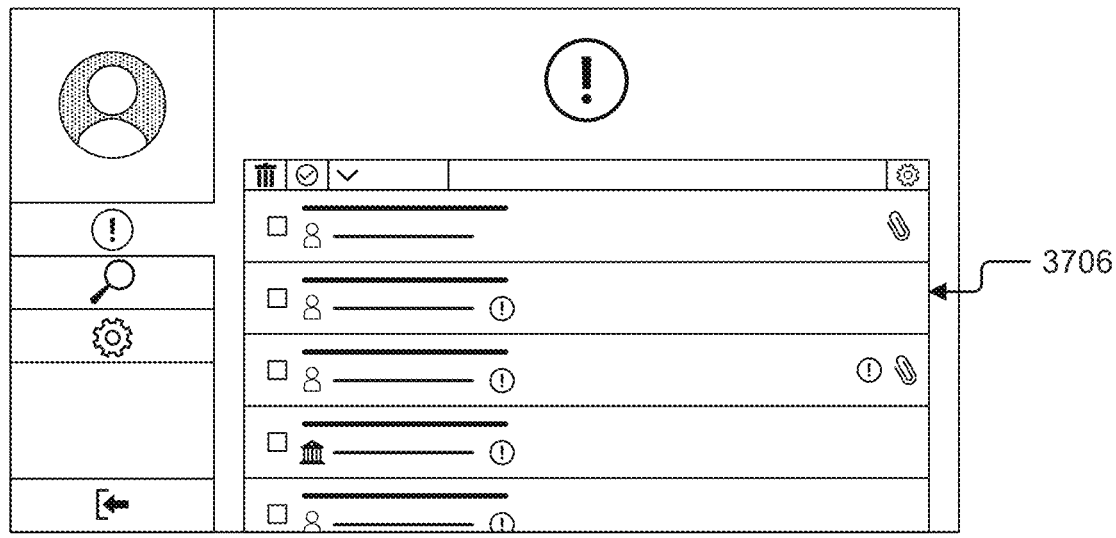
FIG. 37A illustrates an exemplary security insight management interface, wherein the management interface allows for overview of security insights for a plurality of authenticable communications.

Referring now to FIG. 37A, an exemplary security insight management interface 3705 is illustrated, wherein the management interface 3705 allows for overview of security insights for a plurality of authenticable communications. In some aspects, a management interface 3705 may comprise an overview interface 3706, which may allow for a view of security insights for multiple authenticable communications. In some embodiments, a management interface 3705 may be accessible by one or more a manager, administrator, or IT department. An overview interface 3706 may allow for summaries of security insights for multiple authenticable communications to multiple recipients, such as from a department, company, or authenticable communication subscribers.

In some embodiments, a security insight management interface 3705 may allow for identification and triage of high-risk authenticable communication. For example, a security insight management interface 3705 may provide visibility of risk levels of authenticable communications received and reviewed. In some embodiments, authenticable communications tagged as high risk may be intercepted and may never be received by a recipient. In some aspects, predefined security insights may prompt transmission of direct communication with an identified user, such as an administrator, IT department, or manager. As examples, predefined security insights may comprise threshold levels of risk, predefined content risks, predefined indicated sources, or predefined content, such as links to known suspicious sites.

The overview interface 3706 may be customizable, such as sortable or filterable. An overview interface 3706 may be toggled to show different levels of security insights or sorted to show highly suspicious authenticable communications first. In some aspects, the overview interface 3706 may allow for direct access to authenticable communications to allow for direct review of each authenticable communications. In some embodiments, the overview interface 3706 may be limited to security insights or security insight summaries, which may limit the ability to access content of authenticable communications, which may protect recipient privacy and confidentiality of content.

In some aspects, an overview interface 3706 may be filtered to show specific security insights, such as those related to a specific indicated source, those related to attachments, or those sent to a specific recipient, as non-limiting examples. Filtering only security insights to a specific recipient may allow for visibility of individuals who may be susceptible to security risks, such as those in the payables department or those working on highly confidential projects. Filtering security insights from an indicated source may provide visibility on how many authenticable communications from the same indicated source are flagged as suspicious. A large number of suspicious authenticable communications may prompt a company to disengage relations with the indicated source or to notify the indicated source of the issue. In some aspects, an administrator may accept or reject security insight findings.

Figure 37B:
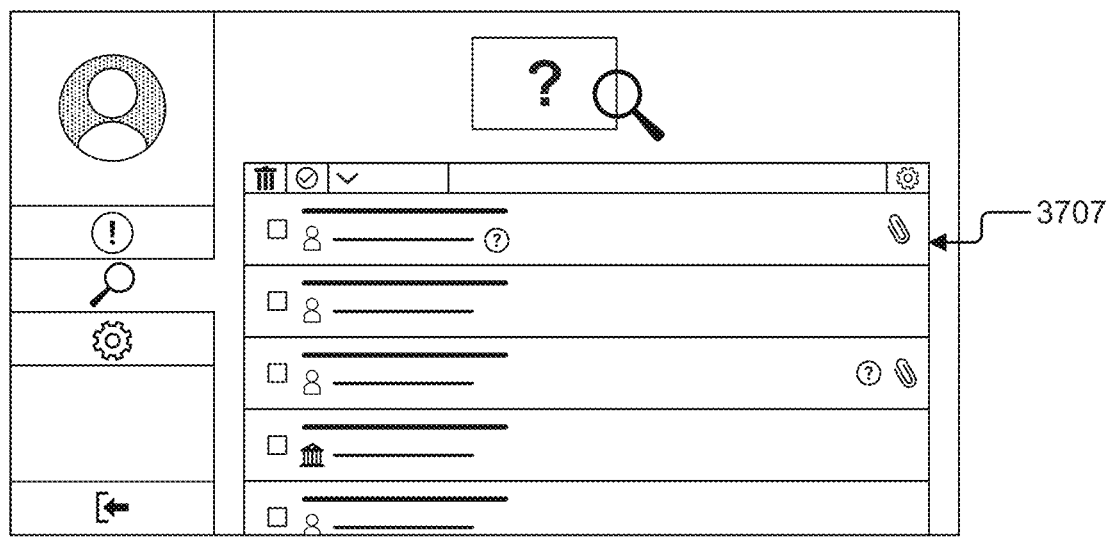
FIG. 37B illustrates an exemplary security insight management interface, wherein the management interface allows for overview of security insights for a plurality of authenticable communications.

Referring now to FIG. 37B, an exemplary security insight management interface 3705 is illustrated, wherein the management interface 3705 allows for overview of security insights for a plurality of authenticable communications. In some aspects, a security insight management interface 3705 may comprise a security insight request management interface 3707, which may allow for tracking of work orders related to authenticable communication security insights. In some implementations, a security insight request management interface 3707 may allow for visibility and management of pending and completed security insight requests. Tracking security insight requests may inform decisions about the risk assessment system and settings, such as illustrated in FIGS. 37D and 37E.

In some embodiments, recipients may submit security insight requests, such as requests for more information or requests to review specific portions of an authenticable communication. A security insight request management interface 3707 may indicate trends, such as where the most requests originate, what portion of authenticable communications prompt the most requests, or which types of security insights prompt the most requests.

For example, where the majority of requests originate from a particular department, that department may require additional education or may require a higher level of review. That department may receive a disproportionate number of attachments, so the security insights may need to be more in depth and detailed for authenticable communications to that department. That department may comprise a group of individuals least familiar with the communication system or company protocols, so the group may benefit from additional education.

Figure 37C:
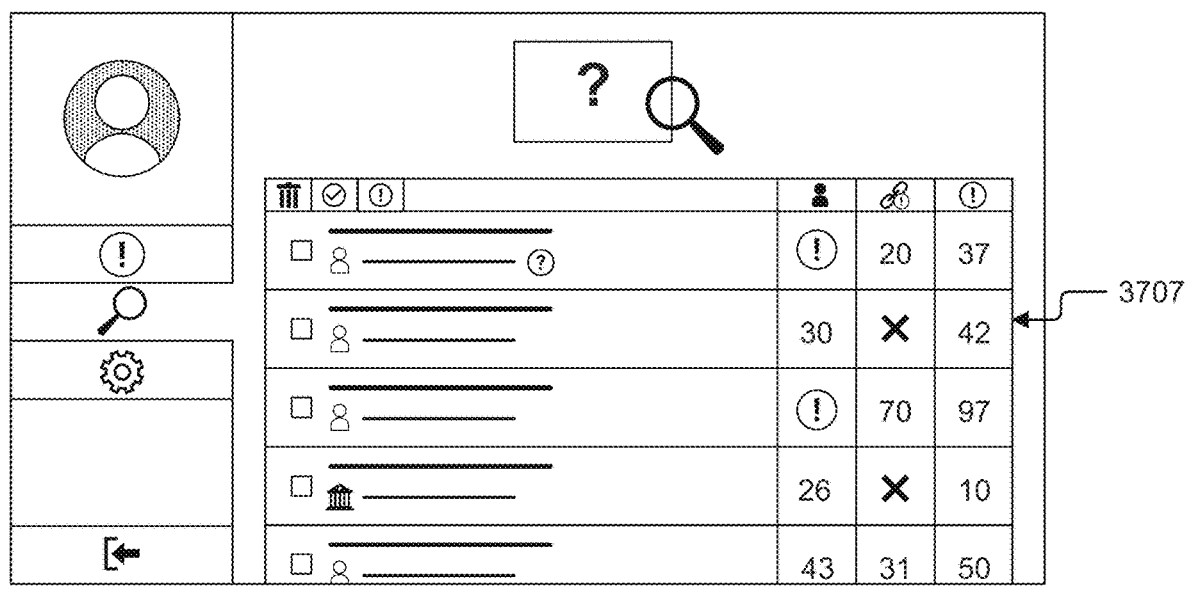
FIG. 37C illustrates an exemplary security insight management interface, wherein the management interface allows for overview of security insights for a plurality of authenticable communications.
Figure 37D:
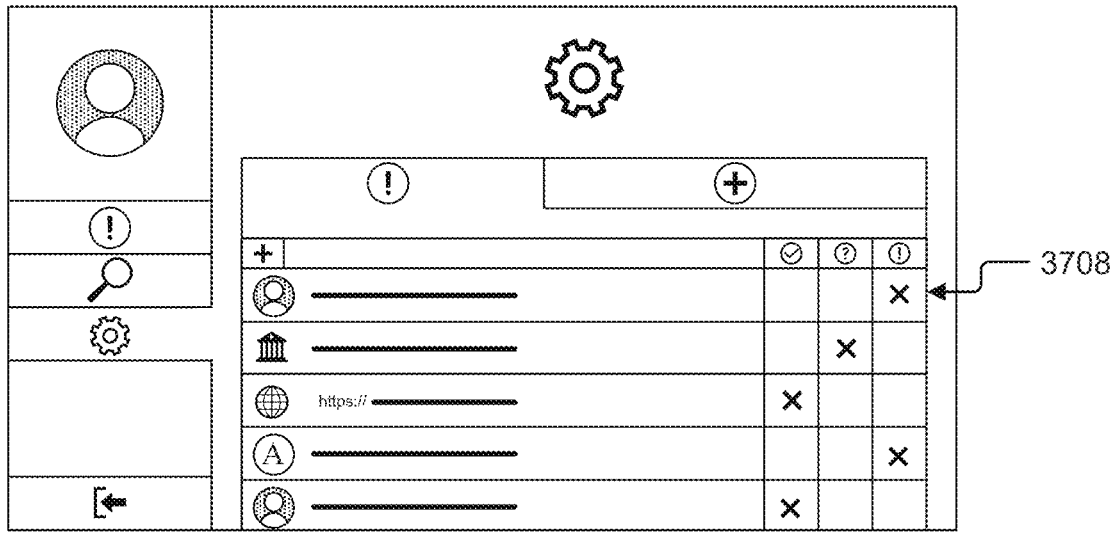
FIG. 37D illustrates an exemplary security insight management interface, wherein the management interface allows for control of security insight settings.
Figure 37E:
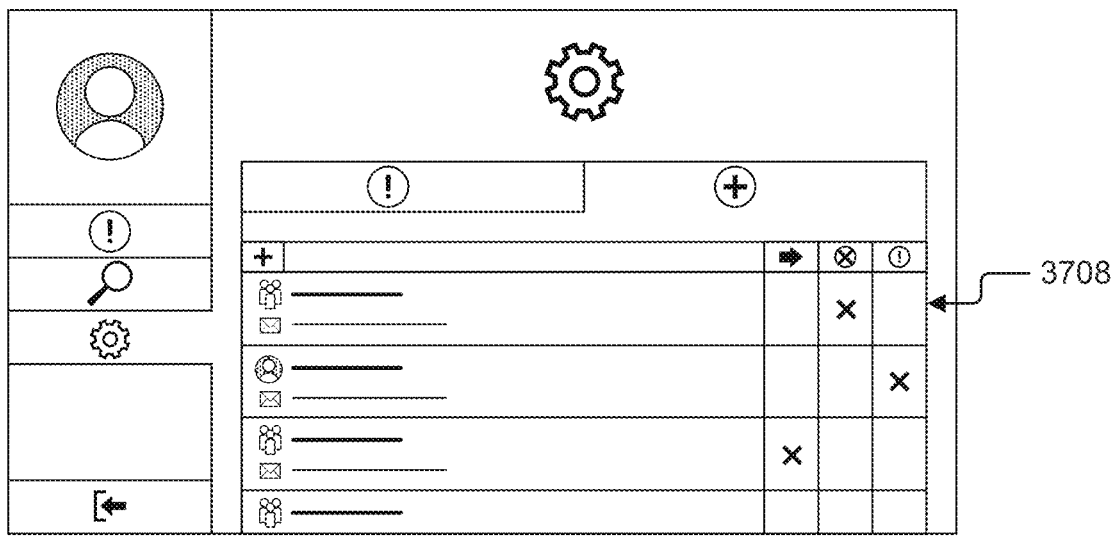
FIG. 37E illustrates an exemplary security insight management interface, wherein the management interface allows for control of security insight settings.

Referring now to FIG. 37C, an exemplary security insight management interface 3705 is illustrated, wherein the management interface 3705 allows for overview of security insights for a plurality of authenticable communications. In some aspects, a security insight request management interface 3707 may provide summaries of requests. In some embodiments, security insight requests may be automatically generated from the risk assessment system. For example, the risk assessment system may identify and flag trends that may be transmitted as review requests to those with access and permissions.

An indicated source may be originating from a recently created email address, and the issue has been flagged in every authenticable communication from that indicated source for two weeks. This may suggest there is a possibility that the indicated source changed email addresses recently. The request may be viewable on the security insight request management interface 3707, which may prompt a manual investigation into the new email address. As another example, security insights may indicate that the majority of emails to a particular recipient have been identified as risky. This may prompt a request to investigate the recipient, who may have unsafe practices.

Referring now to FIG. 37D, an exemplary security insight management interface 3705 is illustrated, wherein the management interface 3705 allows for control of security insight settings. In some aspects, a management interface 3705 may comprise a security insight settings interface 3708, which may allow for management of security insight standards and rules. A security insight settings interface 3708 may allow for management of current protocols. Current rules may be toggled on or off. Current rules may be adjusted to different security risk levels. In some aspects, security insights may be ranked, wherein higher ranked security insights may more easily prompt a finding that an authenticable communication is suspicious.

In some embodiments, a security insight settings interface 3708 may allow for control of what permutations of risk levels may affect the overall risk level of an authenticable communication. For example, a high-risk level for an attachment may automatically trigger a high-risk level for the authenticable communication. A high-risk level for a portion of the text that may be offset with low risk levels of the rest of the content and apparent source may only trigger a call out in a safe authenticable communication.

In some aspects, controls may be dynamically adjustable, which may allow for emergency change of settings. For example, a known phishing attack may be circulating, and the settings may be adjusted to quickly identify and isolate that attack. Where an actual source has been hacked, any authenticable communication where they are listed as an indicated source may be tagged as high risk until the actual source confirms that the security breach has been cured.

For example, a current rule may review images, wherein the current security risk is that a non-matching logo prompts an immediate suspicious authenticable communication. Where an indicated source is rebranding, the security risk level of an unmatched logo for a particular indicated source may be lowered to minimal risk. As another example, an indicated source may announce that their system has been hacked, which may prompt a higher level of scrutiny for any authenticable communications allegedly originating from that indicated source. This may occur on an individual level or a domain-wide level, such as an entire company or group.

In some aspects, a security insight settings interface 3708 may allow for control of protocols for individuals, groups, companies, or departments, as non-limiting examples. An invoice department may receive a disproportionate number of attachments and requests for money, so those authenticable communications may receive a higher level of scrutiny or a lower level of scrutiny if the security insights may cause a bottleneck or where the recipients are trained to review content. In some embodiments, a risk assessment system may accept standard template from actual sources, which may allow for a comparison of the template to content of an authenticable communication 3700. For example, a billing department may have a standard template for billing that may be submitted, wherein an authenticable communication 3700 alleging to be from the billing department from that indicated source may be compared to the template to inform risk assessment.

As another example, a department or company may receive and send authenticable communications that must comply with HIPAA standards. Any violation of HIPAA compliance may need to be reported to external sources. Security insight settings interface 3708 may allow for input of the heightened scrutiny rules for any authenticable communications that may be bound to HIPAA standards. In some embodiments, settings may allow for identification of content within authenticable communications that may suggest a need for HIPAA compliance. Where identified, the authenticable communication may be analyzed for HIPAA compliance. In some aspects, a department may routinely manage HIPAA compliant information, and all authenticable communication may be analyzed for HIPAA compliance. In some embodiments, recipients or senders may be able to manually prompt review of an authenticable communication for HIPAA compliance.

Referring now to FIG. 37E, an exemplary security insight management interface 3705 is illustrated, wherein the management interface 3705 allows for control of security insight settings. In some aspects, a security insight settings interface 3708 may allow for the addition of new rules and settings. New rules and settings may allow for customization of security insights that more accurately reflect and address the vulnerabilities of an individual, group, or company, as non-limiting examples.

As an illustrative example, a company may be adding a new department, which may require different protocols than other departments. The new department may accept submissions from individuals or groups who may want to be a vendor, contributor, or collaborator with the company. This new department may be particularly susceptible to spam. A security insight settings interface 3708 may allow for a customized set of security insight rules and protocols for the new department.

In some embodiments, settings may reflect company policies, regulations, standards, or compliance. For example, a company's security protocol may require that any indicated source with an email address newer than six months be manually verified by a recipient, such as by calling the indicated source. The settings may be tailored to reflect this protocol, where any indicated source with an email address newer than six months is flagged. Once flagged, a recipient would need to confirm that the indicated source was manually verified. In some aspects, the recipient may interface directly with a security insight panel to input the confirmation. In some embodiments, at least a portion of the content may be obscured or limited until the recipient confirms identity of the indicated source.

In some aspects, an administer with access to the management interface 3705 may be a parent or teacher who may want to screen or review authenticable communications accessed by their children. Parents or teachers may be able to set rules and policies that limit security risk and reduce the risk that children may access inappropriate or dangerous authenticable communications. For example, parents or teachers may prevent access to any authenticable communication from new indicated sources or new email addresses. The parent may create a list of known indicated sources. Parents may be notified if a child receives an authenticable communication from a new indicate source, and may then approve or reject access to the authenticable communication. To balance privacy, parents may not have access to the actual content of the authenticable communication but only security insights.

Figure 38A:
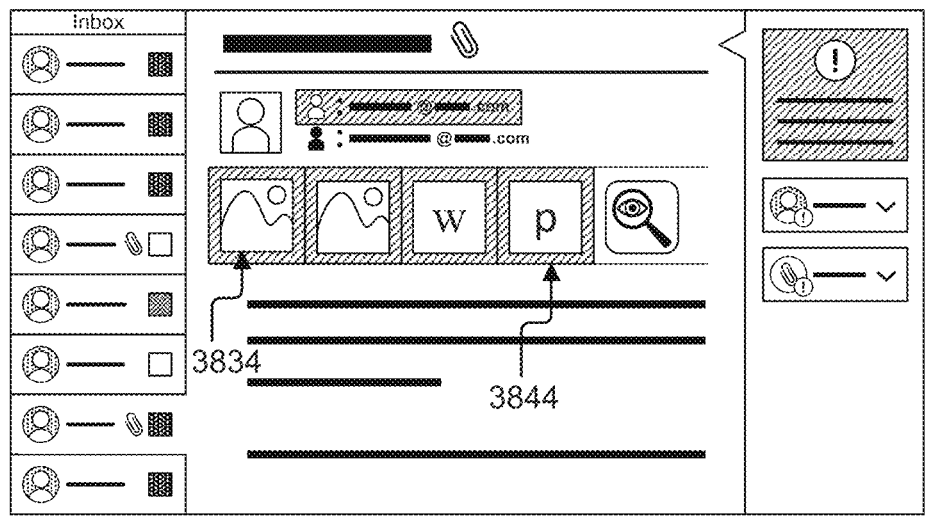
FIG. 38A illustrates exemplary attachment management for an authenticable communication, wherein attachment management is based on security insights.

Referring now to FIG. 38A, exemplary attachment management for an authenticable communication 3800 is illustrated, wherein attachment management is based on security insights. In some aspects, an authenticable communication 3800 may comprise content that includes at least one attachment 3834. Attachment insights 3844 may be provided for the at least one attachment 3834. In some implementations, an authenticable communication 3800 may comprise multiple attachments 3834. In some embodiments, each attachment 3834 may be reviewed and addressed individually. In some aspects, attachments 3834 may be reviewed as a whole, wherein security risk is provided based on an average of security risks of all the attachments 3834 or where the security risk is based on the riskiest attachment 3834. In some implementations, security risks may be presented individually and as a group.

Figure 38B:
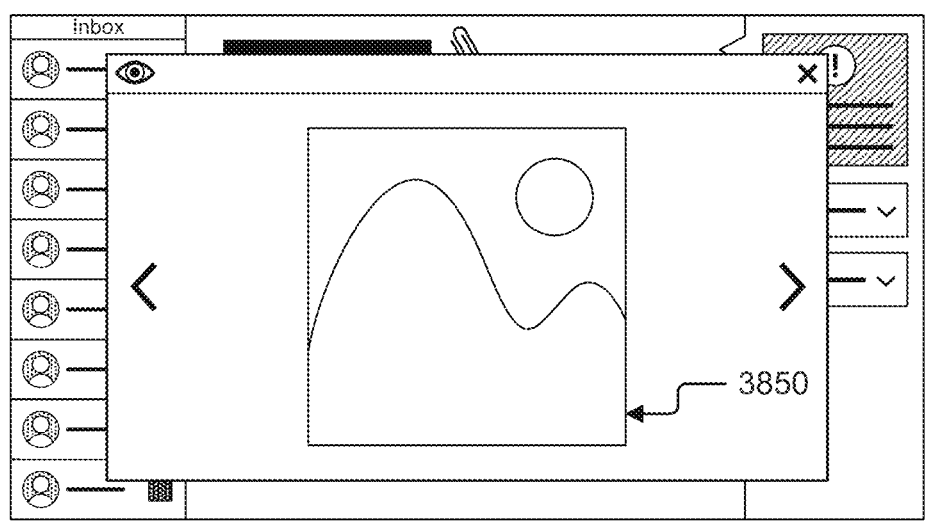
FIG. 38B illustrates exemplary attachment management for an authenticable communication, wherein attachment management is based on security insights.

Referring now to FIG. 38B, exemplary attachment management for an authenticable communication 3800 is illustrated, wherein attachment management is based on security insights. In some aspects, an attachment 3834 may comprise an image file. In some embodiments, an image preview 3850 may be provided, which may allow a recipient to confirm or reject a security insight 3844.

For example, the security insights 3844 may suggest that an attachment 3834 is safe, but upon manual review of the image preview 3850, the recipient may indicate that the attachment 3834 is suspicious. As another example, the security insights 3844 may indicate that the attachment 3834 is suspicious, and the recipient may reject that finding. In some aspects, a manual review by a recipient of the attachment may override the security insights. A manual review that contradicts the security insights may be transmitted to an administrator, such as described in FIGS. 37A-37E. The administrator may be able to override the security insights or reject the recipient's review. This multi-layered approach may limit the risk that a recipient will simply override the security insights each time an attachment 3834 is deemed a security risk.

Figure 38C:
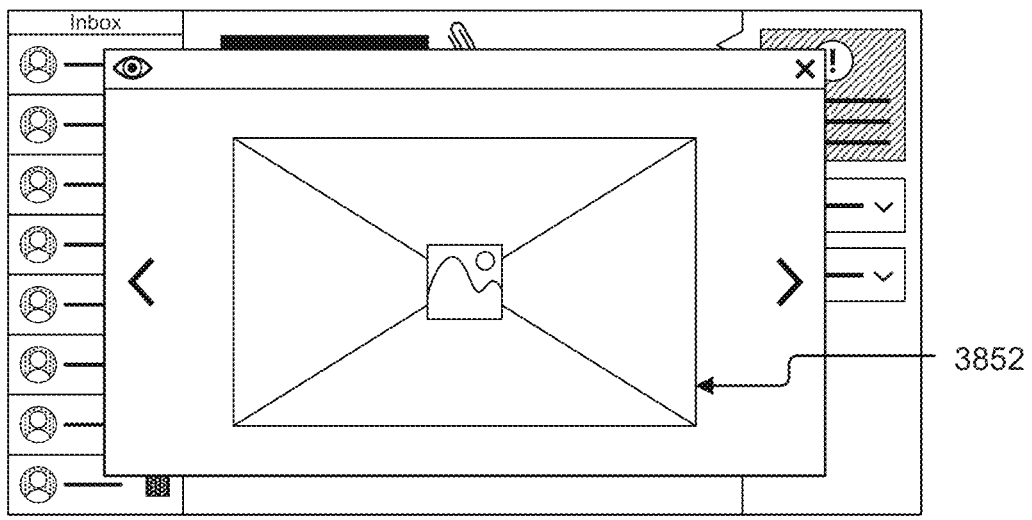
FIG. 38C illustrates exemplary attachment management for an authenticable communication, wherein attachment management is based on security insights.

Referring now to FIG. 38C, exemplary attachment management for an authenticable communication 3800 is illustrated, wherein attachment management is based on security insights. In some embodiments, an authenticable communication 3800 may comprise an attachment 3834 that may contain executable software that may run when accessed or downloaded. A hidden preview 3852 may be provided for attachments that contain executable software, which may prevent a recipient from accessing the suspicious attachment 3834.

In some embodiments, a recipient may submit a security insight request based on the hidden preview 3852. For example, a recipient may be expecting the attachment 3834 and may submit the request to override to an administrator. In some aspects, an external system may run the program to determine the purpose and function of the software. This may allow for a better understanding of the attachment 3834 without risk to the recipient's local device. Limiting access to executable software may allow for control of program usage within an enterprise.

Figure 38D:
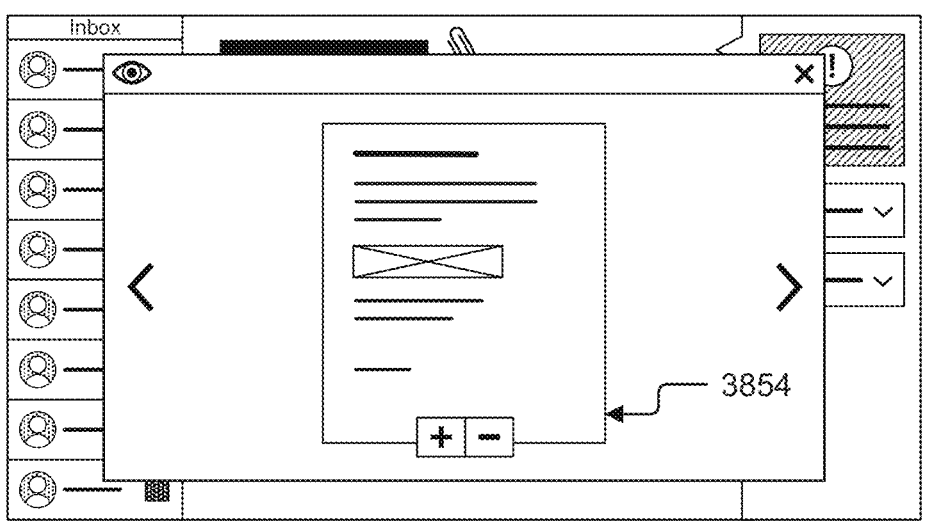
FIG. 38D illustrates exemplary attachment management for an authenticable communication, wherein attachment management is based on security insights.

Referring now to FIG. 38D, exemplary attachment management for an authenticable communication 3800 is illustrated, wherein attachment management is based on security insights. In some embodiments, an authenticable communication 3800 may comprise an attachment 3834, wherein the attachment 3834 comprises a document file. In some embodiments, a document preview 3854 may be provided. In some aspects, the document preview 3854 may show the contents of the file. In some embodiments, the document preview 3854 may provide security insights for the content of the attachment 3834.

Highlighting suspicious areas may inform a recipient of why an attachment 3834 as a whole is deemed suspicious. Identifying suspicious areas may allow for a quick review of the attachment 3834, as a recipient or administrator may not have to scan the document preview 3854 for the suspicious content. In some embodiments, a document preview 3854 may not require a download of any part of the attachment 3834, which may limit local security risk.

Figure 39:
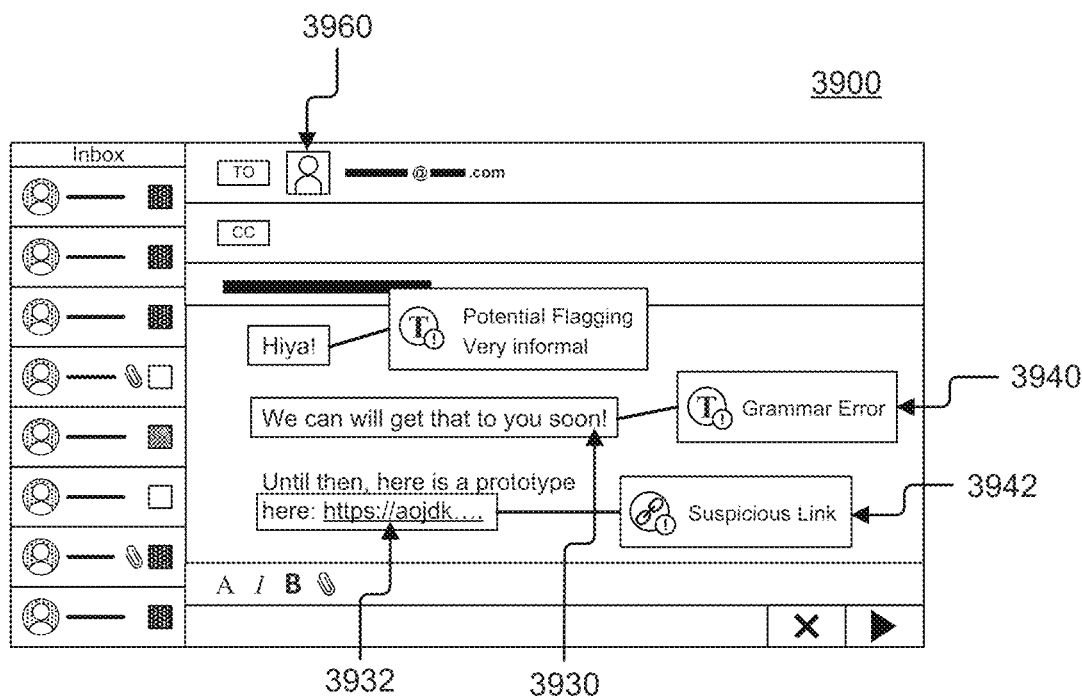
FIG. 39 illustrates exemplary security insights to a sender, wherein security insights are provided with the content of the authenticable communication.

Referring now to FIG. 39, exemplary security insights for a sender of an authenticable communication 3900 are illustrated. In some embodiments, different portions of an authenticable communication 3900 may be identified and reviewed for a sender. For example, an authenticable communication 3900 may comprise a recipient 3960, indicated source, text 3930, and links 3932. Each portion may be review and analyzed for potential risk assessment by a recipient.

For example, text insights 3940 may flag portions of text 3930 that may be flagged as suspicious by a recipient. This may allow a sender to adjust the text 3930 to appear less suspicious. Security insights may be provided prior to sending an authenticable communication 3900, as the authenticable communication 3900 is typed, after the authenticable communication 3900 is sent, or after a recipient reviews the authenticable communication 3900.

Figure 40:
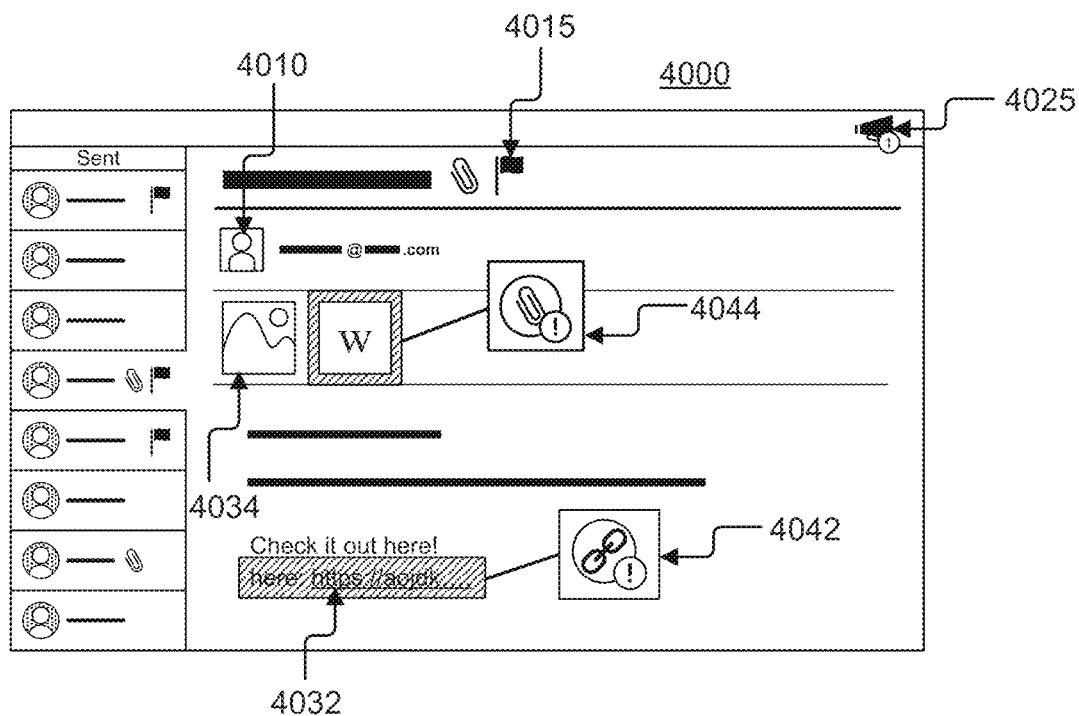
FIG. 40 illustrates exemplary security insights to a sender, wherein security insights are provided with the content of the authenticable communication.

Referring now to FIG. 40, exemplary security insights for a sender are illustrated, wherein security insights are provided with the content of the authenticable communication 4000. In some embodiments, different portions of an authenticable communication 4000 may be identified and reviewed for a sender. For example, an authenticable communication 4000 may comprise a recipient, indicated source 4010, attachments 4034, and links 4032.

Indicated source security insights 4015 may indicate that the originating email address may be deemed suspicious. This may prompt the sender to realize that they are sending from the incorrect email address. Indicated source security insights 4015 may prompt a sender to contact the recipient to highlight that the authenticable communication 4000 may be identified as suspicious, but that they are the actual source. In some aspects, attachment security insights 4044 may notify a sender that an attachment 4034 may be suspicious. The sender may be forwarding the file or may be transmitting a file that the sender did not originate. Attachment security insights 4044 may limit risk of accidentally sending suspicious attachments 4034. Where the attachment 4034 is safe, the sender may adjust the content accordingly, such as by removing questionable metadata or removing links from the document.

In some embodiments, security insights of an authenticable communication 4000 may be transmitted to senders or sender enterprises to track security of outgoing authenticable communications 4000. In some aspects, security insights may be transmitted to actual sources when they are identified as the indicated source of an authenticable communication 4000. This may notify a sender or sender enterprise that there has been a security breach. In some aspects, link insights 4042 may provide security risk of links 4032 within an authenticable communication 4000, which may prompt sender response. For example, a link 4032 may be highlighted as suspicious, and the sender may realize that the actual domain extension is ".org" but they included ".com".

In some embodiments, a sender may choose to embed a code or image that a recipient may be required to scan as a way to verify that the indicated source is the actual source, such as a QR code. In some aspects, a sender may choose to limit access of the contents to the recipient until the recipient scans. In some embodiments, this may allow a sender to hide information until the recipient takes an affirmative action, such as information from human resources, deal or coupon information, or confidential information.

In some aspects, a sender may be able to compare received content to originally sent content. This may allow for an understanding of the purpose and increased risk for an authenticable communication. In some embodiments, this comparison may be available to a recipient or administrator. In some implementations, text content may be analyzed through natural language processing, which may allow a sender to edit and adjust the content prior to sending. The natural language processing may be based on one or both incoming and outgoing emails as a basis for review.

In some embodiments, security insight settings may reflect company policies, regulations, standards, or compliance. For example, company policies may prohibit sending external links within the company. Even if the link itself would not be generally considered suspicious, link insights 4042 may flag the link as in violation of company protocol. As another example, the recipient's company policy may not allow recipients to click external links, and the sender may be notified of that standard through a link security insight.

Security insights may be provided while preparing the authenticable communication, after sending, after recipient receipt, or after recipient receives security insights about the authenticable communication. In some implementations, a sender may toggle the security insights based on need or preference.

Figure 41A:
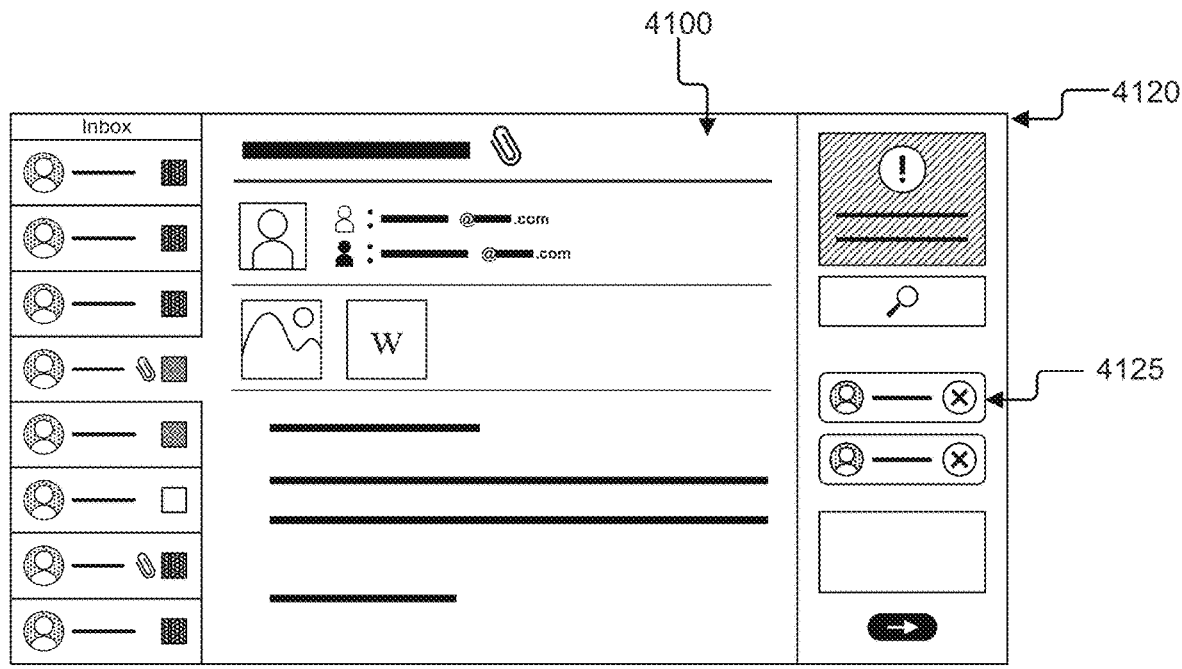
FIG. 41A illustrates an exemplary security insight panel comprising a plurality of security insight integrations, according to some embodiments of the present disclosure.
Figure 41B:
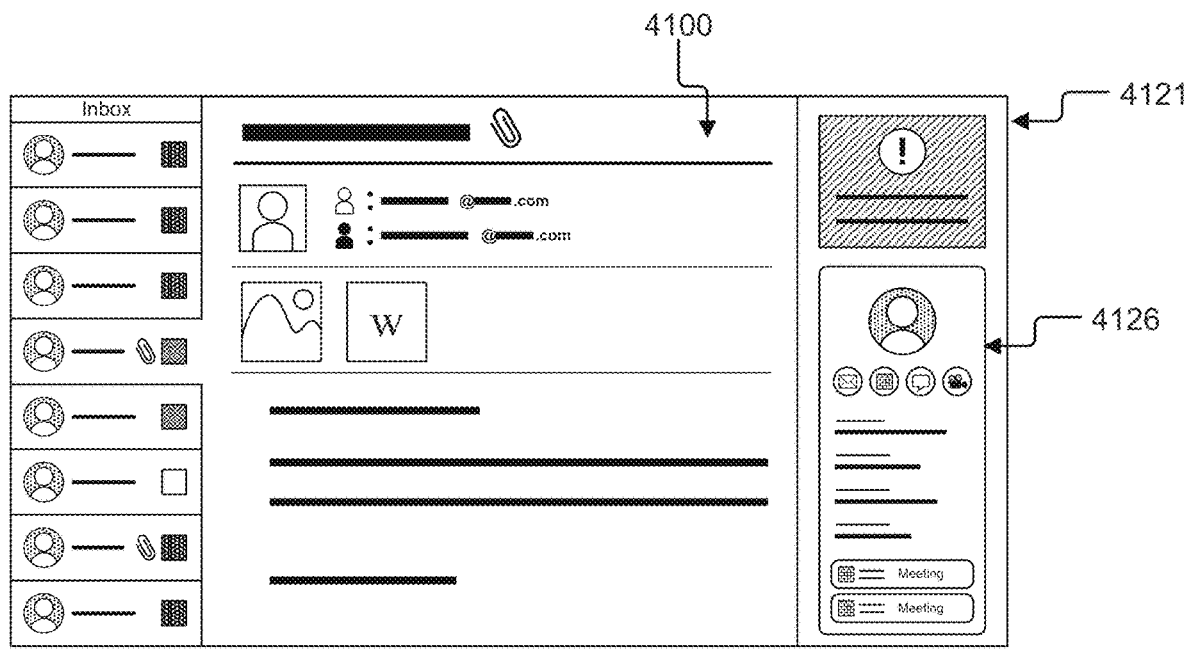
FIG. 41B illustrates an exemplary security insight panel comprising a plurality of security insight integrations, according to some embodiments of the present disclosure.
Figure 41C:
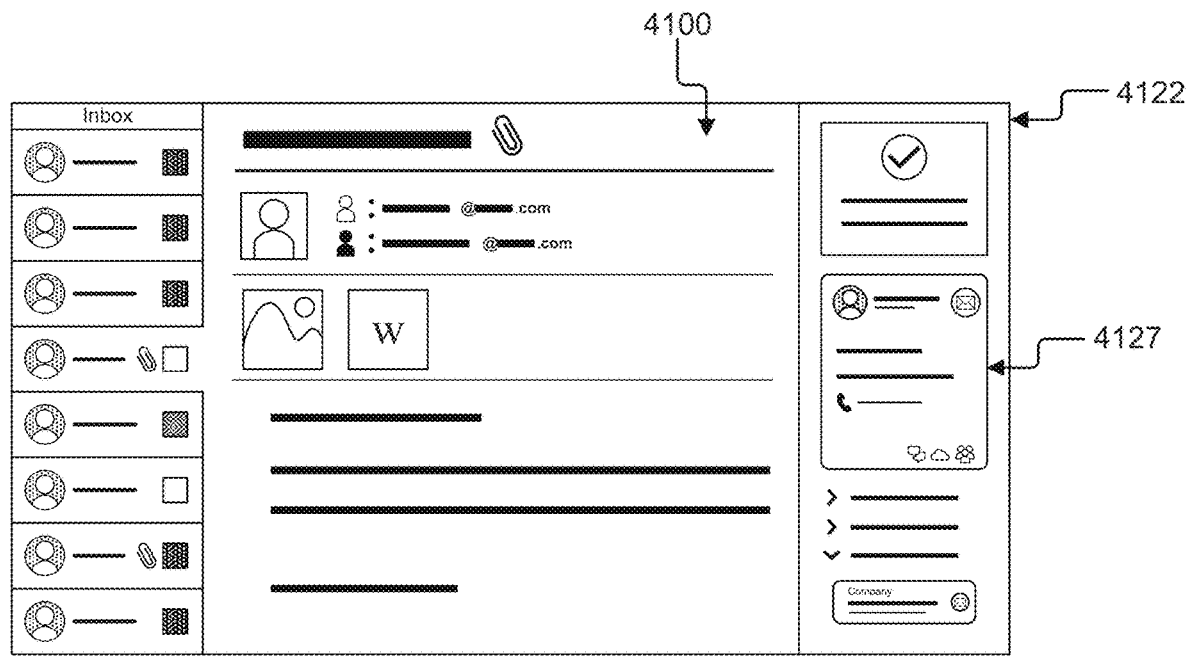
FIG. 41C illustrates an exemplary security insight panel comprising a plurality of security insight integrations, according to some embodiments of the present disclosure.

Referring now to FIGS. 41A-C, an exemplary security insight panel 4120, 4121, 4122 comprising a plurality of security insight integrations 4125, 4126, 4127 is illustrated, wherein the security insight panel 4120, 4121, 4122 provides security insights for an authenticable communication 4100. In some embodiments, the security insight panel 4120 may comprise security insight integrations 4125 that interface with authenticable communication 4100. As an example, the security insight panel 4120 may comprise a security insight integration 4125 for a communication platform, project management platform, or instant messaging platform that provides security insights via a security insight indicator about members in each conversation the user participates in. In some implementations, the security insights may comprise user information about the members of a conversation such as a false email address that is attached to a user's profile, as a non-limiting example.

In some aspects, the security insight panel 4121 may interface with authenticable communication 100 that may comprise web-based third party software. As an example, the security insight panel 4121 may comprise a security insight integration 4126 that interfaces with a user's social media profile. In some embodiments, the security insight integration 4126 may provide security insights via a security insight indicator regarding connected applications and users. As an example, the security insight integration 4126 may notify the user if a falsified duplicate user is trying to connect with the primary user. As another example, the security insight integration 4126 may notify the primary user if credentials are compromised via a security breach in a connected authenticable communication 4100.

In some implementations, the security insight panel 4122 may interface via a security insight integration 4127 with authenticable communication 4100 comprising common third-party software licensed to a company. As an example, a property leasing company may use a sales management software to manage their employees and associated performance information. The security insight integration 4127 may notify the property leasing company of false information entered by new employees or clients via a security insight indicator. The security insight integration 4127 may monitor and use a security insight indicator to alert the property leasing company of phishing attacks within the sales management authenticable communication 4100 and any employees that may have, by succumbing to the phishing attack, exposed the sales management authenticable communication 4100 and property leasing company's infrastructure to security vulnerabilities.

Figure 42:
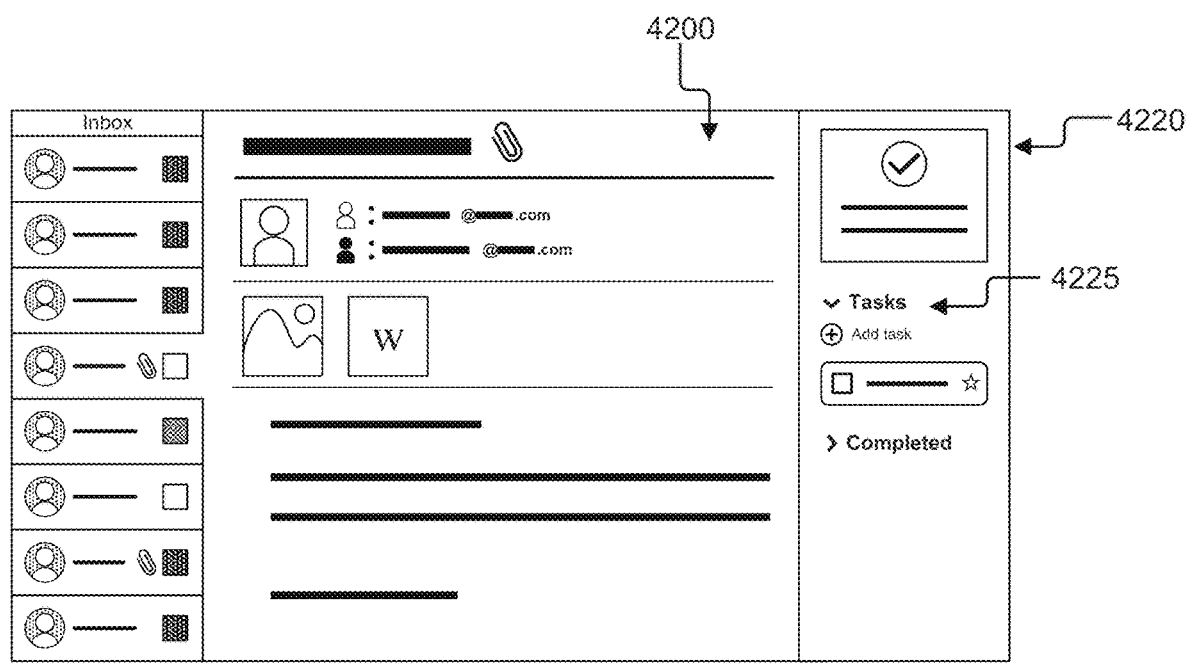
FIG. 42 illustrates an exemplary security insight panel comprising a plurality of security insight integrations, according to some embodiments of the present disclosure.

Referring now to FIG. 42, an exemplary security insight panel 4220 comprising a plurality of security insight integrations 4225 is illustrated. In some embodiments, the security insight panel 4220 may comprise a plurality of actionable items within the security insight integrations 4225.

As an illustrative example, the security insight integrations 4225 may comprise a task list. The task list may allow the user to create tasks related to received security insights. These tasks may be retained within the security insight panel 4220 while the security insight integrations 4225 may continue to interface with a plurality of authenticable communication 4200, thereby allowing the created security tasks to remain present regardless of the authenticable communication 4200 selected. In some implementations, the security insight integrations 4225 may provide notifications of outstanding security tasks as the security insight panel interfaces with a related authenticable communication 4200.

In some aspects, the security insight integrations 4225 may comprise third party integrations that verify external information. As an example, the security insight integrations 4225 may confirm that a bill has already been paid when a bill notification is received. As another example, the security insight integrations 4225 may notify the user when a notification claiming a payment was three dollars insufficient is received. The security insight panel may recognize this as a classic phishing scheme and provide the related payment history that demonstrates the payment was made in full at an earlier date.

In some embodiments, the security insight integrations 4225 may provide context for outbound and inbound information exchange. In some implementations, the security insight integrations 4225 may provide context further comprising standard compliance and risk analysis. As an illustrative example, the security insight panel 4220 may provide an integrated method of notifying HIPAA when personal records are transferred. The security insight panel 4220 may further notify the user if the personal records request comprises a non-standard request form that indicates a possible fraudulent records transfer. The security insight panel 4220 may also provide security insights when a user sends a completed records transfer form that may appear fraudulent to HIPAA. As another example, the security insight panel 4220 may notify the user if there is information in an email that the user may want to encrypt before sending the email.

Figure 43:
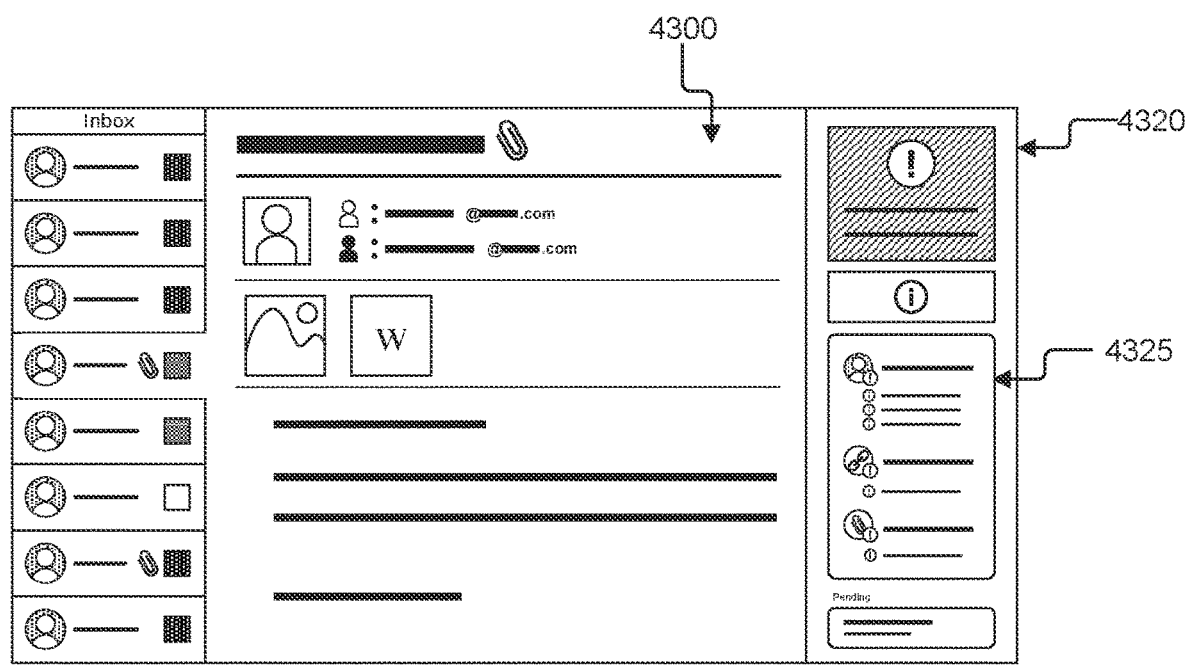
FIG. 43 illustrates an exemplary security insight panel comprising a plurality of security insight integrations, according to some embodiments of the present disclosure.

Referring now to FIG. 43, an exemplary security insight panel 4320 with an authenticable communication 4300, wherein the security insight panel 4320 comprises a plurality of security insight integrations 4325 is illustrated. In some embodiments, the security insight integrations 4325 may provide a plurality of relevant security insights about risk. As an example, a user may navigate to a foreign website that comprises a plurality of security vulnerabilities. The browser may comprise a security insight panel 4320 plugin that allows the security insight integrations 4325 to provide security insights about risk levels associated with links, text, images, attachments, user profiles, and other non-limiting examples on the webpage.

Figure 44A:
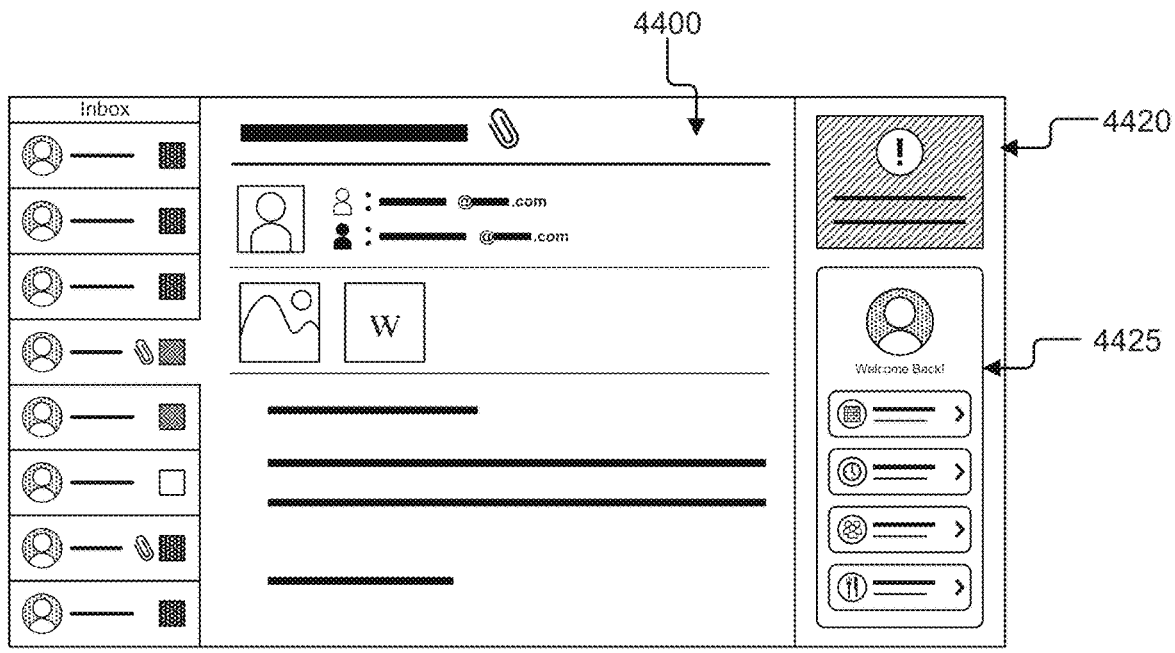
FIG. 44A illustrates an exemplary security insight panel comprising a plurality of security insight integrations, according to some embodiments of the present disclosure.
Figure 44B:
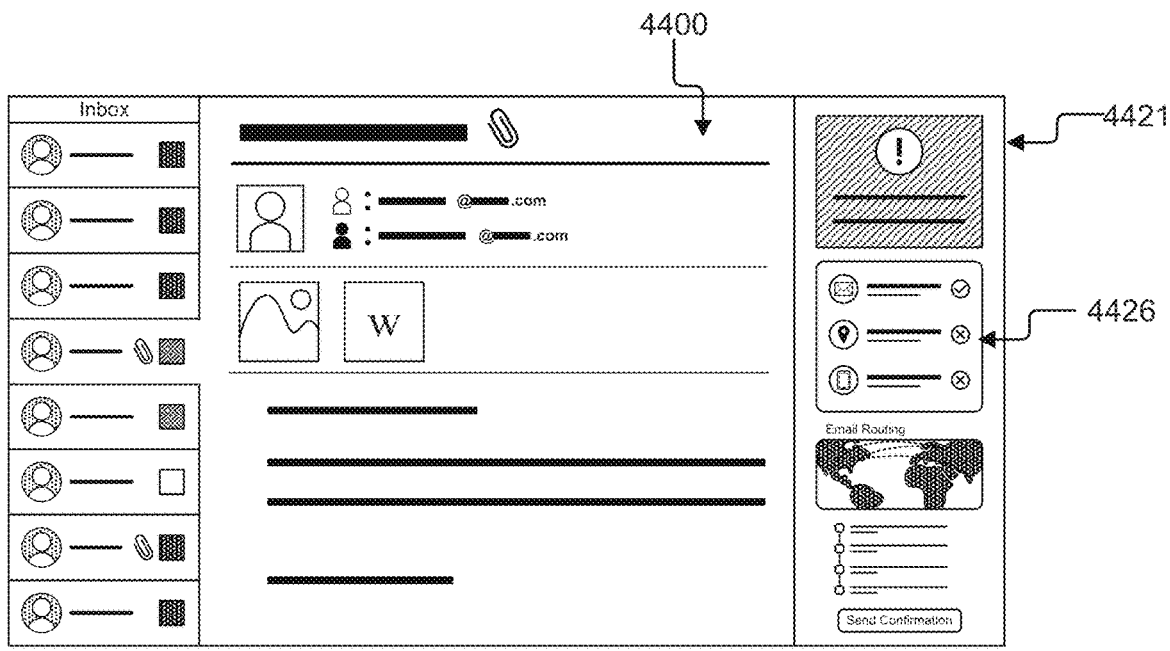
FIG. 44B illustrates an exemplary security insight panel comprising a plurality of security insight integrations, according to some embodiments of the present disclosure.
Figure 45A:
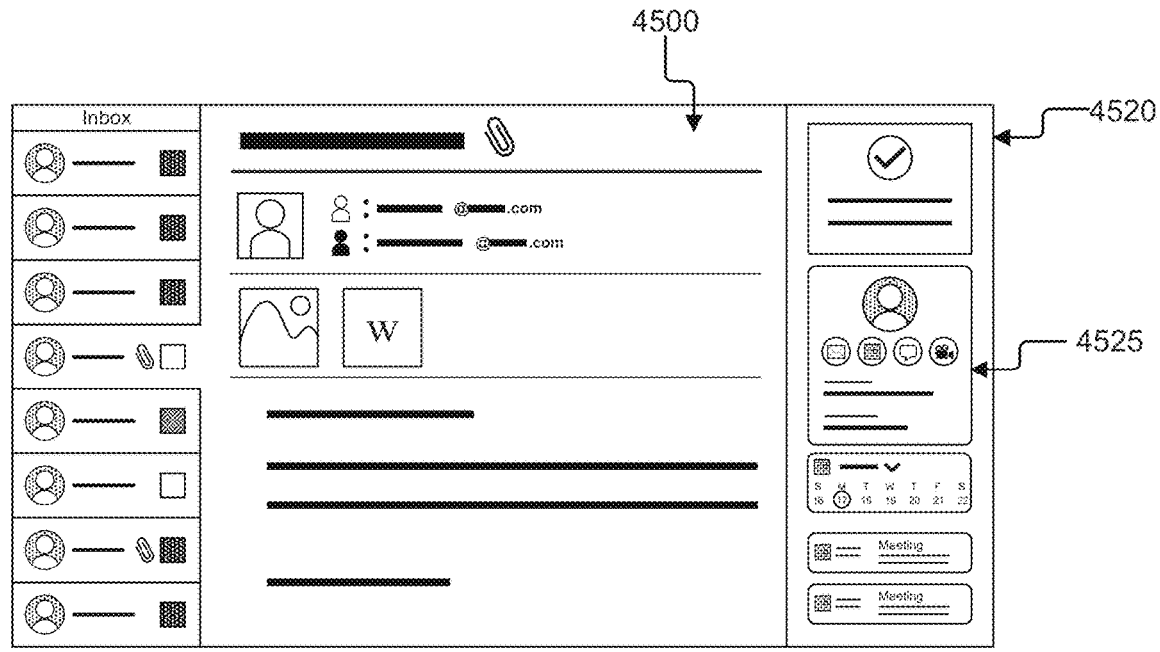
FIG. 45A illustrates an exemplary security insight panel comprising a plurality of security insight integrations, according to some embodiments of the present disclosure.
Figure 45B:
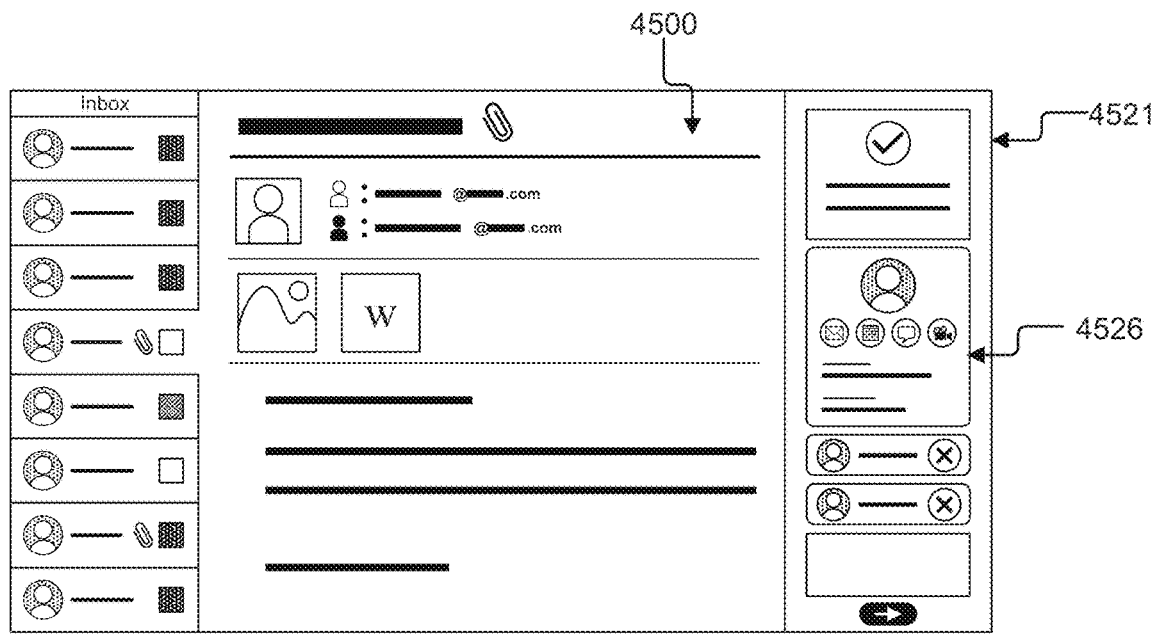
FIG. 45B illustrates an exemplary security insight panel comprising a plurality of security insight integrations, according to some embodiments of the present disclosure.
Figure 45C:
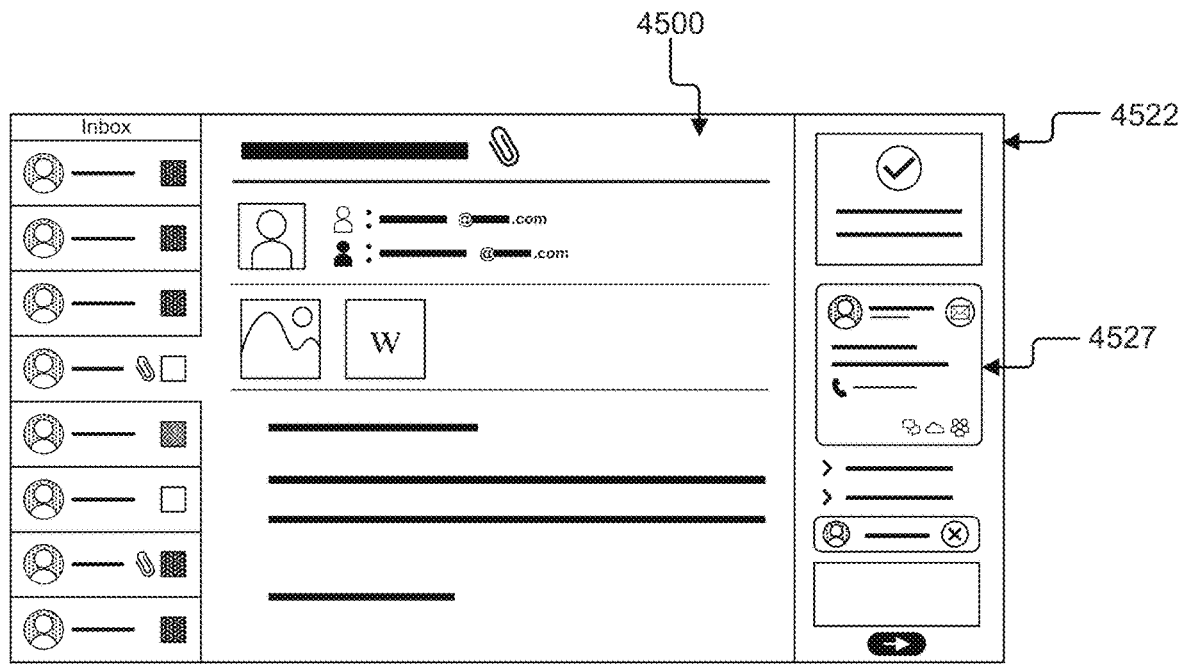
FIG. 45C illustrates an exemplary security insight panel comprising a plurality of security insight integrations, according to some embodiments of the present disclosure.
Figure 45D:
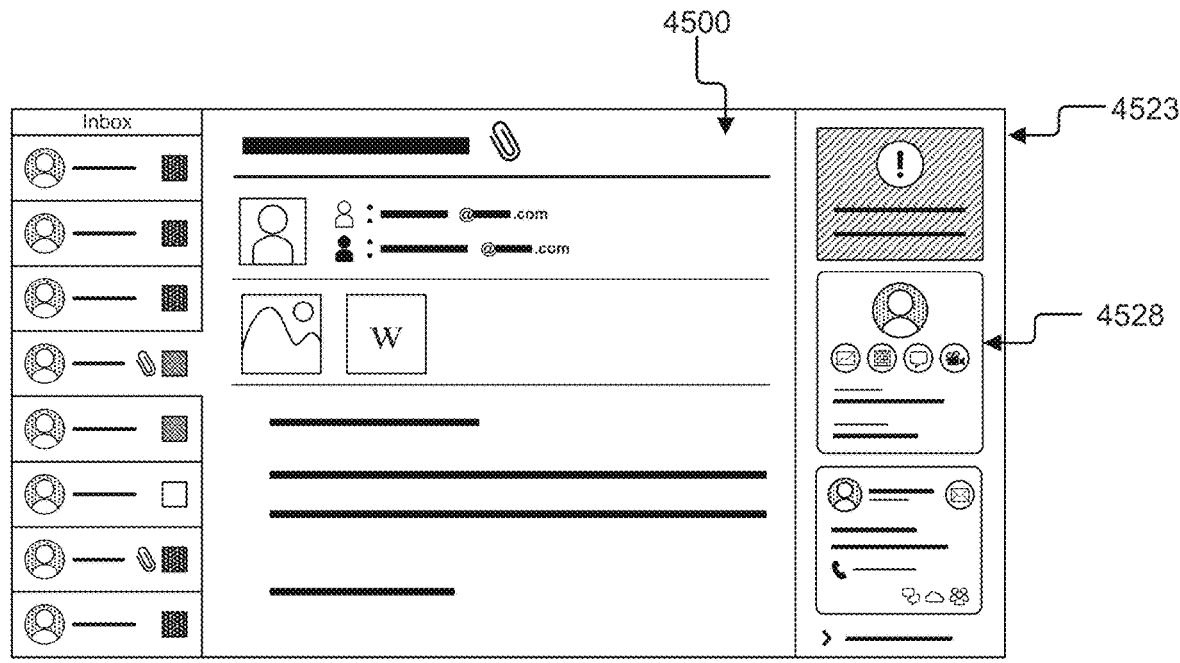
FIG. 45D illustrates an exemplary security insight panel comprising a plurality of security insight integrations, according to some embodiments of the present disclosure.

Referring now to FIGS. 44A-B, an exemplary security insight panel 4420, 4421 comprising a plurality of security insight integrations 4425, 4426 is illustrated. In some embodiments, the security insight integrations 4425, 4426 may provide the user with security insights, such as about an authenticable communication 4400. As an example, the security insight integrations 4425 may store a cache of unique variables that allow the security insight panel 4420 to recognize when a user returns to a previously visited authenticable communication 4400. The security insight integrations 4425 may store user history, previously notated security risks, and software updates, as non-limiting examples.

Using the stored data, the security insight panel 4420 may comprise machine learning to anticipate security risks. In some embodiments, the security insight panel 4420 may display cached data and its byproducts including anticipated security risks, recognized security risks, scheduled security fixes, scheduled security tasks, and other non-limiting examples.

In some implementations, the security insight integrations 4426 may provide tertiary details on some risks and their respective explanations. As an example, the security insight integrations 4426 may display email routing information when providing rationale for providing a security insight for a received email. The email routing information may demonstrate what countries a phishing email originated from and compare the origin of the email to the address of the company or person imitated by the phishing email.

In some aspects, the security insight panel 4420 may comprise device registration information for senders and recipients. Using this information, the security insight panel 4420 may comprise security insight integrations 4426 that may notify the user if an email is sent from a device that is not registered with the sender, as a non-limiting example. In some embodiments, the security insight panel 4420 may utilize telemetry of locale to demonstrate security risks. For example, the security insight panel 4420 may notify a user if an email was sent from Greece when the sender was previously registered as residing in Russia.

In some implementations, the security insight integrations 4426 may comprise detailed notifications on improvement of current security protocols. As an illustrative example, the sender of an email may receive a notification concerning the hygiene of the sender's server protocol. Improving the server's hygiene protocol may prevent information sent from the sender from appearing as malicious content or a security risk.

In some aspects, the security insight panel 4420 may comprise third party software that supplementals and contextualizes, as non-limiting characteristics, the user's current activity. As an example, the user may view a travel request in an email and the security insight panel 4420 may display related flights are their prices. Similarly, a user may receive a promotional email selling a product at a "bargain price". The security insight panel 4420 may comprise price comparisons found on related websites for identical and similar products. In some implementations, the security insight panel 4420 may present factual information. As an example, a user may receive an email from the IRS and the security insight panel 4420 may present the phone number for the IRS to verify the validity of the email.

In some embodiments, the security insight panel 4420 may comprise one-click links to related third party software applications. As an example, the user may receive a promotional email from a seller highlighting a specific genre of products. Upon clicking the link in the security insight panel 4420, the user may be directed to the seller website with the search criteria pre-populated in the search bar. In some implementations, the security insight panel 4420 may comprise authentication capabilities. As an example, the user may enter government credentials in the security insight panel 4420 before receiving permission to view an attachment for an email.

Referring now to FIGS. 45A-D, an exemplary security insight panel 4520, 4521, 4522, 4523 comprising a plurality of security insight integrations 4525, 4526, 4527, 4528 is illustrated. In some embodiments, the security insight panel 4520, 4521, 4522, 4523 may comprise security insight integrations 4525, 4526, 4527, 4528 that integrate security insights from two or more authenticable communications 4500.

As an example, the security insight integration 4525 may provide a security insight about a false user profile that establishes a social media connection with the primary user. The security insight panel 4520 may store relevant information about the false user profile that enables the security insight integration 4525 to recognize an email came from the same email address associated with the false user profile, even though the user has left the social media software and is operating in a separate mail software.

In some implementations, the security insight panel 4523 may augment the user's ability to view relevant information from third-party software. As an illustrative example, when a recipient views an email from a user with a previous conversation history, the security insight panel 4523 may comprise previous emails, attachments, and conversations with the same sender. As another example, the security insight panel for a title agency 4523 may display the case number and provide methods of automatically submitting related claims and requests. As another example, the security insight panel 4523 for an outbound marketing sales group may display every previous interaction with a client to provide context to a present interaction.

In some aspects, the security insight panel 4523 may comprise actionable links such as the ability to schedule a conference call with the sender, create a follow-up task, or schedule a calendar event with the sender, as non-limiting examples. In some embodiments, the security insight panel 4523 may provide meeting availability insights. As an example, the security insight panel 4523 may, when active in a mass email, compare the participants' calendars to indicate meeting times that are available in consideration of all of the participants' schedules.

In some implementations, the security insights 4528 may comprise third party notifications. In some aspects, the security insights 4528 may comprise a security feed that may notify the user of security related to recent activity. As an example, a third-party security software may provide security insight 4528 notifying the user when their vendor's security was compromised and preventative measures the user may want to adopt to prevent further contamination. In some embodiments, the security insight panel 4523 may, upon detecting a vendor security breach, sever communication methods with the vendor temporarily to prevent further contamination. In some implementations, the security insight panel 4523 may retroactively sever previous communication with a compromised vendor to prevent security vulnerabilities from prior authenticable communication.

Figure 46A:
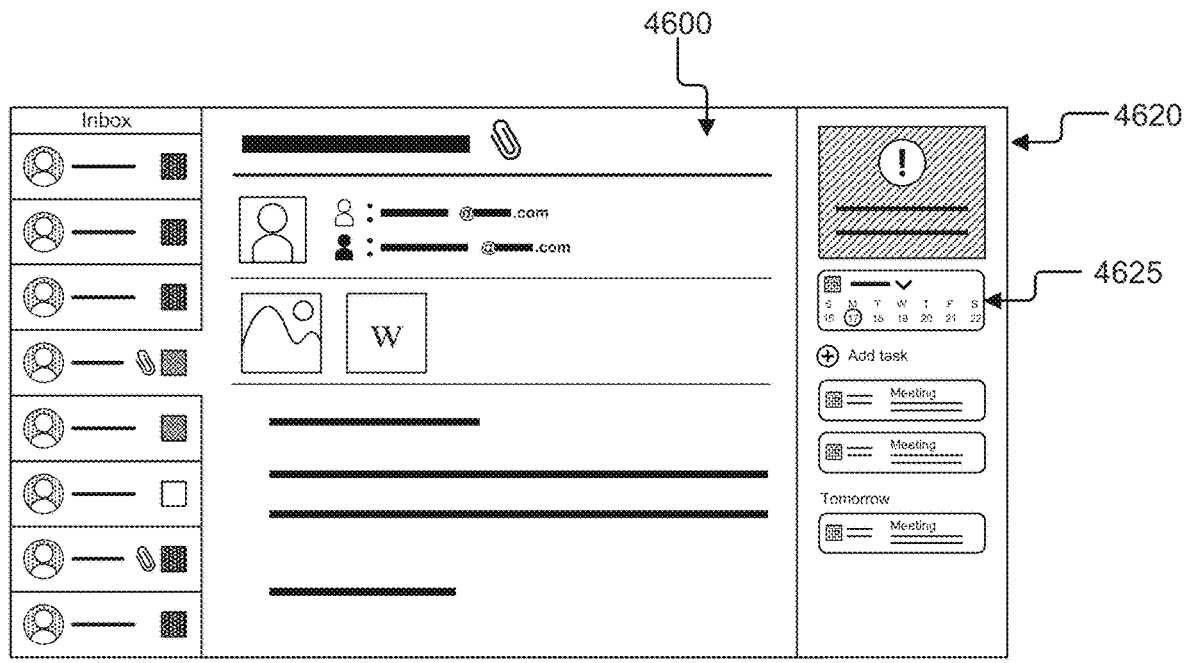
FIG. 46A illustrates an exemplary security insight panel comprising a plurality of security insight integrations, according to some embodiments of the present disclosure.
Figure 46B:
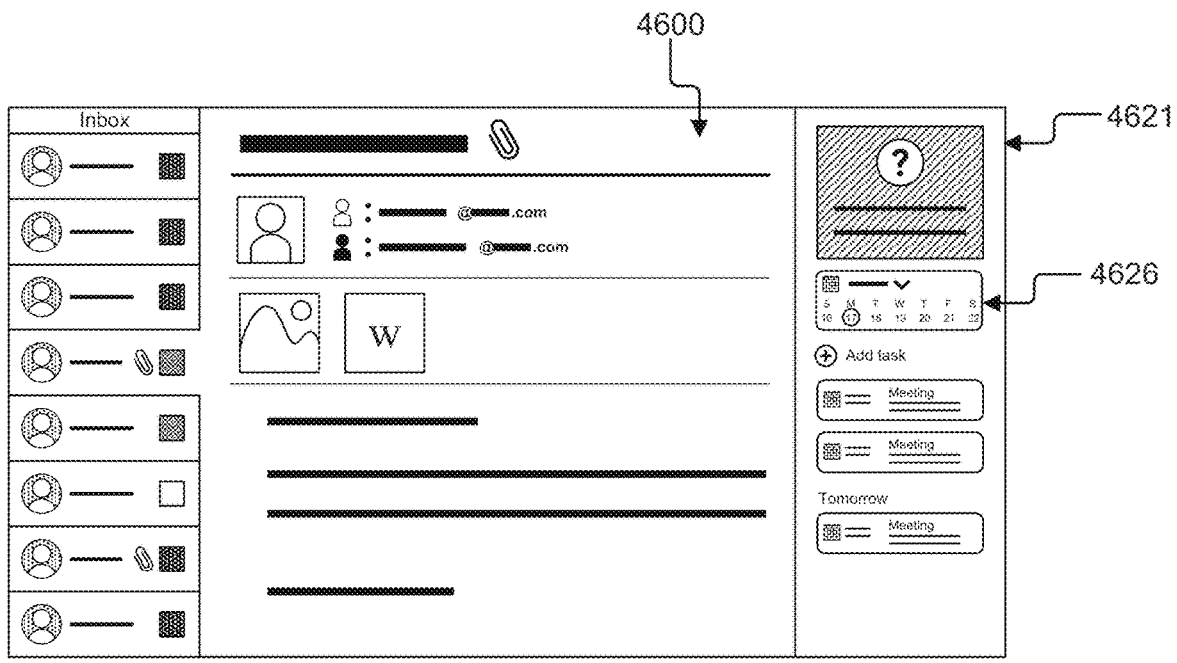
FIG. 46B illustrates an exemplary security insight panel comprising a plurality of security insight integrations, according to some embodiments of the present disclosure.

Referring now to FIGS. 46A-B, an exemplary security insight panel 4620, 4621 comprising a plurality of security insight integrations 4625, 4626 is illustrated. In some embodiments, the security insight panel 4620 may comprise a security insight integration 4625 that may provide calendaring and scheduling updates in conjunction with authenticable communications 4600.

As an example, the security insight integration 4626 may alert the user of an event shared by a known contact that is scheduled to occur. In some implementations, the security insight integration 4626 may provide suggested tasks for reducing potential security risks. In some aspects, the security insight integration 4626 may allow the user to create security tasks that may reside in the security insight panel 4621 as the user navigates to a different authenticable communication 4600. In some embodiments, the security insight panel 4621 may share these tasks for review and revision by a technical support team to ensure security vulnerabilities are resolved in a plurality of external software.

In some aspects, a security panel 4620 may interface with preexisting, third party security insight integrations 4625, 4626. In some embodiments, security insight integrations 4625, 4626 may comprise a replicated view of third-party functionality, such as calendaring, scheduling, instant messaging, or project management, as non-limiting examples. As an illustrative example, a standard calendaring view may be replicated as a security insight integration 4625, wherein currently scheduled appointments and meetings may be presented. In some implementations, security insights may be incorporated into the security insight integrations 4625, 4626. For example, the security panel 4620 may highlight meetings where the associated email address has not been authenticated or appears to be suspiciously different than an email address associated with the authenticable communication that confirmed the meeting.

Figure 47:
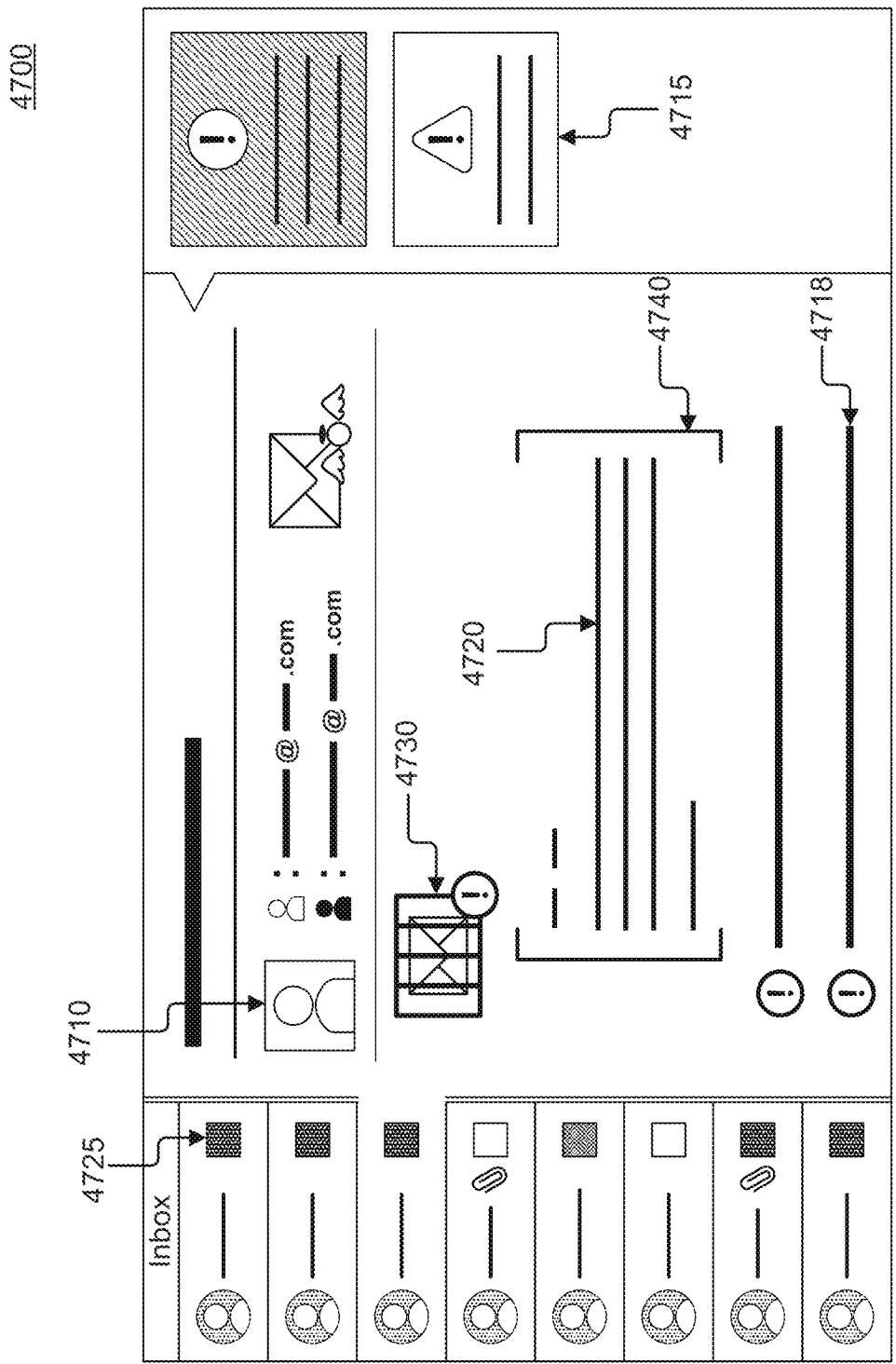
FIG. 47 illustrates an exemplary authenticable communication, according to some embodiments of the present disclosure.

Referring now to FIG. 47, an exemplary authenticable communication 4700 is illustrated. In some embodiments, the authenticable communication 4700 may comprise an indicated source 4710. In some implementations, a security insight indicator 4725 may notify a user of the security status of content 4720 received from an indicated source 4710.

In some aspects, suspicious authenticable communication 4700 may be subjected to confinement 4730, such as, for example and not limitation, by being redirected to a separated server and being stored and:or retained in at least one independent confinement database within the separated server. In some embodiments, the recipient of an authenticable communication 4700 may receive generated proxy content 4740 that notifies the recipient of the authenticable communication 4700 in confinement 4730 and provides a redacted rendering of the confined authenticable communication 4700 sans suspicious or potentially dangerous content 4720.

In some embodiments, the recipient may be able to view authenticable communication 4700 subjected to confinement 4730. In some implementations, confinement 4730 may comprise a link 4718 to an external page available on the separated server that may comprise the entirety of the original authenticable communication 4700, including any suspicious or potentially dangerous material. In some embodiments, the link 4718 may display the text of email (as an image) to prevent harmful content from affecting the recipient. In some aspects, the link 4718 may direct the user to a security platform. In some embodiments, the security platform may be native to the authenticable communication 4700 or a third-party external application.

In some embodiments, the authenticable communication 4700 may comprise links 4718 to gateway platforms, risk analysis platforms, and other non-limiting third-party software. In some implementations, the third-party software may conduct further analysis on malicious content 4720 in confinement and may assist in at least partially authenticating the authenticable communication 4700 and/or may provide information relevant to one or more insights 4715 and the authentication of the authenticable communication 4700. In some aspects, the authenticable communication 4700 may provide a portion of necessary content 4720 to the third-party software such as metadata or headers, as non-limiting examples.

In some embodiments, the authenticable communication 4700 may link 4718 to a platform portal or an out-of-band confirmation portal, as non-limiting examples. In some implementations, provided insights 4715 may link 4718 to training, corrective protocol, or other informative information to reduce the chances of future vulnerability. In some implementations, the authenticable communication 4700 may comprise insights 4715 that may comprise feedback.

For example, the feedback may provide instructional videos relevant to the current threat and may prompt the recipient to open a side panel where directions may outline next steps in threat confinement and prevention. In some implementations, confinement 4730 may comprise the side panel functionality in a quarantine or confinement notification if the side panel isn't an option on the present device. In some aspects, the insights 4715 may show if indicated source's 4710 sending address has been breached recently.

In some embodiments, links 4718 to third-party software may comprise links 4718 to existing software that may be used for indicated source 4710 verification such as Microsoft Teams, and Slack, as non-limiting examples. In some implementations, existing third-party software may allow a recipient to connect with an indicated source 4710 while using standard channels of communication.

Figure 48A:
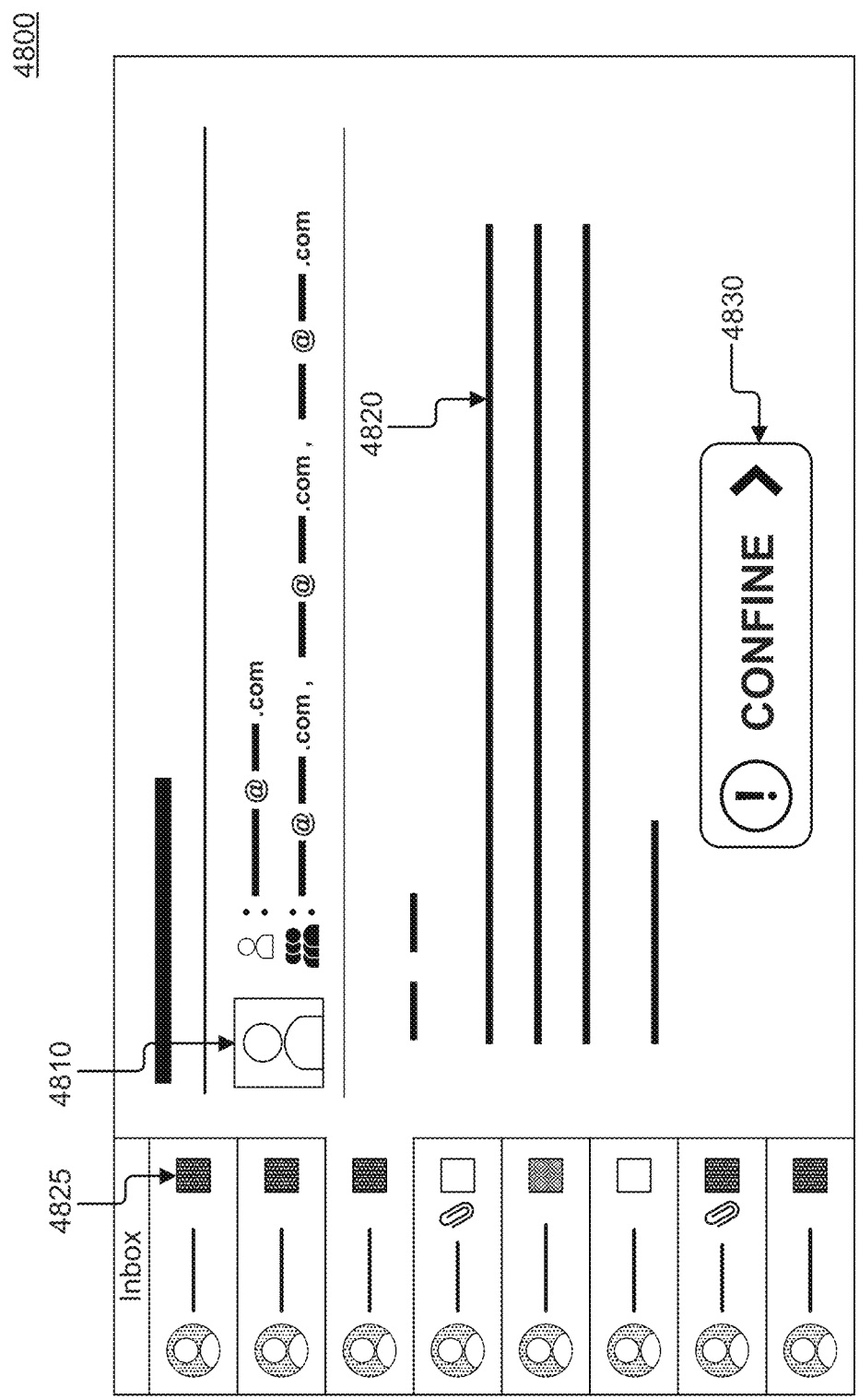
FIG. 48A illustrates an exemplary authenticable communication, according to some embodiments of the present disclosure.
Figure 48B:
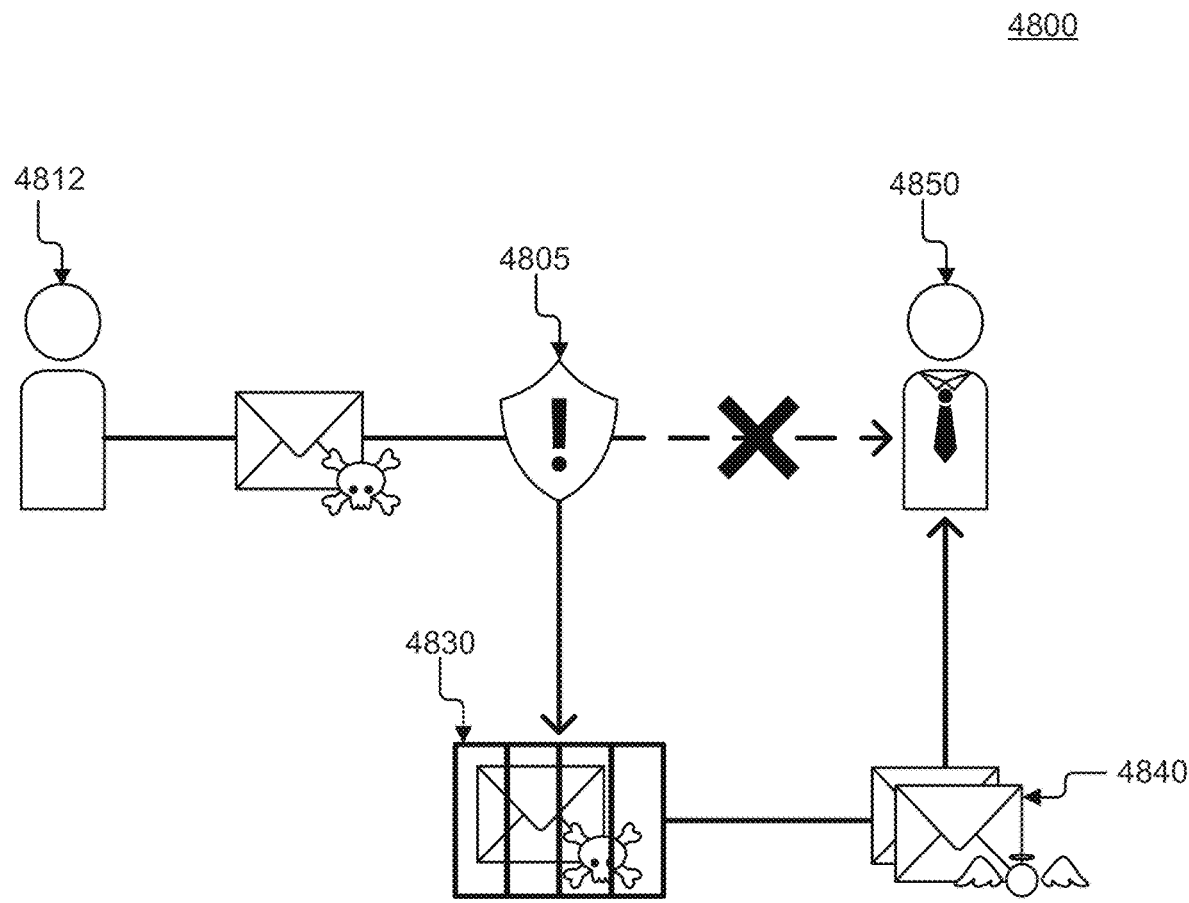
FIG. 48B illustrates exemplary process steps for confining an authenticable communication until it can be authenticated, according to some embodiments of the present disclosure.

Referring now to FIGS. 48A-B, an exemplary authenticable communication 4800 and exemplary process steps for confining authenticable communication 4800 until it can be authenticated are illustrated, respectively. In some embodiments, the authenticable communication 4800 may comprise an indicated source 4810. In some implementations, a security insight indicator 4825 may notify the user of the security status of content 4820 received from an indicated source 4810.

In some aspects, content 4820 may be subjected to an authentication 4805 when it is analyzed and is determined to have come from a potentially harmful source 4812. In some implementations, the content 4820 may be confined 4830 such as, for example and not limitation, by being redirected to a separated server and being stored and/or retained in at least one independent confinement database within the separated server. In some embodiments, the recipient 4850 of an authenticable communication 4800 may receive generated proxy content 4840 that notifies the recipient of the authenticable communication 4800 in confinement 4830 and provides a redacted rendering of the confined authenticable communication 4800 without suspicious or potentially dangerous material.

In some embodiments, the recipient 4850 may choose to confine 4830 received authenticable communication 4800. For example, the recipient 4850 may know that the indicated source 4810 is currently on vacation and may recognize a received email as a phishing attempt.

Figure 49A:
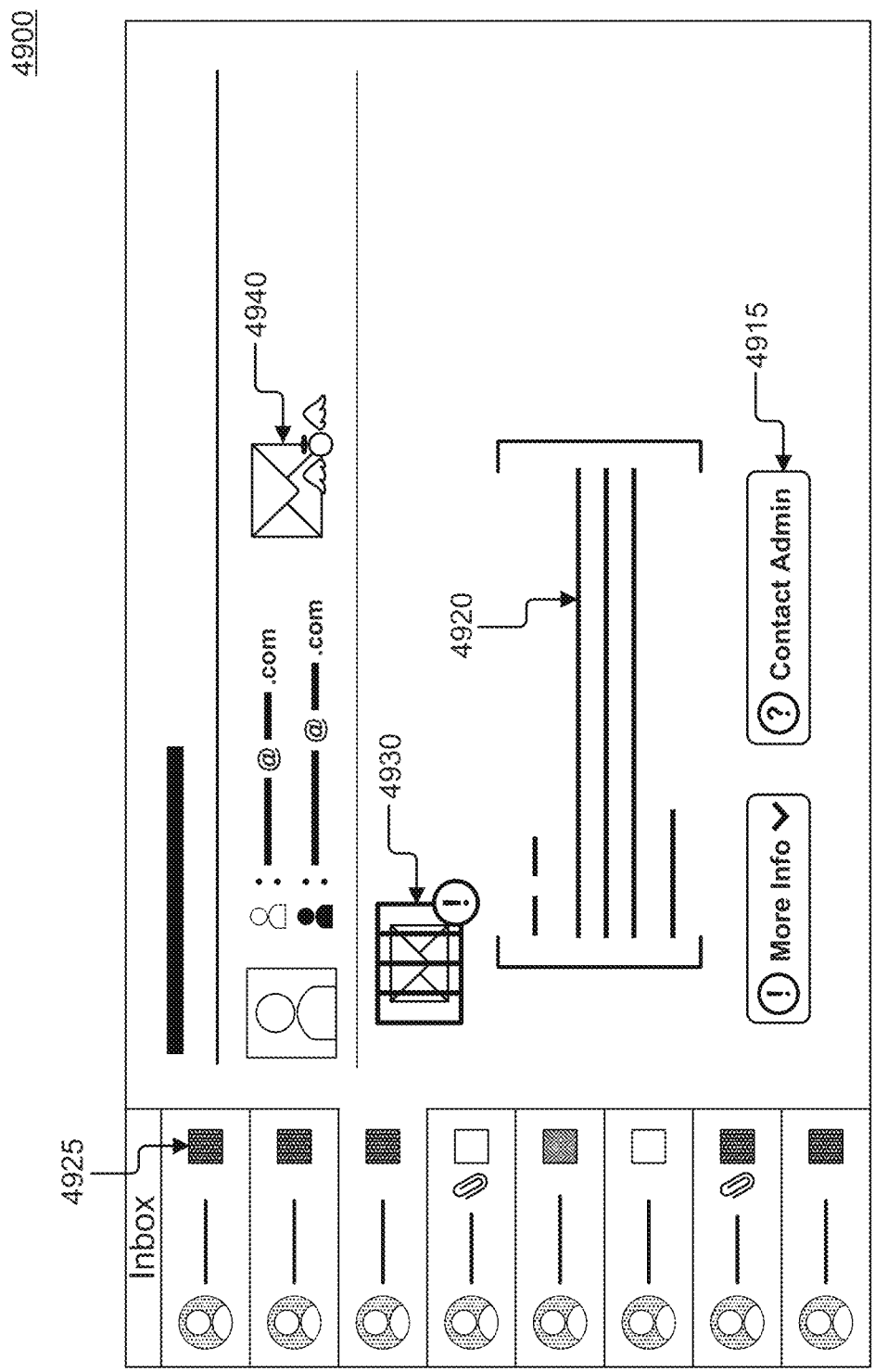
FIG. 49A illustrates an exemplary authenticable communication, according to some embodiments of the present disclosure.
Figure 49B:
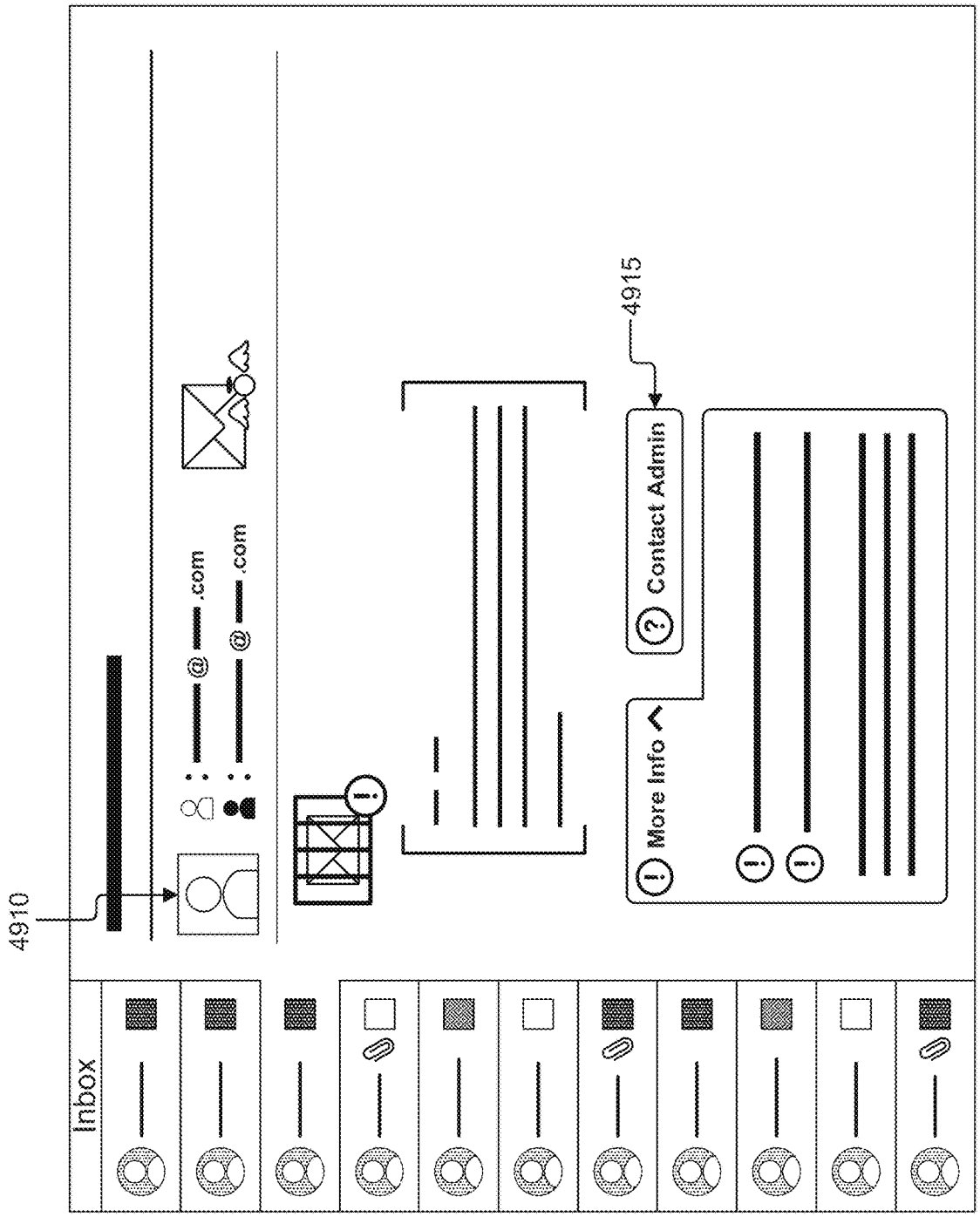
FIG. 49B illustrates an exemplary authenticable communication, according to some embodiments of the present disclosure.

Referring now to FIGS. 49A-B, an exemplary authenticable communication 4900 is illustrated. In some embodiments, the authenticable communication 4900 may comprise an indicated source 4910. In some implementations, a security insight indicator 4925 may notify a user of the security status of content 4920 received from an indicated source 4910. In some aspects, suspicious authenticable communication 4900 may be subjected to confinement 4930 such as, for example and not limitation, by being redirected to a separated server and being stored and/or retained in at least one independent confinement database within the separated server.

In some embodiments, the recipient of an authenticable communication 4900 may receive generated proxy content 4940 that notifies the recipient of the authenticable communication 4900 in confinement 4930 and provides a redacted rendering of the confined authenticable communication 4900 sans suspicious or potentially dangerous material. In some implementations, the source authentication of the authenticable communication 4900 may provide one or more insights 4915 to remedy the authenticable communication 4900 in confinement 4930.

Figure 50:
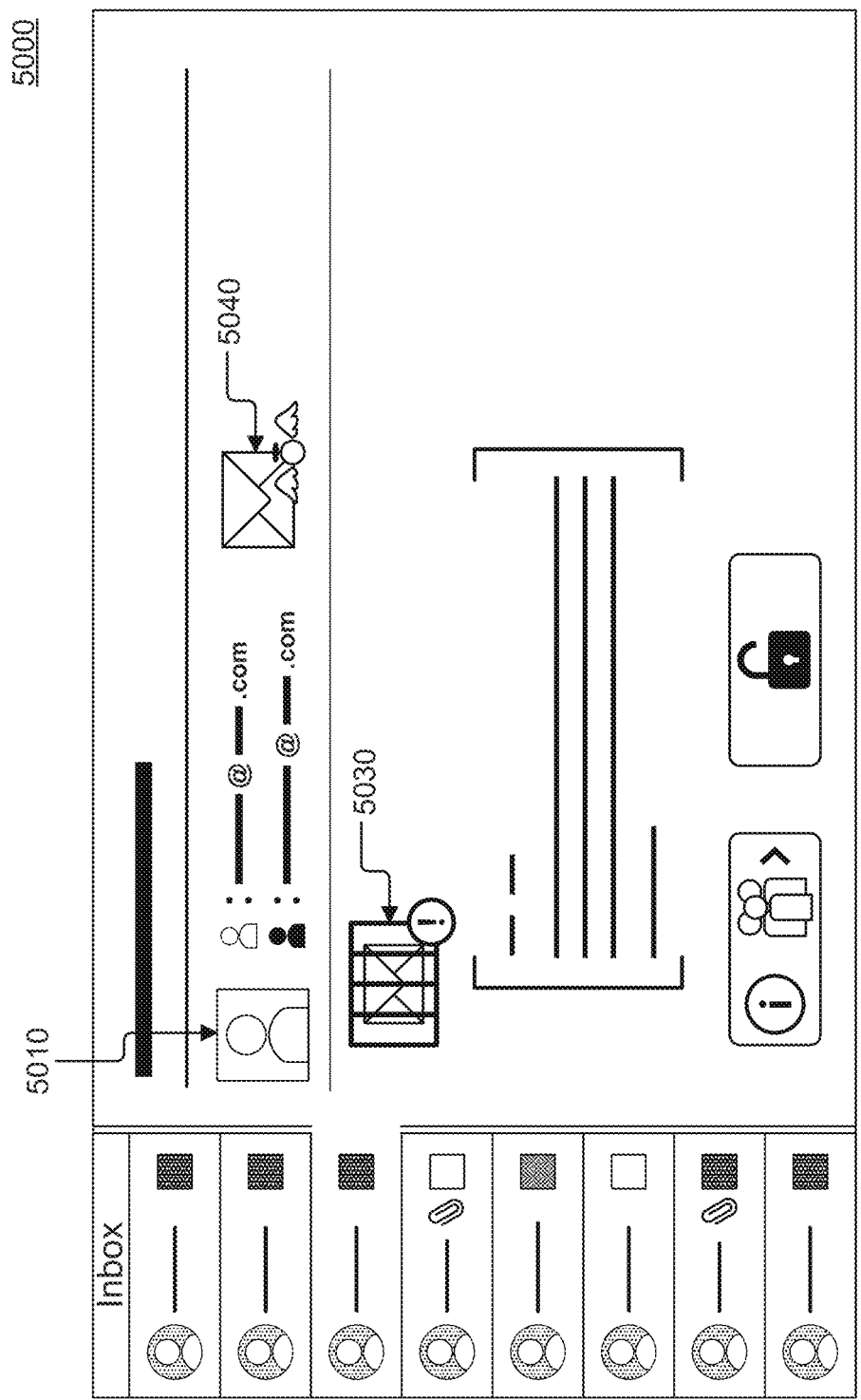
FIG. 50 illustrates an exemplary authenticable communication, according to some embodiments of the present disclosure.

Referring now to FIG. 50, an exemplary authenticable communication 5000 is illustrated. In some embodiments, the authenticable communication 5000 may comprise an indicated source 5010. In some implementations, a user may receive authenticable communication 5000 from an indicated source 5010. In some aspects, suspicious authenticable communication 5000 may be subjected to confinement 5030 such as, for example and not limitation, by being redirected to a separated server and being stored and/or retained in at least one independent confinement database within the separated server.

In some embodiments, the recipient of an authenticable communication 5000 may receive generated proxy content 5040 that notifies the recipient of the authenticable communication 5000 in confinement 5030 and provides a redacted rendering of the confined authenticable communication 5000 sans suspicious or potentially dangerous material. In some implementations, the recipient may send the authenticable communication 5000 to a third party for further analysis and assistance in at least partially authenticating the authenticable communication 5000. In some aspects, the recipient may release and access an authenticable communication 5000 from confinement 5030.

Figure 51:
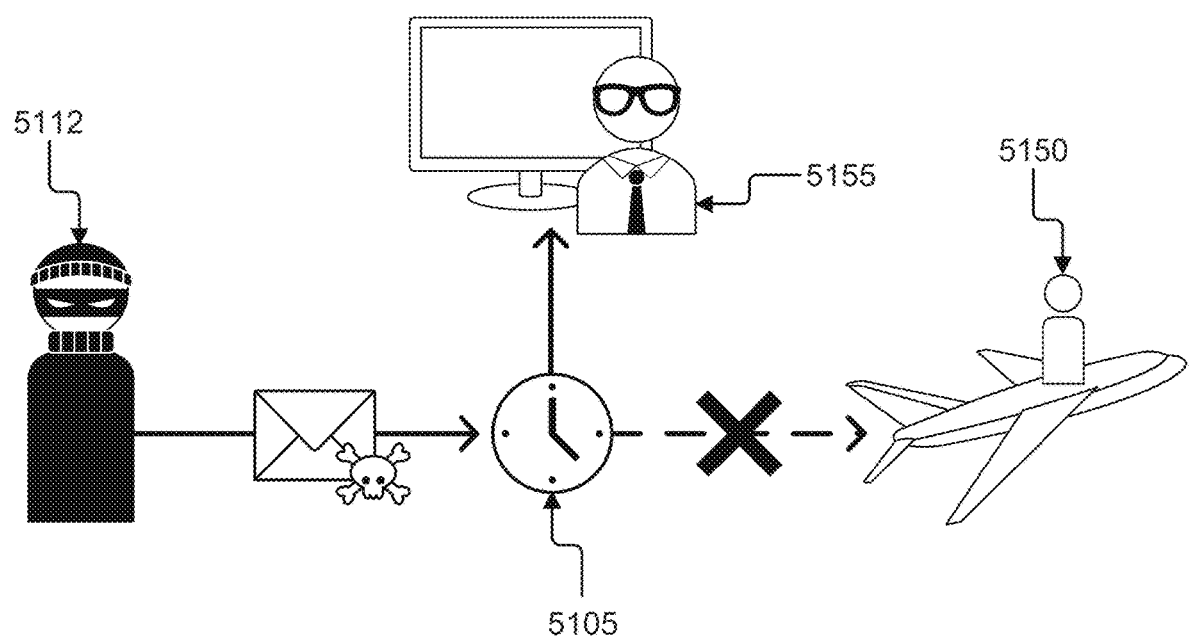
FIG. 51 illustrates exemplary process steps for sending one or more authenticable communications to a proxy recipient, according to some embodiments of the present disclosure.

Referring now to FIG. 51, exemplary process steps for sending one or more authenticable communications 5100 to a proxy recipient are illustrated. In some embodiments, an authenticable communication 5100 may be received from a harmful source 5112. In some implementations, the authenticable communication 5100 may be subjected to authentication 5105. In some aspects, the authenticable communication 5100 may be redirected from the intended recipient 5150 to a proxy recipient 5155.

For example, the recipient may leave on an extended vacation and, while gone, may direct for any authenticable communications 5100 to be redirected to a network administrator for security screening and supervision. In some embodiments, the authentication 5105 may comprise a plurality of durational settings.

For example, the recipient may set the authentication 5105 to redirect emails to a proxy recipient 5155 for 2 weeks, after which time authenticable communications 5100 may resume being sent to the recipient 5150. In some embodiments, time durations may determine additional security aspects of authenticable communications 5100, such as how long a confirmation query may wait for a confirmation response from an indicated source. If the indicated source does not respond to an automated verification query within a predetermined time, an authenticable communication 5100 may be subjected to automatic confinement until either the indicated source or the recipient 5150, or both, may verify the authenticable communication 5100. In some implementations, authentication may occur through a third party platform, such as Microsoft Teams or webinar links, which may allow for live and visual authentication.

In some embodiments, if an indicated source is determined to be unsafe, a recipient or IT department may elect to auto-confine all incoming authenticable communications 5100 from that indicated source. In some aspects, historical authentical communications from the same indicated source may be auto-confined or flagged. This may allow for a retrospective evaluation of authenticable communications from the indicated source. In some implementations, a side panel may be included with the proxy content so that a recipient may be able to access security insights regarding the actual content of the confined authenticable communication.

Figure 52A:
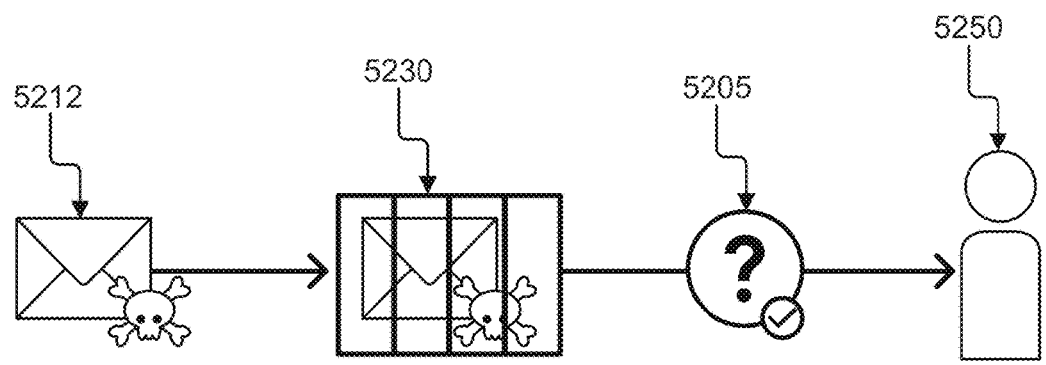
FIG. 52A illustrates exemplary process steps for confining any authenticable communication from a harmful source sent now, previously, or in the future, according to some embodiments of the present disclosure.
Figure 52B:
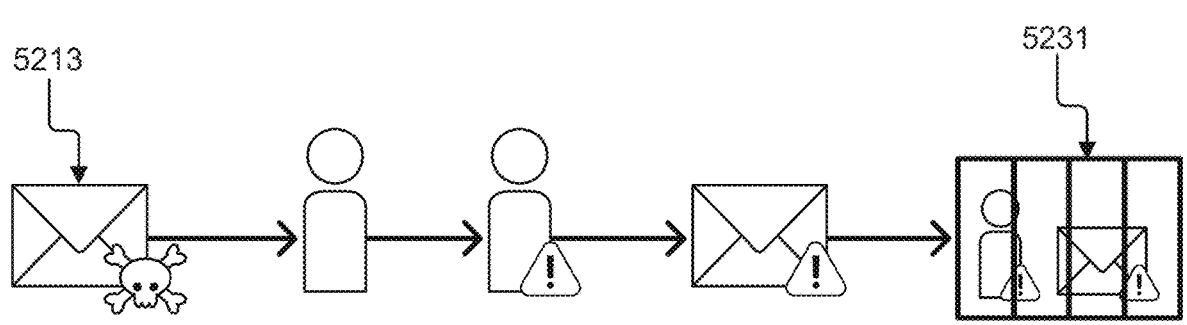
FIG. 52B illustrates exemplary process steps for confining any authenticable communication related to a harmful source, according to some embodiments of the present disclosure.

Referring now to FIGS. 52A-B, exemplary process steps for confining any authenticable communication from a harmful source 5212 sent now, previously, or in the future and exemplary process steps for confining any authenticable communication related to a harmful source 5213 are illustrated, respectively. In some embodiments, an authenticable communication may be sent from a harmful source 5212, 5213. In some implementations, communication from a harmful source 5212, 5213 may be placed in confinement 5230, 5231 such as, for example and not limitation, by being redirected to a separated server and being stored and/or retained in at least one independent confinement database within the separated server. In some aspects, an authentication 5205 may prevent communication from a harmful source 5212 from reaching the intended recipient 5250.

In some embodiments, the authentication 5205 may comprise a plurality of predetermined variables to assess an authenticable communication automatically. In some implementations, the automation may apply to inbound authenticable communications. For example, the authentication 5205 may notice that an image is embedded in an irregular fashion within the body of an email message. In some aspects, this may be a predetermined indicator that allows the automated authentication 5205 to classify the inbound message as a potential threat and confine 5230 the message.

In some embodiments, the authentication 5205 may, once the harmful source 5212 is confined, search through previously received authenticable communications from the indicated source 5210 and confine previously received authenticable communication 5200. In some implementations, authenticable communications related to a harmful source 5212, 5213 may be confined 5231. For example, all emails within an email chain may be confined 5231 even if not directly from the indicated source. In some embodiments, the email or emails within the chain that trigger the confinement may be highlighted for recipient or IT department reference. This may allow for safe handling of the email chain while still providing specific information about the offending authenticable communication.

In some aspects, automation may apply to outbound authenticable communications. As an example, the automated authentication 5205 may detect that the sender of an email or other authenticable communication is compromised. The authentication 5205 may prevent outbound messages from being sent, confine the sender and the messages, and send an automated notification to all contacts of the sender to notify them of a potential security breach. In some embodiments, the authentication 5205 may prevent previously sent messages from the sender from being opened.

Similarly, in some additional aspects, automation may apply to inbound authenticable communications, wherein the automated authentication 5205 may detect that the recipient of an email or other authenticable communication is compromised, such as by detecting that the recipient's account has been hacked or is fraudulent, as non-limiting examples. The authentication 5205 may prevent inbound communications from being received by the recipient, confine the recipient, and send the communications back to their respective senders along with a notification and/or one or more other security insights indicating, for example, that the recipient comprises at least one security risk.

Figure 53:
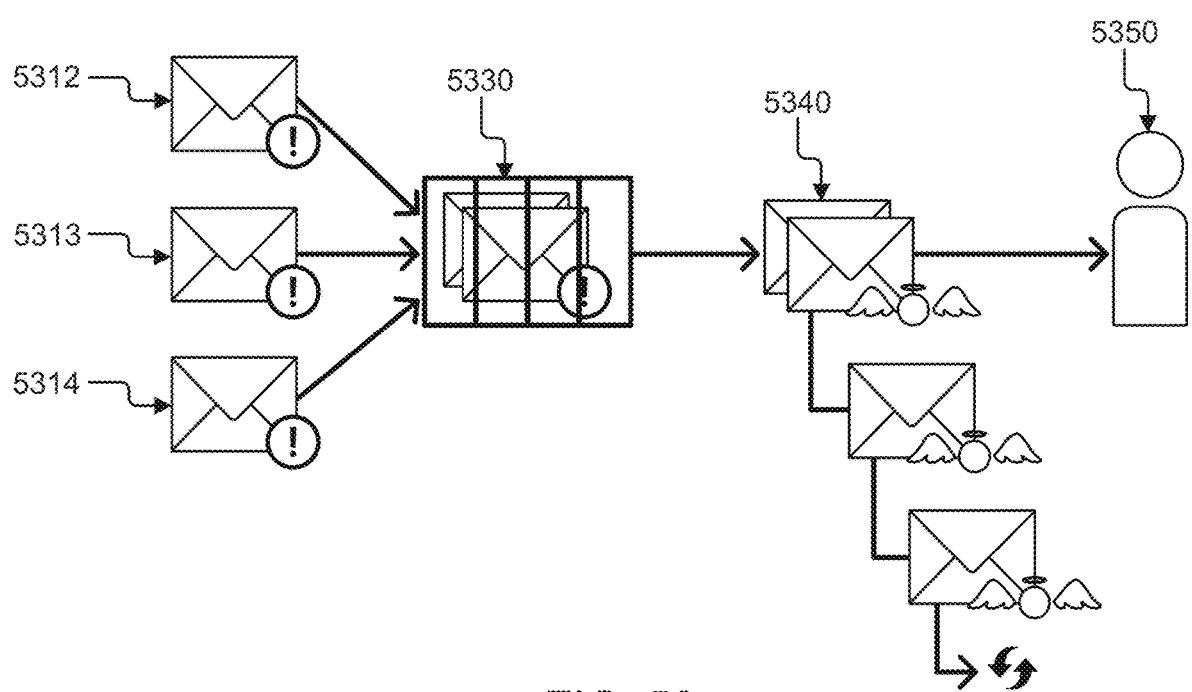
FIG. 53 illustrates exemplary process steps for confining a plurality of authenticable communications from a plurality of potentially harmful sources, according to some embodiments of the present disclosure.

Referring now to FIG. 53, exemplary process steps for confining a plurality of authenticable communications from a plurality of potentially harmful sources 5212, 5213, 5214 are illustrated. In some embodiments, an authenticable communication may be received from a plurality of potentially harmful sources 5312, 5313, 5314. In some implementations, the potentially harmful sources 5312, 5313, 5314 may be placed in confinement 5330 such as, for example and not limitation, by being redirected to a separated server and being stored and/or retained in at least one independent confinement database within the separated server. In some aspects, generated proxy content 5340 may be sent to an intended recipient 5350 in lieu of the original authenticable communication from potentially harmful sources 5312, 5313, 5314.

In some embodiments, the potentially harmful sources 5312, 5313, 5314 may be duplicates. As an illustrative example, a plurality of spam messages with harmful links may be sent repeatedly to an intended recipient 5350. In some implementations, the intended recipient 5350 may receive five identical messages within three minutes.

In some aspects, the identical aspect of incoming spam emails may be recognized and all relevant messages may be placed in confinement 5330. In some embodiments, the proxy content 5340 may automatically update to include and append additional duplicates of confined 5330 content. This may prevent security insight notifications from overwhelming an intended recipient 5350 by informing the intended recipient 5350 of each individual duplicate email.

Figure 54:
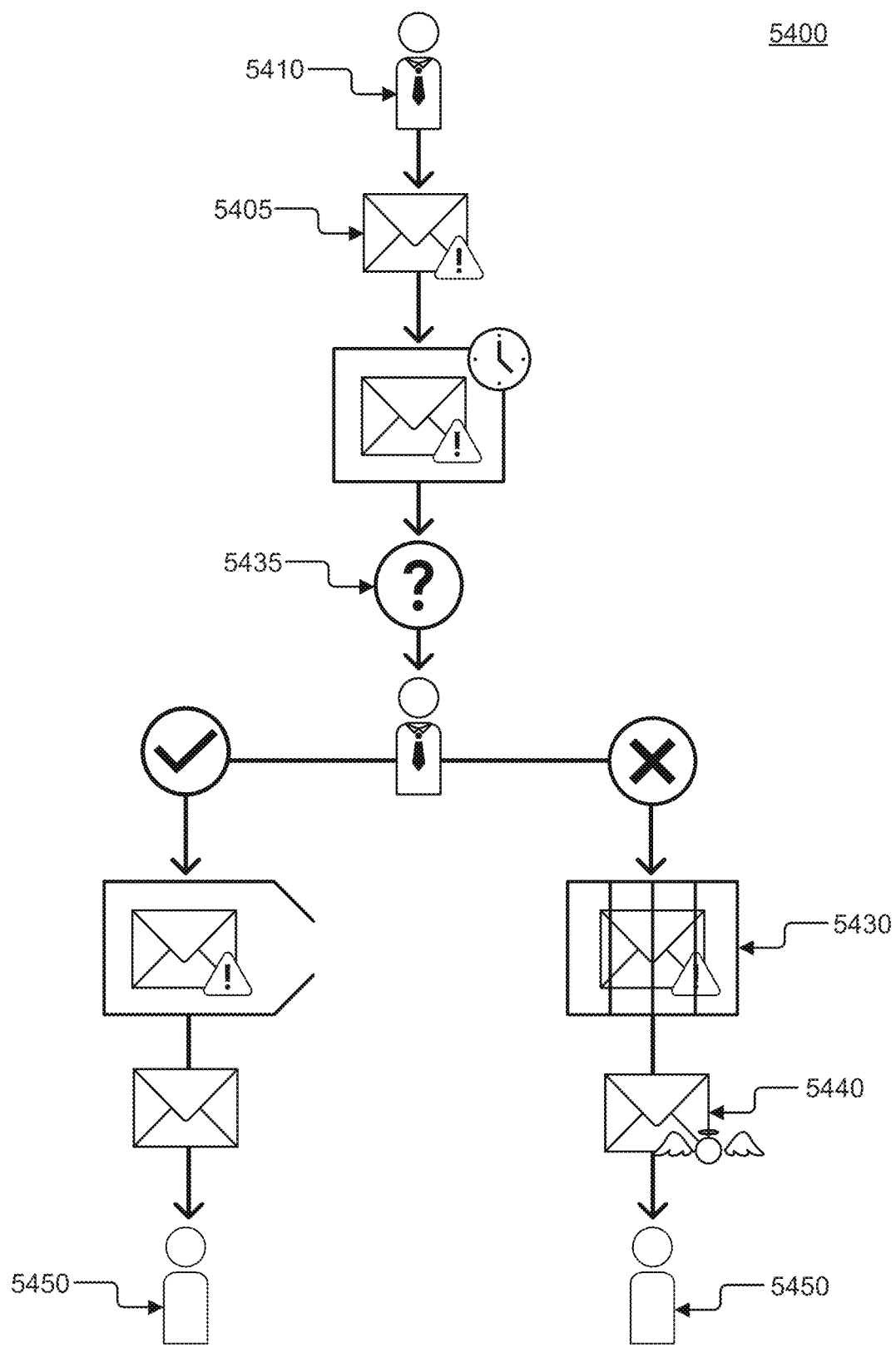
FIG. 54 illustrates exemplary process steps for confining an authenticable communication from an indicated source until the indicated source is confirmed, according to some embodiments of the present disclosure.

Referring now to FIG. 54, exemplary process steps for confining an authenticable communication from an indicated source until the indicated source is confirmed are illustrated. In some embodiments, an authenticable communication may comprise an indicated source 5410. In some implementations, an authentication 5405 may create a confirmation 5435 in order to authenticate the authenticable communication.

In some aspects, the indicated source 5410 may approve the confirmation 5435, thereby signaling to the authenticable communication that the intended communication can be released to the intended recipient 5450.

In some embodiments, the indicated source 5410 may reject or leave the confirmation 5435 unanswered. In some implementations, the authenticable communication may automatically confine 5430 the communication and release generated proxy content 5440 to the recipient 5450 in lieu of the original communication.

Figure 55:
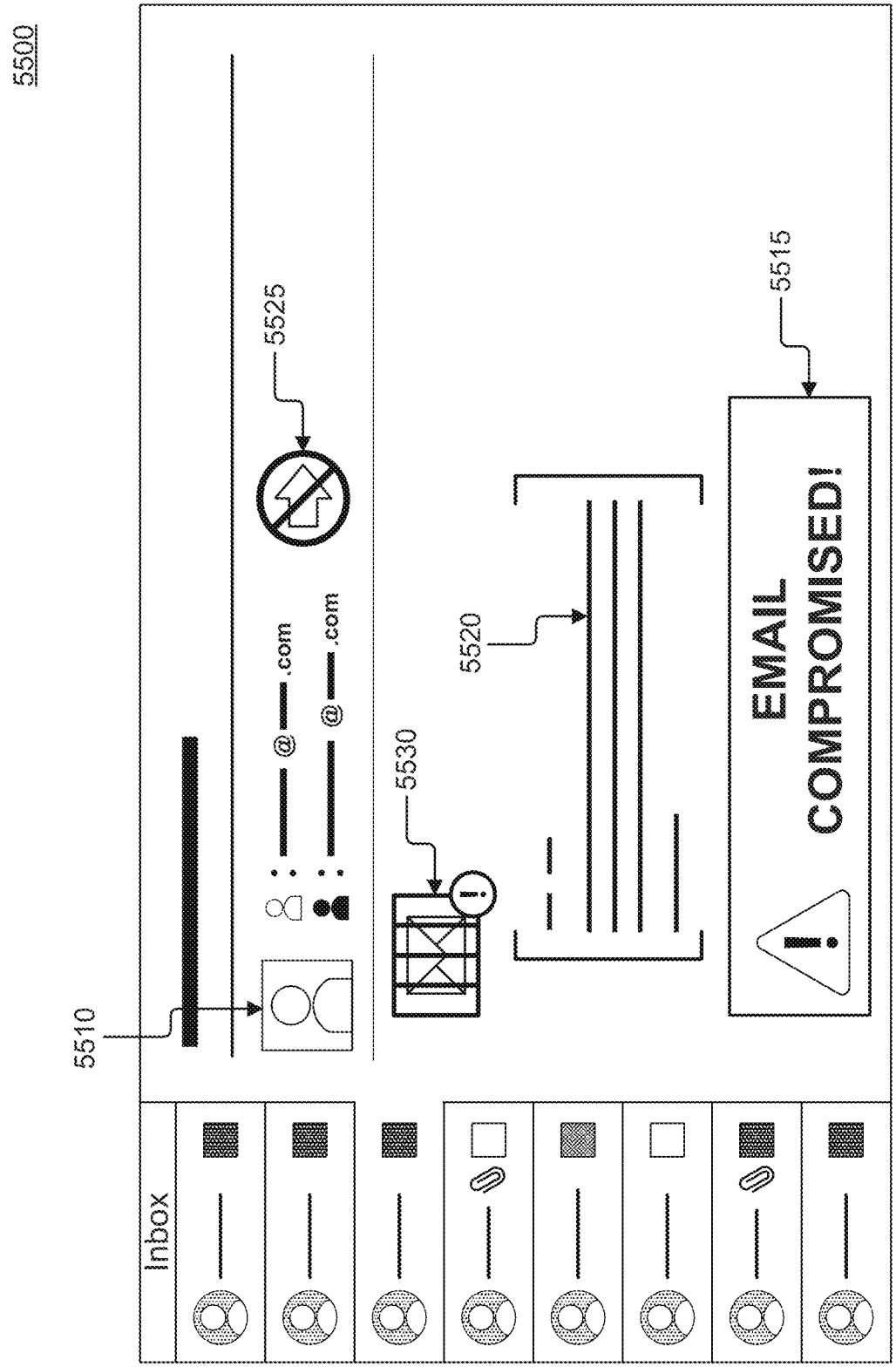
FIG. 55 illustrates an exemplary authenticable communication, according to some embodiments of the present disclosure.

Referring now to FIG. 55, an exemplary authenticable communication 5500 is illustrated. In some embodiments, the authenticable communication 5500 may comprise an indicated source 5510. In some implementations, the authenticable communication 5500 may comprise content 5520. In some aspects, the authenticable communication 5500 may comprise confinement 5530 for potentially harmful content 5520. In some embodiments, authenticable communication 5500 may provide insights 5515. In some implementations, the authenticable communication 5500 may comprise a security insight indicator 5525.

In some aspects, outbound authenticable communication 5500 may be retained. As an example, an authentication may detect that the sender of an email is compromised. The authentication may prevent the sending of outbound authenticable communication 5500 and send an automated notification to all contacts of the sender to notify them of a potential security breach.

In some aspects, the outbound authenticable communication 5500 may remain confined until the integrity of the sender's security has been reestablished. In some implementations, the authenticable communication 5500 may offer security insights 5515 to remedy the current security breach. In some embodiments, the authentication may prevent previously sent messages from the sender from being opened.

As another example, the authentication may confine any content 5520 from indicated sources 5510 previously identified as a harmful source. In some implementations, the authenticable communication 5500 may use a security insight indicator 5525 to prevent correspondence with these identified indicated sources 5510.

Figure 56:
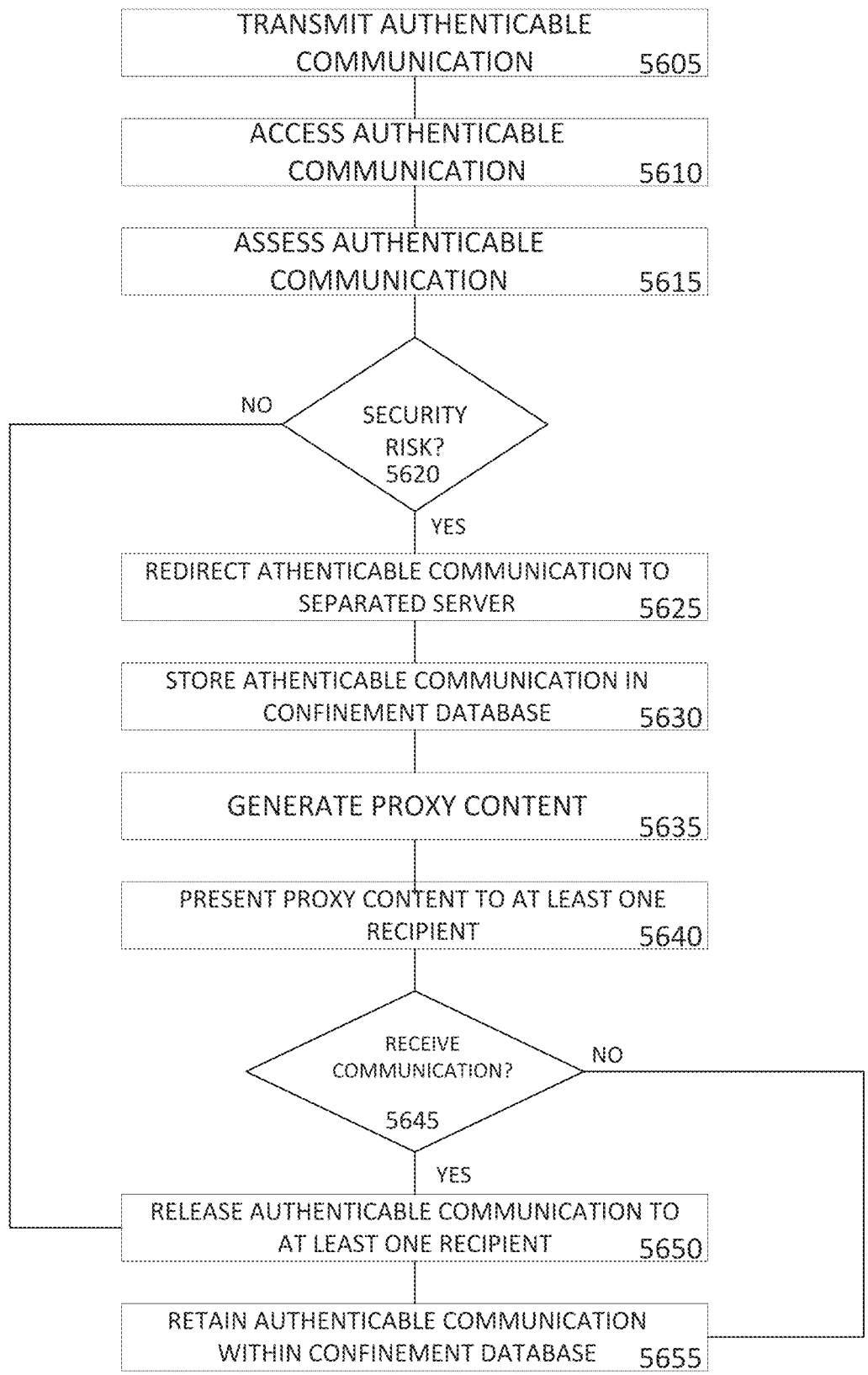
FIG. 56 illustrates exemplary method steps for confining an authenticable communication until it can be authenticated, according to some embodiments of the present disclosure.

Referring now to FIG. 56, exemplary method steps for confining an authenticable communication until it can be authenticated are illustrated. At 5605, an authenticable communication may be transmitted. At 5610, the authenticable communication may be accessed. At 5615, the content, the indicated source, and/or at least one recipient of the authenticable communication may be identified, analyzed, and assessed for suspicious or irregular characteristics by, for example and not limitation, comparing the actual content, indicated source, and/or one or more recipients with expected or anticipated content, indicated sources, and/or recipients and/or by comparing the content, indicated source, and/or one or more recipients to content, indicated sources, and/or recipients known to pose one or more security risks. The results of the assessment may at least partially comprise one or more security insights.

At 5620, it is determined whether the authenticable communication comprises at least one security risk. In some embodiments, at 5625, an authenticable communication that comprises at least one security risk may be redirected to a separated server. In some aspects, at 5630, the authenticable communication may be stored in at least one independent confinement database within the separated server. In some implementations, at 5635, proxy content comprising a rendering of the authenticable communication may be generated in order to create a redacted version of the authenticable communication without the at least one security risk. In some embodiments, at 5640, the proxy content may be presented to the at least one recipient.

In some aspects, at 5645, the at least one recipient determines whether to receive the authenticable communication based on reviewing the proxy content. In some aspects, at 5650, the at least one recipient indicates a desire to receive the authenticable communication and the authenticable communication may be released to and received by the at least one recipient. In some implementations, at 5655, the at least one recipient declines to receive the authenticable communication and the authenticable communication remains in the at least one confinement database.

Figure 57:
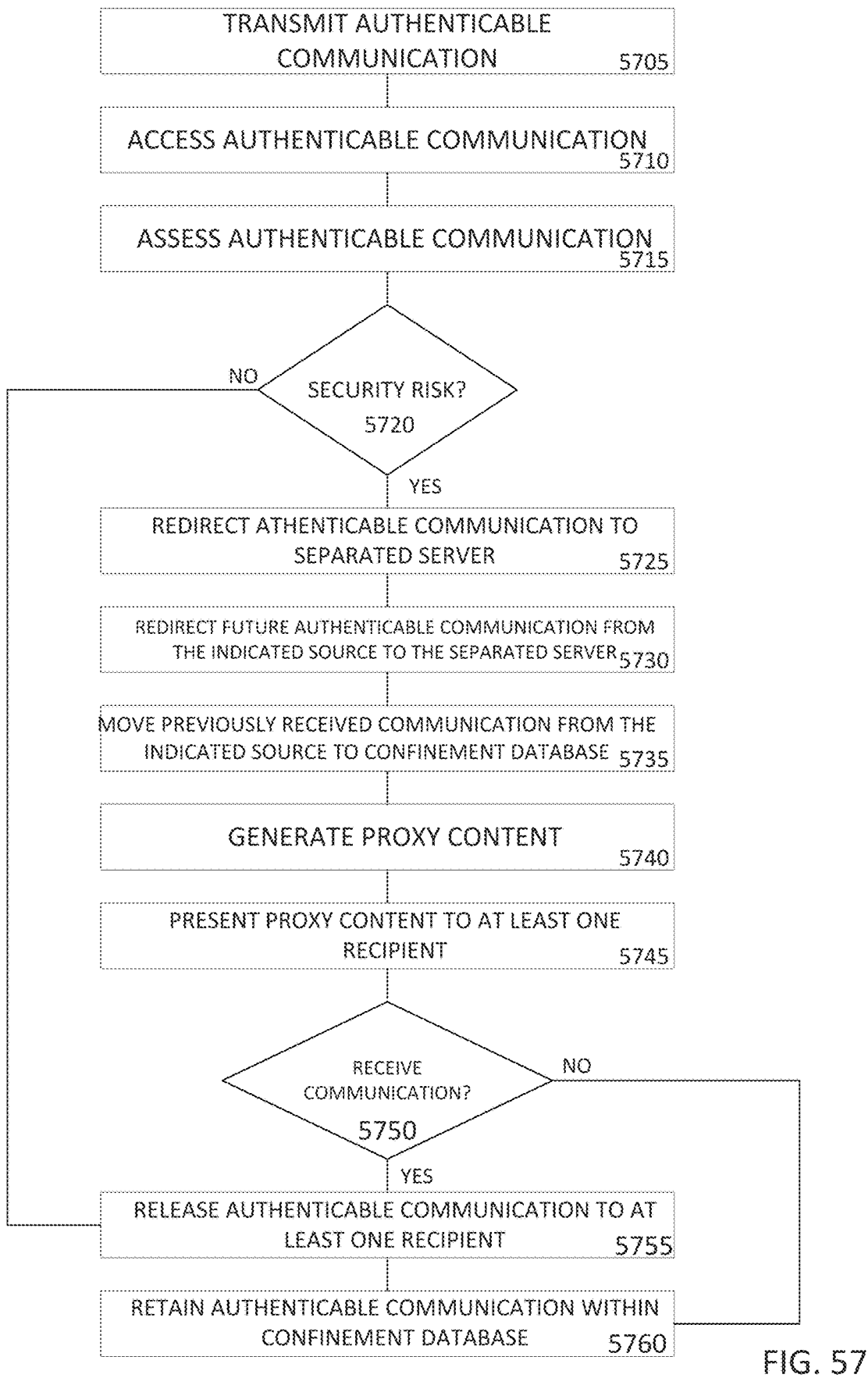
FIG. 57 illustrates exemplary method steps for confining at least one authenticable communication from an indicated source that comprises at least one security risk, according to some embodiments of the present disclosure.

Referring now to FIG. 57, exemplary method steps for confining at least one authenticable communication from an indicated source that comprises at least one security risk are illustrated. At 5705, an authenticable communication may be transmitted. At 5710, the authenticable communication may be accessed. At 5715, the content, the indicated source, and/or at least one recipient of the authenticable communication may be identified, analyzed, and assessed for suspicious or irregular characteristics by, for example and not limitation, comparing the actual content, indicated source, and/or one or more recipients with expected or anticipated content, indicated sources, and/or recipients and/or by comparing the content, indicated source, and/or one or more recipients to content, indicated sources, and/or recipients known to pose one or more security risks.

The results of the assessment may at least partially comprise one or more security insights. At 5720, it is determined whether the indicated source comprises at least one security risk. In some embodiments, at 5725, the authenticable communication from the indicated source that comprises the at least one security risk may be redirected to a separated server and optionally stored within an independent confinement database. In some aspects, at 5730, any future authenticable communication from the indicated source that comprises the at least one security risk may be automatically redirected to the separated server, including, in some embodiments, any authenticable communication indirectly related to the indicated source but not directly sent from the indicated source (such as, for example, when the indicated source may be part of an email chain). In some implementations, at 5735, any previously received authenticable communication from the indicated source that comprises the at least one security risk may be moved to the confinement database within the separated server (including, in some aspects, any previously received authenticable communication indirectly related to the indicated source).

In some embodiments, at 5740, proxy content comprising a rendering of the authenticable communication may be generated to create a redacted version of the authenticable communication without the at least one security risk. In some aspects, at 5745, the proxy content may be presented to the at least one recipient. In some implementations, at 5750, the at least one recipient determines whether to receive the authenticable communication based on reviewing the proxy content. In some embodiments, at 5755, the at least one recipient indicates a desire to receive the authenticable communication and the authenticable communication may be released to and received by the at least one recipient. In some aspects, at 5760, the at least one recipient declines to receive the authenticable communication and the authenticable communication remains in the independent confinement database.

Figure 58:
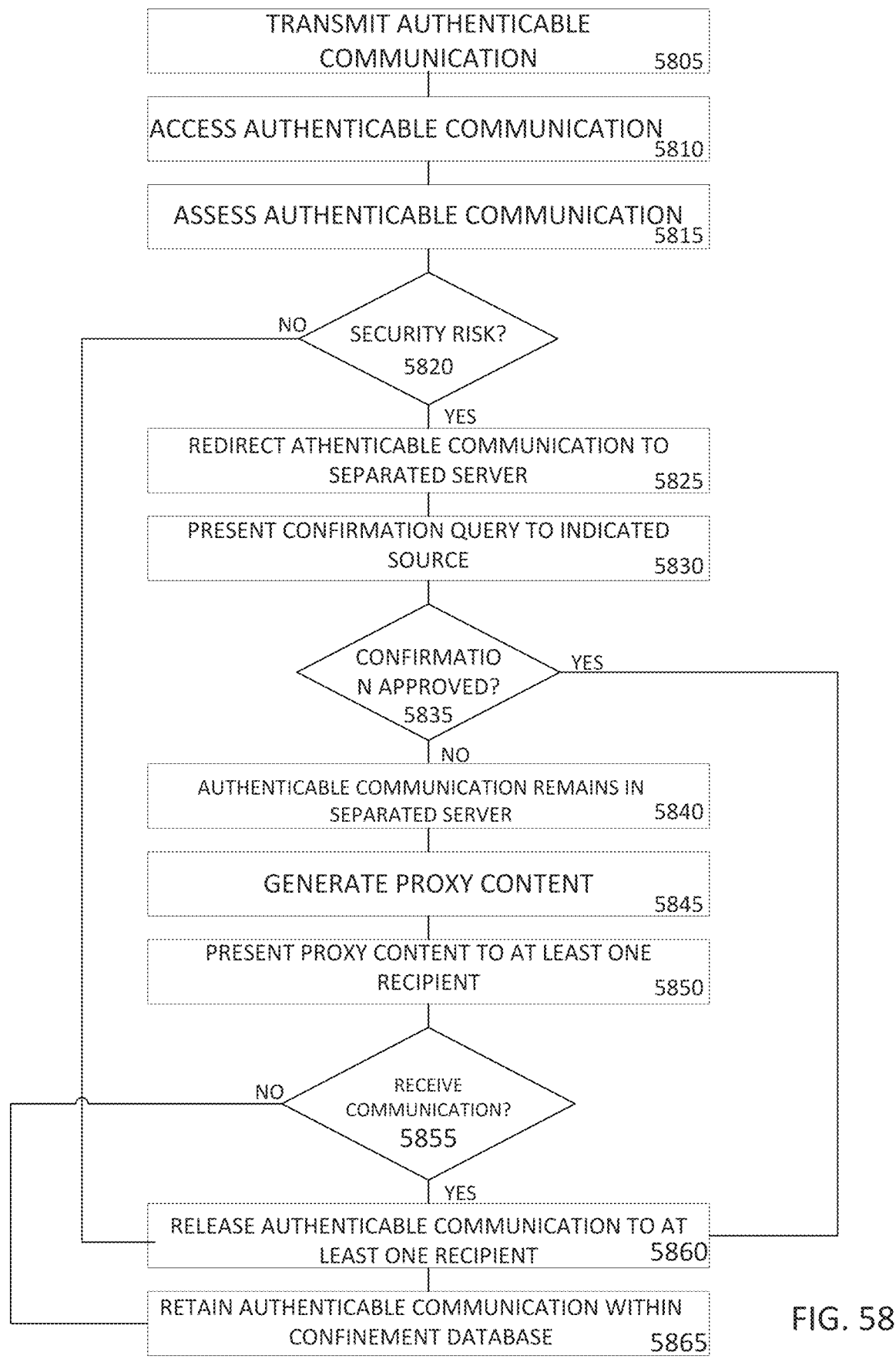
FIG. 58 illustrates exemplary method steps for confining an authenticable communication from an indicated source until the indicated source is confirmed, according to some embodiments of the present disclosure.

Referring to FIG. 58, exemplary method steps for confining an authenticable communication from an indicated source until the indicated source is confirmed are illustrated. At 5805, an authenticable communication may be transmitted. At 5810, the authenticable communication may be accessed. At 5815, the content, the indicated source, and/or at least one recipient of the authenticable communication may be identified, analyzed, and assessed for suspicious or irregular characteristics by, for example and not limitation, comparing the actual content, indicated source, and/or one or more recipients with expected or anticipated content, indicated sources, and/or recipients and/or by comparing the content, indicated source, and/or one or more recipients to content, indicated sources, and/or recipients known to pose one or more security risks.

The results of the assessment may at least partially comprise one or more security insights. At 5820, it is determined whether the indicated source comprises at least one security risk. In some embodiments, at 5825, the authenticable communication from the indicated source that comprises the at least one security risk is redirected to a separated server. In some aspects, at 5830, a confirmation query may be created or activated and presented to the indicated source. This may occur automatically (such as, for example and not limitation, after a predetermined amount of time has lapsed) or at the direction of the at least one recipient. In some implementations, at 5835, it is determined whether the indicated source approves the confirmation.

In some embodiments, at 5845, an unapproved (e.g., disregarded, unseen, or denied) confirmation causes the authenticable communication to remain in the separated server and optionally stored within at least one independent confinement database therein while proxy content comprising a rendering of the authenticable communication may be generated to create a redacted version of the authenticable communication without the at least one security risk. In some implementations, at 5850, the proxy content may be presented to the at least one recipient. In some embodiments, at 5855, the at least one recipient determines whether to receive the authenticable communication based on reviewing the proxy content.

In some aspects, at 5860, the at least one recipient indicates a desire to receive the authenticable communication and the authenticable communication may be released to and received by the at least one recipient. In some implementations, the authenticable communication may be released to and received by the at least one recipient once the indicated source approves the confirmation query at 5835. In some embodiments, at 5865, the at least one recipient declines to receive the authenticable communication and the authenticable communication may be stored and retained in the confinement database within the separated server.

Figure 59:
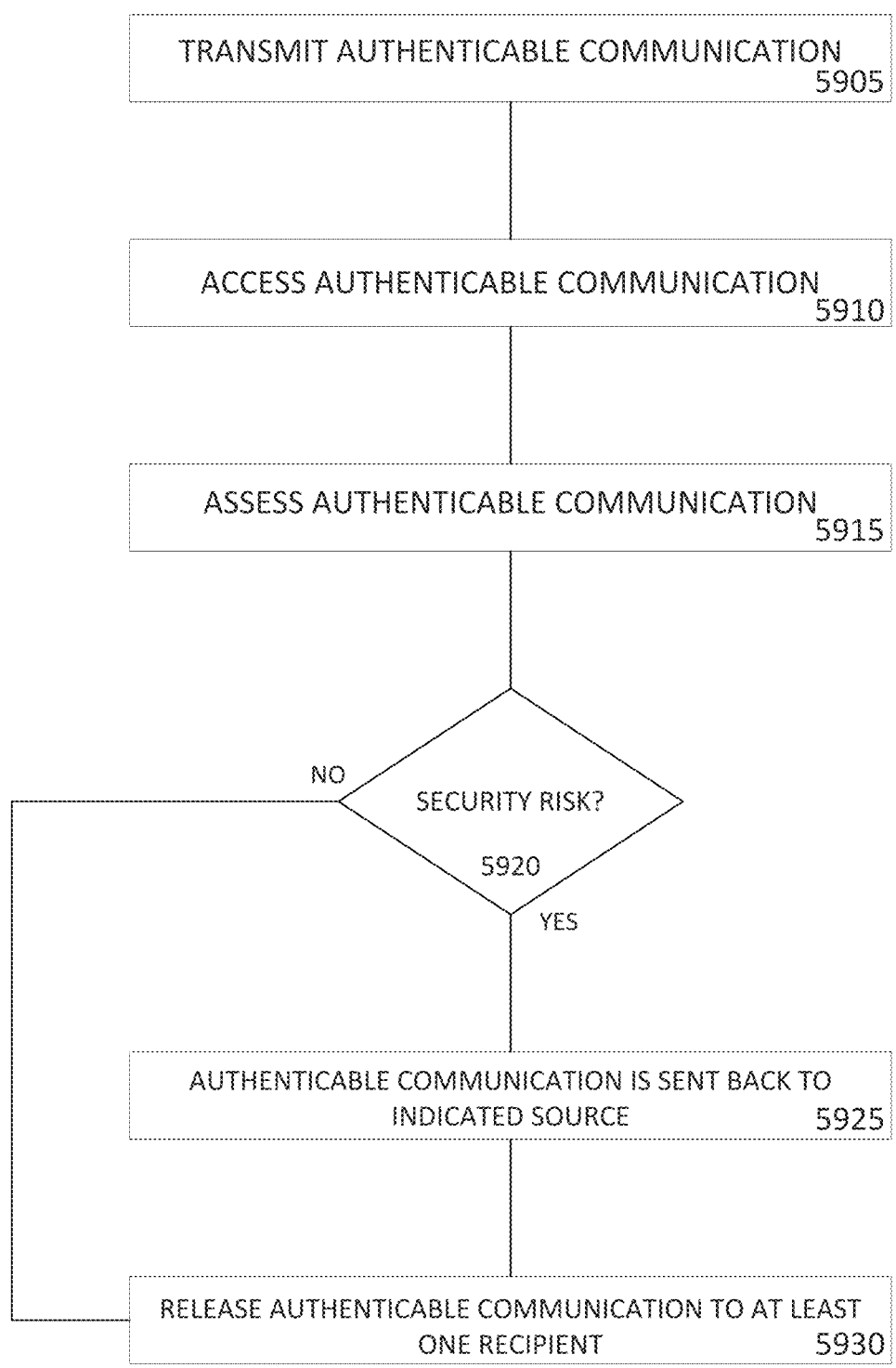
FIG. 59 illustrates exemplary method steps for preventing an authenticable communication from being sent to a recipient comprising at least one security risk, according to some embodiments of the present disclosure.

Referring now to FIG. 59, exemplary method steps for preventing an authenticable communication from being sent to a recipient comprising at least one security risk are illustrated. At 5905, an authenticable communication may be transmitted. At 5910, the authenticable communication may be accessed. At 5915, the content, the indicated source, and/or at least one recipient of the authenticable communication may be identified, analyzed, and assessed for suspicious or irregular characteristics by, for example and not limitation, comparing the actual content, indicated source, and/or one or more recipients with expected or anticipated content, indicated sources, and/or recipients and/or by comparing the content, indicated source, and/or one or more recipients to content, indicated sources, and/or recipients known to pose one or more security risks.

The results of the assessment may at least partially comprise one or more security insights. At 5920, it is determined whether the at least one recipient comprises at least one security risk. In some embodiments, at 5925, the authenticable communication may be sent back to the indicated source along with the one or more security insights. In some aspects, when it is determined that the at least one recipient does not comprise at least one security risk, at 5930 the authenticable communication may be released to and received by the at least one recipient.

Figure 60:
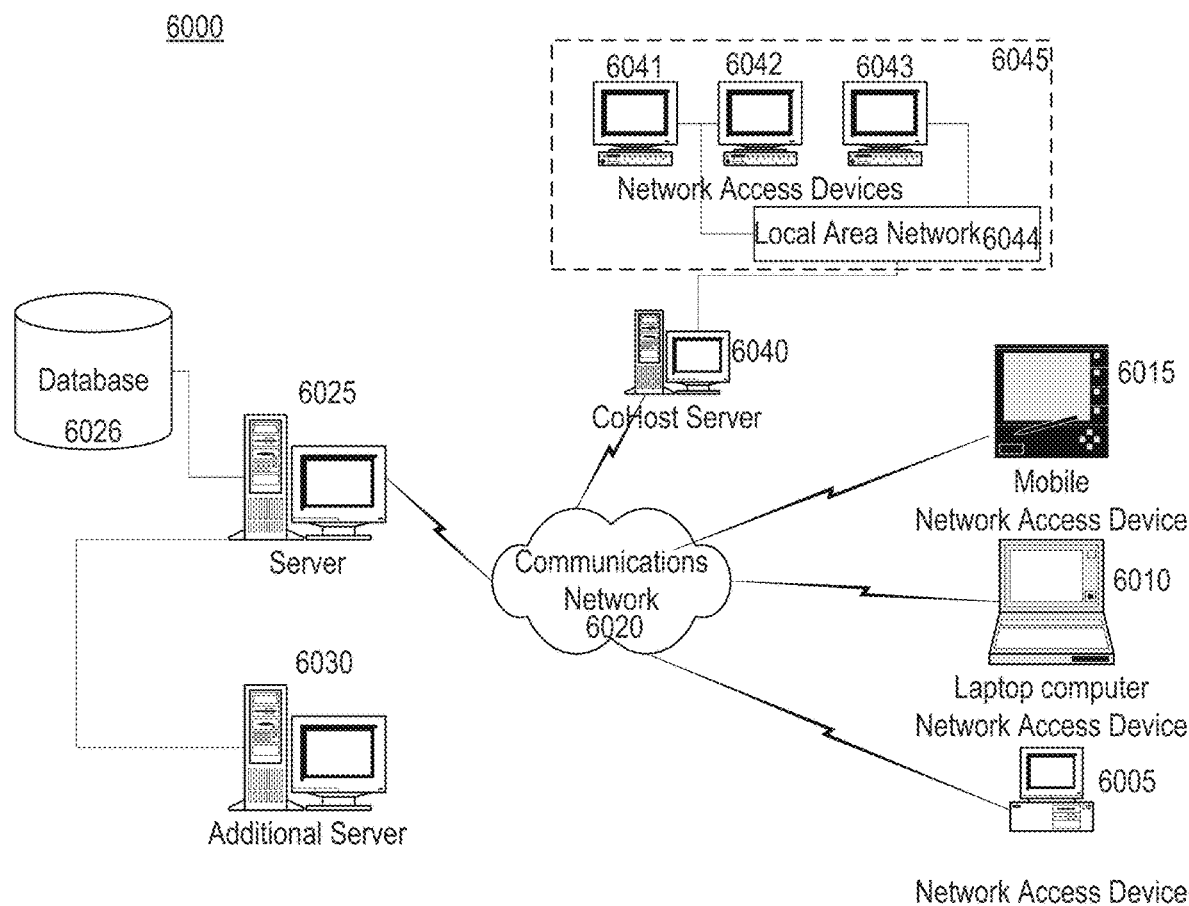
FIG. 60 illustrates an exemplary processing and interface system, according to some embodiments of the present disclosure.

Referring now to FIG. 60, an exemplary processing and interface system 6000 is illustrated. In some aspects, access devices 6015, 6010, 6005, such as a paired portable device 6015 or laptop computer 6010 may be able to communicate with an external server 6025 through a communications network 6020. The external server 6025 may be in logical communication with a database 6026, which may comprise data related to identification information and associated profile information. In some embodiments, the server 6025 may be in logical communication with an additional server 6030, which may comprise supplemental processing capabilities.

In some aspects, the server 6025 and access devices 6005, 6010, 6015 may be able to communicate with a cohost server 6040 through a communications network 6020. The cohost server 6040 may be in logical communication with an internal network 6045 comprising network access devices 6041, 6042, 6043 and a local area network 6044. For example, the cohost server 6040 may comprise a payment service, such as PayPal or a social network, such as Facebook or a dating website.

Figure 61:
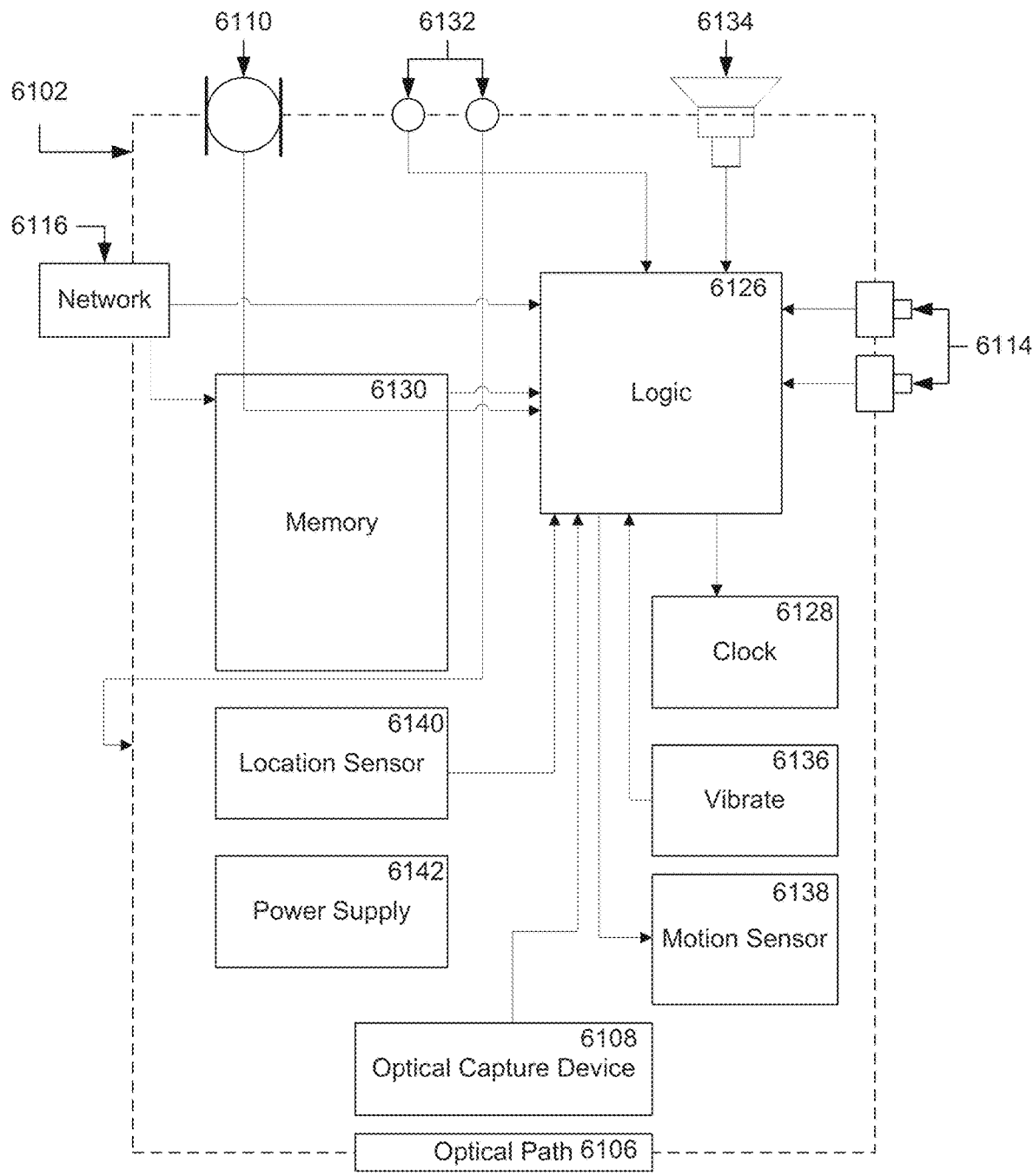
FIG. 61 illustrates an exemplary block diagram of an exemplary embodiment of a mobile device, according to some embodiments of the present disclosure.

Referring now to FIG. 61, an exemplary block diagram of an exemplary embodiment of a mobile device 6102 is illustrated. The mobile device 6102 may comprise an optical capture device 6108, which may capture an image and convert it to machine-compatible data, and an optical path 6106, typically a lens, an aperture, or an image conduit to convey the image from the rendered document to the optical capture device 6108. The optical capture device 6108 may incorporate a Charge-Coupled Device (CCD), a Complementary Metal Oxide Semiconductor (CMOS) imaging device, or an optical sensor of another type.

In some embodiments, the mobile device 6102 may comprise a microphone 6110, wherein the microphone 6110 and associated circuitry may convert the sound of the environment, including spoken words, into machine-compatible signals. Input facilities 6115 may exist in the form of buttons, scroll-wheels, or other tactile sensors such as touchpads. In some embodiments, input facilities 6114 may include a touchscreen display. Visual feedback 6132 to the user may occur through a visual display, touchscreen display, or indicator lights. Audible feedback 6134 may be transmitted through a loudspeaker or other audio transducer. Tactile feedback may be provided through a vibration module 6136.

In some aspects, the mobile device 6102 may comprise a motion sensor 6138, wherein the motion sensor 6138 and associated circuitry may convert the motion of the mobile device 6102 into machine-compatible signals. For example, the motion sensor 6138 may comprise an accelerometer, which may be used to sense measurable physical acceleration, orientation, vibration, and other movements. In some embodiments, the motion sensor 6138 may comprise a gyroscope or other device to sense different motions.

In some implementations, the mobile device 6102 may comprise a location sensor 6140, wherein the location sensor 6140 and associated circuitry may be used to determine the location of the device. The location sensor 6140 may detect Global Position System (GPS) radio signals from satellites or may also use assisted GPS where the mobile device may use a cellular network to decrease the time necessary to determine location. In some embodiments, the location sensor 6140 may use radio waves to determine the distance from known radio sources such as cellular towers to determine the location of the mobile device 6102. In some embodiments these radio signals may be used in addition to and/or in conjunction with GPS.

In some aspects, the mobile device 6102 may comprise a logic module 6126, which may place the components of the mobile device 6102 into electrical and logical communication. The electrical and logical communication may allow the components to interact. Accordingly, in some embodiments, the received signals from the components may be processed into different formats and/or interpretations to allow for the logical communication. The logic module 6126 may be operable to read and write data and program instructions stored in associated storage 6130, such as RAM, ROM, flash, or other suitable memory. In some aspects, the logic module 6126 may read a time signal from the clock unit

6128. In some embodiments, the mobile device 6102 may comprise an on-board power supply 6132. In some embodiments, the mobile device 6102 may be powered from a tethered connection to another device, such as a Universal Serial Bus (USB) connection.

In some implementations, the mobile device 6102 may comprise a network interface 6116, which may allow the mobile device 6102 to communicate and/or receive data to a network and/or an associated computing device. The network interface 6116 may provide two-way data communication. For example, the network interface 6116 may operate according to an internet protocol. As another example, the network interface 6116 may comprise a local area network (LAN) card, which may allow a data communication connection to a compatible LAN. As another example, the network interface 6116 may comprise a cellular antenna and associated circuitry, which may allow the mobile device to communicate over standard wireless data communication networks. In some implementations, the network interface 6116 may comprise a Universal Serial Bus (USB) to supply power or transmit data. In some embodiments, other wireless links known to those skilled in the art may also be implemented.

CONCLUSION

A number of embodiments of the present disclosure have been described. While this specification contains many specific implementation details, this should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A computer-implemented method for confining an authenticable communication until it is authenticated, the computer-implemented method comprising:
   accessing an authenticable communication comprising an indicated source, at least one recipient, and content, wherein the authenticable communication comprises an electronic communication accessible via an access device;
   identifying the indicated source;
   identifying the content;
   assessing indicated source security risk;
   assessing content security risk;
   determining whether at least one of: the content, the at least one recipient, and the indicated source comprises at least one security risk; and
   redirecting the authenticable communication to a separated server, wherein the separated server comprises at least one independent confinement database for storage and retention of authenticable communications determined to comprise at least one security risk, wherein the at least one independent confinement database is logically and physically separate and independent from all other databases.

2. The method of claim 1, further comprising:
   identifying content types within the content, wherein the content types comprise at least two or more of text, images, attachments, or links;
   separating portions of the content by content types, wherein the assessing of the content security risk is based on predefined criteria associated with content types;
   identifying the indicated source comprising at least a review of a sender email address;
   developing content security insights and indicated source security insights for the authenticable communication, wherein security insights comprise results of assessing content security risk and assessing indicated source security risk;
   generating a rendering of the authenticable communication to create proxy content; and
   presenting the proxy content to the at least one recipient, wherein the proxy content comprises at least one of: the content security insights and the indicated source security insights.

3. The method of claim 1, wherein the at least one recipient comprises a proxy recipient.

4. The method of claim 1, wherein the method further comprises:
   identifying the at least one recipient;
   assessing a recipient security risk of the at least one recipient;
   developing recipient security insights for the at least one recipient, wherein the recipient security insights comprise results of assessing the recipient security risk; and
   sending the authenticable communication back to the indicated source along with the recipient security insights.

5. The method of claim 1, wherein upon determination that the indicated source comprises the at least one security risk, any authenticable communication from the indicated source is redirected to the separated server.

6. The method of claim 5, wherein one or more previously received authenticable communications from the indicated source is moved to the separated server.

7. The method of claim 2, wherein the proxy content comprises at least a portion of the content.

8. The method of claim 1, wherein the redirected authenticable communication is accessible by the at least one recipient on the separated server.

9. The method of claim 1, wherein the redirected authenticable communication is releasable from the separated server by the at least one recipient.

10. The method of claim 2, wherein the proxy content appends duplicate authenticable communications received from the same indicated source.

11. The method of claim 2, wherein the authenticable communication may be authenticated by a confirmation.

12. The method of claim 11, wherein approval of the confirmation releases the authenticable communication from the separated server and allows the authenticable communication to be received by the at least one recipient.

13. The method of claim 11, wherein the confirmation is activated automatically after a predetermined period of time has lapsed with the authenticable communication in the separated server.

14. The method of claim 11, wherein a response to the confirmation activates automated retention of the authenticable communication within the at least one independent confinement database within the separated server.

15. The method of claim 11, wherein the security insights comprise a third-party software integration that supplements the confirmation.

16. The method of claim 15, wherein the third-party software integration provides at least partial authentication for the authenticable communication.

17. The method of claim 15, wherein the security insights comprise information received from the third-party software integration.

18. A risk assessment system comprising:
one or more processors;
one or more memory resources comprising:
an authentication mechanism database;
an indicated source database;
a confinement database; and
wherein the one or more memory resources are connectable to one or more external devices through a communications network, wherein at least one of the one or more external devices comprises an authenticable communication transmittal mechanism and at least one of the one or more external devices comprises an authenticable communication receiving mechanism, wherein the confinement database is contained within a separated server and is logically and physically separate and independent from all other databases, wherein the one or more memory resources are executable by the one or more processors to perform the steps of:
accessing an authenticable communication comprising an indicated source, at least one recipient, and content;
determining whether at least one of: the content, the at least one recipient, and the indicated source comprises at least one security risk;
redirecting the authenticable communication to the separated server;
identifying the content;
identifying content types within the content, wherein the content types comprise at least two or more of text, images, attachments, or links;
separating portions of the content by content types;
assessing content security risk of the content based on predefined criteria associated with the content types;
identifying the indicated source comprising at least a review of a sender email address;
assessing indicated source security risk;
developing content security insights and indicated source security insights for the authenticable communication, wherein security insights comprise results of assessing content security risk and assessing indicated source security risk;
generating a rendering of the authenticable communication to create proxy content; and
presenting the proxy content to the at least one recipient, wherein the proxy content comprises at least a portion of the content and at least one of: the content security insights and the indicated source security insights.

19. The system of claim 18, wherein the one or more memory resources are executable by the one or more processors to perform additional steps of:
identifying the at least one recipient;
assessing a recipient security risk of the at least one recipient;
developing recipient security insights for the at least one recipient, wherein the recipient security insights comprise results of assessing the recipient security risk; and
sending the authenticable communication back to the indicated source along with the recipient security insights.

* * * * *